(12) United States Patent
Oh et al.

(10) Patent No.: US 9,854,287 B2
(45) Date of Patent: Dec. 26, 2017

(54) METHOD AND APPARATUS FOR PROCESSING DIGITAL SERVICE SIGNAL

(71) Applicants: Sejin Oh, Seoul (KR); Jinpil Kim, Seoul (KR); Seungjoo An, Seoul (KR); Jinwon Lee, Seoul (KR); Kyungho Kim, Seoul (KR); Kyoungsoo Moon, Seoul (KR)

(72) Inventors: Sejin Oh, Seoul (KR); Jinpil Kim, Seoul (KR); Seungjoo An, Seoul (KR); Jinwon Lee, Seoul (KR); Kyungho Kim, Seoul (KR); Kyoungsoo Moon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 113 days.

(21) Appl. No.: 14/012,581

(22) Filed: Aug. 28, 2013

(65) Prior Publication Data

US 2014/0068646 A1    Mar. 6, 2014

Related U.S. Application Data

(60) Provisional application No. 61/694,761, filed on Aug. 29, 2012, provisional application No. 61/697,272, (Continued)

(51) Int. Cl.
*H04N 21/258* (2011.01)
*H04N 21/45* (2011.01)
(Continued)

(52) U.S. Cl.
CPC ... *H04N 21/25891* (2013.01); *H04N 21/2668* (2013.01); *H04N 21/454* (2013.01);
(Continued)

(58) Field of Classification Search
None
See application file for complete search history.

(56) References Cited

U.S. PATENT DOCUMENTS 6,581,071 B1 * 6/2003 Gustman ............... G06Q 30/02
                                                707/601
9,113,230 B2 * 8/2015 Eyer ................. H04N 21/8133
(Continued)

FOREIGN PATENT DOCUMENTS

| CN | 101656935 A | 2/2010 |
| JP | 2002175326 A | 6/2002 |

(Continued)

OTHER PUBLICATIONS

ATSC Candidate Standard: Interactive Services Standard A/105:2014, Rev. 7, Apr. 24, 2014.*
(Continued)

*Primary Examiner* — Pankaj Kumar
*Assistant Examiner* — Usha Raman
(74) *Attorney, Agent, or Firm* — Dentons US LLP

(57) ABSTRACT

An apparatus of processing a digital service signals and a method thereof are disclosed. The present invention includes a PDI module configured to receive a PDI table, wherein the PDI table includes at least one question element having attributes of a PDI question, wherein the PDI table further includes a table Id field identifying the PDI table, a table version field indicating a version of the PDI table and a time field indicating a date and a time of the most recent change to the PDI question and extract the PDI question from the at least one question element, wherein each of the at least one question element has a different type, a PDI answer module configured to receive a PDI answer according to the extracted PDI question, a filtering module configured to receive a filtering criteria information and filter contents of the digital service signal by comparing the filtering criteria (Continued)

| Element/Attribute (with @) | No. allowed | Data Type | Description & Value |
|---|---|---|---|
| TPT | | | |
| ... | ... | ... | ... |
| TDO | 1..N | | TDO for this segment |
| @appID | 1 | unsignedShort | Application ID, for reference by trigger |
| ... | | | |
| FilterCriterion | 0..N | | Filter criteria for this TDO |
| @id | 1 | anyURI | Identifier for this filter criterion |
| @criterionType | 1 | unsignedByte | Type of this filter criterion |
| criterionValue | 1...N | base64Binary | Filter criterion value represented by @criterionType |
| ContentItem | 0..N | | Content item used by this TDO |
| ... | | | |
| FilterCriterion | 0..N | | Filter criteria for this TDO |
| @id | 1 | anyURI | Identifier for this filter criterion |
| @criterionType | 1 | unsignedByte | Type of this filter criterion |
| criterionValue | 1...N | base64Binary | Filter criterion value represented by @criterionType |
| Event | 1..N | | Event targeted to this TDO |
| ... | | | | information against the received the PDI answer and a content storing module configured to download the filtered contents, wherein the type of the at least one question element indicates a type for the PDI question with one of an integer answer, a Boolean answer, a selection answer, a text answer and an answer with no PDI question.

16 Claims, 46 Drawing Sheets

Related U.S. Application Data filed on Sep. 5, 2012, provisional application No. 61/706,096, filed on Sep. 26, 2012.

(51) Int. Cl.
| | |
|---|---|
| *H04N 21/8545* | (2011.01) |
| *H04N 21/858* | (2011.01) |
| *H04N 21/454* | (2011.01) |
| *H04N 21/466* | (2011.01) |
| *H04N 21/462* | (2011.01) |
| *H04N 21/6543* | (2011.01) |
| *H04N 21/658* | (2011.01) |
| *H04N 21/2668* | (2011.01) |

(52) U.S. Cl.
CPC ..... *H04N 21/4532* (2013.01); *H04N 21/4622* (2013.01); *H04N 21/4667* (2013.01); *H04N 21/658* (2013.01); *H04N 21/6543* (2013.01); *H04N 21/8545* (2013.01); *H04N 21/8586* (2013.01)

(56) References Cited

U.S. PATENT DOCUMENTS

| | | | |
|---|---|---|---|
| 2006/0015487 A1 | 1/2006 | Vest | |
| 2009/0132718 A1 | 5/2009 | Groll et al. | |
| 2010/0050211 A1 | 2/2010 | Seldin et al. | |
| 2011/0246488 A1 | 10/2011 | Eyer | |
| 2011/0247028 A1* | 10/2011 | Eyer | 725/13 |
| 2011/0298981 A1 | 12/2011 | Eyer | |
| 2011/0302611 A1* | 12/2011 | Eyer | H04N 21/4345 725/46 |
| 2012/0054267 A1 | 3/2012 | Yamagishi | |
| 2012/0054783 A1* | 3/2012 | Yamagishi | 725/13 |
| 2012/0185888 A1* | 7/2012 | Eyer et al. | 725/13 |
| 2012/0247028 A1 | 10/2012 | Konyashin et al. | |
| 2013/0036440 A1* | 2/2013 | Eyer | H04N 21/472 725/40 |
| 2013/0201399 A1* | 8/2013 | Kitazato et al. | 348/553 |
| 2014/0040965 A1 | 2/2014 | Kitazato et al. | |
| 2014/0053174 A1* | 2/2014 | Eyer et al. | 725/13 |
| 2014/0099078 A1* | 4/2014 | Kitahara | H04N 21/4622 386/248 |
| 2014/0122528 A1* | 5/2014 | Yamagishi | 707/770 |
| 2014/0229580 A1* | 8/2014 | Yamagishi | G06Q 30/02 709/219 |
| 2014/0282740 A1 | 9/2014 | Jung et al. | |
| 2015/0067754 A1* | 3/2015 | Wiser | H04N 21/2668 725/120 |
| 2015/0237416 A1* | 8/2015 | Eyer | H04N 21/478 725/32 |
| 2017/0171641 A1* | 6/2017 | Kitazato | H04N 21/814 |

FOREIGN PATENT DOCUMENTS

| | | |
|---|---|---|
| JP | 2003009119 A | 1/2003 |
| JP | 2009-212814 A | 9/2009 |
| KR | 10-2011-0134370 A | 12/2011 |
| WO | 2008/035278 A1 | 3/2008 |
| WO | 2009/064163 A1 | 5/2009 |
| WO | 2011/156035 A1 | 12/2011 |
| WO | 2011/157729 A2 | 12/2011 |
| WO | 2012/026388 A1 | 3/2012 |
| WO | 2012/029568 A1 | 3/2012 |
| WO | 2012029569 A1 | 3/2012 |
| WO | 2012111514 A1 | 8/2012 |

OTHER PUBLICATIONS

RFC 3926: FLUTE, Oct. 2004.*
U.S. Appl. No. 61/319,873.*
U.S. Appl. No. 61/683,664, Appendix A-C.*
ATSC Standard: Non-Real-Time Content Delivery, A/103:2014, Jul. 25, 2014.
Interactive Services Standard (ISS) PDI-related schema, Version: 1.0, Dec. 12, 2013.
Interactive Services Standard (ISS) TPT-related schema, Version: 1.0, Dec. 12, 2013.
Search Report of European Patent Office in Appl'n No. 13832713.5, dated Jul. 1, 2016.
Office Action of the U.S. Patent Office in U.S. Appl. No. 14/012,515, dated Nov. 16, 2016, 16 pages.
Office Action of Chinese Patent Office in Appl'n No. 201380045708.2, dated May 2, 2017.
Office Action of Chinese Patent Office in Appl'n No. 201380041693.2, dated Jun. 28 2017.

* cited by examiner

FIG. 4

| Syntax | No. of Bits | Format |
|---|---|---|
| ATSC_content_identifier() { | | |
|     TSID | 16 | uimsbf |
|     reserved | 2 | bslbf |
|     end_of_day | 5 | uimsbf |
|     unique_for | 9 | uimsbf |
|     content_id | var | |
| } | | |

FIG. 17A

| Element/Attribute | | | | | Cardinality | XML datatype | Description |
|---|---|---|---|---|---|---|---|
| PDITable | | | | | | | Table of PDI questions/answers |
| | @protocolVersion | | | | 0..1 | hexBinary | Protocol version (major/minor) |
| | @pdiTableId | | | | 1 | anyURI | Globally unique ID of PDITable |
| | @pdiTableVersion | | | | 1 | unsignedByte | PDI Table version (data) |
| | @time | | | | 1 | dateTime | Time table questions last updated |
| | <choice> | | | | 1..N | | Choice among QIA, QBA, QSA, QTA, QAA |
| | | QIA | | | 1 | | Question with integer answer |
| | | | @id | | 1 | anyURI | Globally unique ID of question |
| | | | @loEnd | | 0..1 | int | Lower bound for answers |
| | | | @hiEnd | | 0..1 | int | Upper bound for answers |
| | | | @expire | | 0..1 | dateTime | Expiration date/time for question |
| | | | Q | | 0..N | string | Text of question |
| | | | | @lang | 0..1 | xml:lang | Language of question text |
| | | | A | | 0..N | int | Answer to question |
| | | | | @time | 0..1 | dateTime | Date/time when answer provided |
| | | QBA | | | 1 | | Question with Boolean answer |
| | | | @id | | 1 | anyURI | Globally unique ID of question |
| | | | @expire | | 0..1 | dateTime | Expiration date/time for question |
| | | | Q | | 0..N | string | Text of question |
| | | | | @lang | 0..1 | xml:lang | Language of question text |
| | | | A | | 0..2 | boolean | Answer to question |
| | | | | @time | 0..1 | dateTime | Date/time when answer provided |
| | | QSA | | | 1 | | Question with selection answer |
| | | | @id | | 1 | anyURI | Globally unique ID of question |
| | | | @minChoices | | 0..1 | unsignedByte | Minimum allowed number of selections |
| | | | @maxChoices | | 0..1 | unsignedByte | Maximum allowed number of selections |
| | | | @expire | | 0..1 | dateTime | Expiration date/time for question |
| | | | Q | | 0..N | string | Text of question |
| | | | | @lang | 0..1 | xml:lang | Language of question/Selection elements |
| | | | | Selection | 2..N | string | Possible selection |
| | | | | | @id | 1 | unsignedByte | Identifier of selection, scoped by question |
| | | | A | | 0..N | unsignedByte | Identifier of selected answer |
| | | | | @time | 0..1 | dateTime | Date/time when answer provided |

FIG. 17B

| | | | | | |
|---|---|---|---|---|---|
| QTA | | | 1 | | Question with text answer |
| | @id | | 1 | anyURI | Globally unique ID of question |
| | @expire | | 0..1 | dateTime | Expiration date/time for question |
| | Q | | 0..N | string | Text of question |
| | | @lang | 0..1 | xml:lang | Language of question |
| | A | | 0..N | String | Text of answer |
| | | @lang | 0..1 | xml:lang | Language of answer |
| | | @time | 0..1 | dateTime | Date/time when answer provided |
| QAA | | | 1 | | "Answer" with no question |
| | @id | | 1 | anyURI | Globally unique ID of question |
| | @expire | | 0..1 | dateTime | Expiration date/time for question |
| | A | | ??? | ??? | "Answer" |
| | | @time | 0..1 | dateTime | Date/time when answer provided |

FIG. 18A

| Element/Attribute | | | | | | Cardinality | XML datatype | Description |
|---|---|---|---|---|---|---|---|---|
| PDITable | | | | | | | | Table of PDI questions/answers |
| | @protocolVersion | | | | | 0..1 | hexBinary | Protocol version (major/minor) |
| | @pdiTableId | | | | | 1 | anyURI | Globally unique ID of PDI Table |
| | @pdiTableVersion | | | | | 1 | unsignedByte | PDI Table version (data) |
| | @time | | | | | 1 | dateTime | Time table questions last updated |
| | <choice> | | | | | 1..N | | Choice among QIA, QBA, QSA, QTA, QAA |
| | | QIA | | | | 1 | | Question with integer answer |
| | | | @id | | | 1 | anyURI | Globally unique ID of question |
| | | | @loEnd | | | 0..1 | int | Lower bound for answers |
| | | | @hiEnd | | | 0..1 | int | Upper bound for answers |
| | | | @expire | | | 0..1 | dateTime | Expiration date/time for question |
| | | | @xactionSetId | | | 0..1 | unsignedShort | ID for a transactional set of questions |
| | | | Q | | | 0..N | | |
| | | | | @text | | 1 | string | Text of question |
| | | | | @lang | | 0..1 | xml:lang | Language of question text |
| | | | A | | | 0..N | int | Answer to question |
| | | | | @time | | 0..1 | dateTime | Date/time when answer provided |
| | | QBA | | | | 1 | | Question with Boolean answer |
| | | | @id | | | 1 | anyURI | Globally unique ID of question |
| | | | @expire | | | 0..1 | dateTime | Expiration date/time for question |
| | | | @xactionSetId | | | 0..1 | unsignedShort | ID for a transactional set of questions |
| | | | Q | | | 0..N | | |
| | | | | @text | | 1 | string | Text of question |
| | | | | @lang | | 0..1 | xml:lang | Language of question text |
| | | | A | | | 0..2 | boolean | Answer to question |
| | | | | @time | | 0..1 | dateTime | Date/time when answer provided |
| | | QSA | | | | 1 | | Question with selection answer |
| | | | @id | | | 1 | anyURI | Globally unique ID of question |
| | | | @minChoices | | | 0..1 | unsignedByte | Minimum allowed number of selections |
| | | | @maxChoices | | | 0..1 | unsignedByte | Maximum allowed number of selections |
| | | | @expire | | | 0..1 | dateTime | Expiration date/time for question |
| | | | @xactionSetId | | | 0..1 | unsignedShort | ID for a transactional set of questions |
| | | | Q | | | 0..N | | |
| | | | | @text | | 1 | string | Text of question |
| | | | | @lang | | 0..1 | xml:lang | Language of question/Selection elements |
| | | | | Selection | | 2..N | string | Possible selection |
| | | | | | @id | 1 | unsignedByte | Identifier of selection, scoped by question |
| | | | A | | | 0..N | unsignedByte | Identifier of selected answer |
| | | | | @time | | 0..1 | dateTime | Date/time when answer provided |

FIG. 18B

| QTA | | | 1 | | Question with text answer |
|---|---|---|---|---|---|
| | @id | | 1 | anyURI | Globally unique ID of question |
| | @expire | | 0..1 | dateTime | Expiration date/time for question |
| | @xactionSetId | | 0..1 | unsignedShort | ID for a transactional set of questions |
| | Q | | 0..N | | |
| | | @text | 1 | string | Text of question |
| | | @lang | 0..1 | xml:lang | Language of question |
| | A | | 0..N | String | Text of answer |
| | | @lang | 0..1 | xml:lang | Language of answer |
| | | @time | 0..1 | dateTime | Date/time when answer provided |
| QAA | | | 1 | | "Answer" with no question |
| | @id | | 1 | anyURI | Globally unique ID of question |
| | @expire | | 0..1 | dateTime | Expiration date/time for question |
| | @xactionSetId | | 0..1 | unsignedShort | ID for a transactional set of questions |
| | A | | ??? | ??? | "Answer" |
| | | @time | 0..1 | dateTime | Date/time when answer provided |

FIG. 19

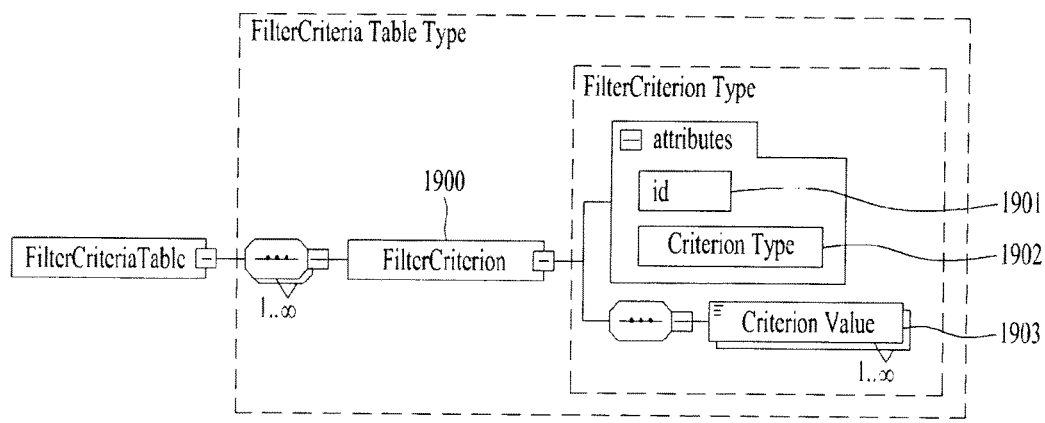

FIG. 21

Table of Filtering Criteria

| Element/Attribute | | | | Cardinality | XML datatype | Description |
|---|---|---|---|---|---|---|
| FilteringCriteria | | | | | | Filter criteria including the set of filter criterion |
| <choice> | | | | | | |
| | QIACriterion | | | 1..N | | Filter criterion with integer value |
| | | @id | | 1 | anyURI | Globally unique ID of question for filtering |
| | | CriterionValue | | 1..N | int | Integer value or lower end of range |
| | | | @extent | 0..1 | positiveInt | Number of integers in range (if > 1) |
| | QBACriterion | | | 1 | | Filter criterion with Boolean value |
| | | @id | | 1 | anyURI | Globally unique ID of question for filtering |
| | | CriterionValue | | 1 | boolean | Boolean value |
| | QSACriterion | | | 1 | | Filter criterion with selection value |
| | | @id | | 1 | anyURI | Globally unique ID of question for filtering |
| | | CriterionValue | | 1..N | unsignedByte | Identifier of selection |
| | QTACriterion | | | 1 | | Filter criterion with text valu |
| | | @id | | 1 | anyURI | Globally unique ID of question for filtering |
| | | CriterionValue | | 1..N | string | Text string |
| | | | @lang | 0..1 | xml:lang | Language of this criterion element |
| | QAACriterion | | | 1 | | Filter criterion for answer with no question |
| | | @id | | 1 | anyURI | Globally unique ID of question for filtering |
| | | CriterionValue | | 1..N | ??? | Value |

FIG. 22

| Element/Attribute(with @) | | | | | | Cardinality | XML datatype | Description |
|---|---|---|---|---|---|---|---|---|
| FilterCriteriaSet | | | | | | 1..N | | Filter criteria including the set of filter criterion |
| | IntegerTypeCriterion | | | | | 0..N | | Filter criterion with integer value |
| | | @id | | | | 1 | anyURI | Globally unique ID of question for filtering |
| | | Criterion | | | | 1..N | int | Value or lower end of range |
| | | | @maxInt | | | 0..1 | int | Lower bound for filter criterion |
| | | | @minInt | | | 0..1 | int | Upper bound for filter criterion |
| | BooleanTypeCriterion | | | | | 0..N | | Filter criterion with boolean value |
| | | @id | | | | 1 | anyURI | Globally unique ID of question for filtering |
| | | Criterion | | | | 1 | boolean | Value |
| | SelectionTypeCriterion | | | | | 0..N | | Filter criterion with selection value |
| | | @id | | | | 1 | anyURI | Globally unique ID of question for filtering |
| | | Criterion | | | | 1..N | unsignedByte | Identifier of selection criterion, scoped by question |
| | | | @lang | | | 0..1 | xml:lang | Language of this criterion element |
| | TextTypeCriterion | | | | | 0..N | | Filter criterion with text value |
| | | @id | | | | 1 | anyURI | Globally unique ID of question for filtering |
| | | Criterion | | | | 1..N | string | Value |
| | | | @lang | | | 0..1 | xml:lang | Language of this criterion element |
| | AnyTypeCriterion | | | | | 0..N | | Filter criterion with any type value, except integer, Boolean, selection, text type |
| | | @id | | | | 1 | anyURI | Globally unique ID of question for filtering |
| | | Criterion | | | | 1..N | base64Binary | Value |

FIG. 24

| Syntax | No. Bits | Format |
|---|---|---|
| pdiq_section () { | | |
|     table_id | 8 | TBD |
|     section_syntax_indicator | 1 | '0' |
|     private_indicator | 1 | '1' |
|     reserved | 2 | '11' |
|     section_length | 12 | uimsbf |
|     table_id_extension { | | |
|         protocol_version | 8 | uimsbf |
|         sequence_number | 8 | uimsbf |
|     } | | |
|     reserved | 2 | '11' |
|     PDIQ_data_version | 5 | uimsbf |
|     current_next_indicator | 1 | '1' |
|     section_number | 8 | uimsbf |
|     last_section_number | 8 | uimsbf |
|     service_id | 16 | uimsbf |
|     pdiq_bytes() | var | bslbf |
| } | | |

FIG. 25

| Syntax | No. of Bits | Format |
|---|---|---|
| PDI_table_section () { | | |
|     table_id | 8 | 0xTBD |
|     section_syntax_indicator | 1 | '0' |
|     private_indicator | 1 | '1' |
|     reserved | 2 | '11' |
|     section_length | 8 | uimsbf |
|     table_id_extension { | | |
|         PDI_protocol_version | 8 | uimsbf |
|         reserved | 8 | '11111111' |
|     } | | |
|     reserved | 2 | '11' |
|     version_number | 5 | uimsbf |
|     current_next_indicator | 1 | '1' |
|     section_number | 8 | uimsbf |
|     last_section_number | 8 | uimsbf |
|     num_questions | 8 | uimsbf |
|     for (i=0; i<num_questions; i++) { | | |
|         question_id_length | 8 | uimsbf |
|         question_id_value | var | |
|         question_text_length | 8 | uimsbf |
|         question_text | var | |
|         answer_type_code | 3 | uimsbf |
|         num_answers | 5 | uimsbf |
|         for (j=0; j<num_answers;j++) { | | |
|             answer_value_length | 8 | uimsbf |
|             answer_value | var | |
|         } | | |
|     } | | |
| } | | |

FIG. 26

| Syntax | No. of Bits | Format |
|---|---|---|
| PDI_table_section  () { | | |
|    table_id | 8 | 0xTBD |
|    section_syntax_indicator | 1 | '0' |
|    private_indicator | 1 | '1' |
|    reserved | 2 | '11' |
|    section_length | 8 | uimsbf |
|    table_id_extension { | | |
|       PDI_protocol_version | 8 | uimsbf |
|       answer_type_code | 3 | uimsbf |
|       reserved | 5 | '11111' |
|    } | | |
|    reserved | 2 | '11' |
|    version_number | 5 | uimsbf |
|    current_next_indicator | 1 | '1' |
|    section_number | 8 | uimsbf |
|    last_section_number | 8 | uimsbf |
|    num_questions | 8 | uimsbf |
|    for (i=0; i<num_questions; i++) { | | |
|       question_id_length | 8 | uimsbf |
|       question_id_value | var | |
|       question_text_length | 8 | uimsbf |
|       question_text | var | |
|       num_answers | 8 | uimsbf |
|       for (j=0; j<num_answers;j++) { | | |
|          answer_value_length | 8 | uimsbf |
|          answer_value | var | |
|       } | | |
|    } | | |
| } | | |

FIG. 27

| Syntax | No. of Bits | Format |
|---|---|---|
| PDI_table_section () { | | |
|    table_id | 8 | 0xTBD |
|    section_syntax_indicator | 1 | '0' |
|    private_indicator | 1 | '1' |
|    reserved | 2 | '11' |
|    section_length | 8 | uimsbf |
|    table_id_extension { | | |
|       PDI_protocol_version | 8 | uimsbf |
|       sequence_number | 8 | uimsbf |
|    } | | |
|    reserved | 2 | '11' |
|    version_number | 5 | uimsbf |
|    current_next_indicator | 1 | '1' |
|    section_number | 8 | uimsbf |
|    last_section_number | 8 | uimsbf |
|    num_questions | 8 | uimsbf |
|    for (i=0; i<num_questions; i++) { | | |
|       question_id_length | 8 | uimsbf |
|       question_id_value | var | |
|       question_text_length | 8 | uimsbf |
|       question_text | var | |
|       answer_type_code | 3 | uimsbf |
|       num_answers | 5 | uimsbf |
|       for (j=0; j<num_answers;j++) { | | |
|          answer_value_length | 8 | uimsbf |
|          answer_value | var | |
|       } | | |
|    } | | |
| } | | |

FIG. 28

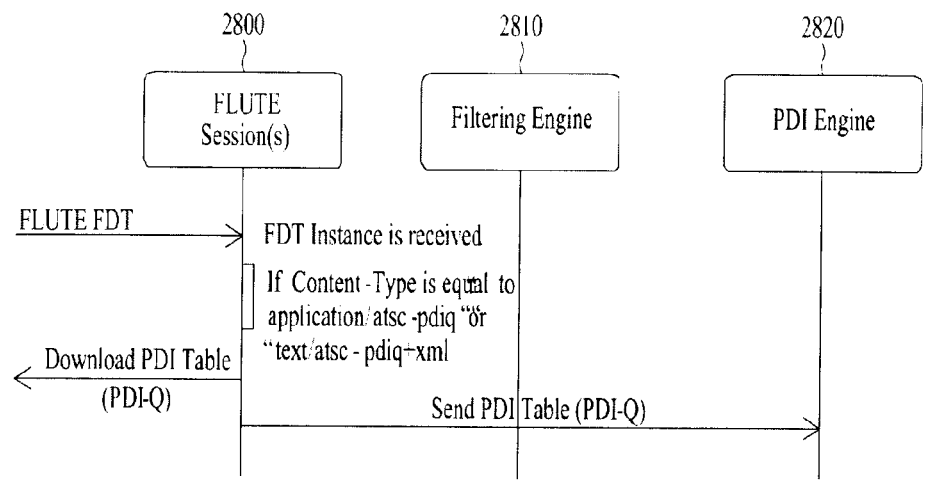

FIG. 30

| Syntax | No. Bits | Format |
|---|---|---|
| capabilities_descriptor () { | | |
|    descriptor_tag | 8 | 0xC5 |
|    descriptor_length | 8 | uimsbf |
|    Individual_capability_codes  (){ | | |
|      ... | | |
|      for (i=0; i< capability_code_count ; i++) } | | |
|      ... | | |
|      capability_code | 7 | uimsbf |
|      ... | | |
|    } | | |
|    ... | | |
| } | | |

FIG. 31

| Consumption model | Meaning |
|---|---|
| ... | ... |
| 0x03 | Push – The NRT service offers request-based content. Receivers are expected to offer the user a choice whether or not to automatically update content associated with the service. For such services, if the user selects the auto-update option, the receiver caches and service-related content and automatically updates files as new versions are made available. When the user returns to a requested Push service, content that had been preloaded is displayed. |
| 0x04 | PDI - The NRT service offers Personalization (including PDI-Q). Receivers are expected to download PDI Table associated with the service. For such services, the receiver automatically updates files as new versions are made available. |
| ... | ... |

FIG. 32

| Syntax | No. of Bits | Format |
|---|---|---|
| filter_criteria_descriptor () { | | |
|   descriptor_tag | 8 | 0xTBD |
|   descriptor_length | 8 | uimsbf |
|   num_filter_criteria | 8 | uimsbf |
|   for(i=0; i<num_filter_criteria; i++) { | | |
|     criterion_id_length | 8 | uimsbf |
|     criterion_id | var | var |
|     criterion_type_code | 3 | uimsbf |
|     num_criterion_values | 5 | uimsbf |
|     for (j=0; j< num_criterion_values;j++) { | | |
|       criterion_value_length | 8 | uimsbf |
|       criterion_value | var | |
|     } | | |
|   } | | |
| } | | |

FIG. 33

| Syntax | No. of Bits | Format |
|---|---|---|
| filter_criteria_descriptor (){ | | |
|    descriptor_tag | 8 | 0xTBD |
|    descriptor_length | 8 | uimsbf |
|    num_filter_criteria | 8 | uimsbf |
|    for (i=0; i<num_filter_criteria; i++) { | | |
|      criterion_type_code | 3 | uimsbf |
|      criterion_id_length | 8 | uimsbf |
|      criterion_id | var | var |
|      num_criterion_values | 5 | uimsbf |
|      for (j=0; i<num_filter_criteria; j++) { | | |
|         criterion_value_length | 8 | uimsbf |
|         criterion_value | var | |
|      } | | |
|    } | | |
| } | | |

FIG. 35

| Table(s) Requested | Query Term |
|---|---|
| PSIP Set | ?table=PSIP |
| VCT | ?table=VCT |
| EIT | ?table=EIT[&chan=<chan_id>] |
| ETT | ?table=ETT[&chan=<chan_id>][&etmid=<ETM_id>] |
| Basic NRT Set | ?table=BASIC-SET[&chan=<chan_id>] |
| Extended NRT Set | ?table=EXT-SET[&chan=<chan_id>] |
| SMT | ?table=SMT[&chan=<chan_id>] |
| NRT-IT | ?table=NRT-IT[&chan=<chan_id>] [&svc=<svc_id>] |
| TFT | ?table=TFT[&chan=<chan_id>] [&svc=<svc_id>] |
| ILT | ?table=ILT[&chan=<chan_id>] |
| PIT and PTCT | ?table=PIT+PTCT[&chan=<chan_id>] |
| PDIT | ?table=PDIT[&chan=<chan_id>] |

FIG. 37

| Element/Attribute (with @) | | No. allowed | Data Type | Description & Value |
|---|---|---|---|---|
| UrlList | | | | List of potentially useful URLs |
| | TptUrl | 0..N | anyURI | URL of TPT for future segment |
| | NrtSignalingUrl | 0..1 | anyURI | URL of NRT Signaling Server |
| | UrsUrl | 0..1 | anyURI | URL of Usage Reporting Server |
| | PDIUrl | 0..1 | anyURI | URL of PDI Server |

FIG. 38

| Element/Attribute (with @) | No. allowed | Data Type | Description & Value |
|---|---|---|---|
| ... | ... | ... | |
| TPT | | | |
|   TDO | 1..N | | TDO for this segment |
|     @appID | 1 | unsignedShort | Application ID, for reference by trigger |
|     ... | ... | ... | |
|     FilterCriterion | 0..N | | Filter criteria for this TDO |
|       @id | 1 | anyURI | Identifier for this filter criterion |
|       @criterionType | 1 | unsignedByte | Type of this filter criterion |
|       criterionValue | 1..N | base64Binary | Filter criterion value represented by @criterionType |
|     ContentItem | 0..N | | Content item used by this TDO |
|       ... | ... | | |
|       FilterCriterion | 0..N | | Filter criteria for this TDO |
|         @id | 1 | anyURI | Identifier for this filter criterion |
|         @criterionType | 1 | unsignedByte | Type of this filter criterion |
|         criterionValue | 1..N | base64Binary | Filter criterion value represented by @criterionType |
|     Event | 1..N | | Event targeted to this TDO |
|   ... | ... | ... | |

FIG. 43

| targeting_criterion_type_code | targeting_value_length | targeting_value |
|---|---|---|
| 0x00 | N/A | Reserved |
| 0x01 | 3 | Geographical location as defined in Table 6.21 of A/65, using only the low order 3 bytes. |
| 0x02 | var | Alphanumeric postal code as defined in section 6.7.2 of A/65, using the number of bytes appropriate to the region (up to 8) |
| 0x03 | 2 | Demographic category as defined in Table 6.18 of A/65, using only the low order 2 bytes. |
| 0x04 0x0F | N/A | Reserved for future ATSC use |
| 0x10 0x1F | N/A | Available for private use |

FIG. 44

Question ID: atsc.org/PDIQ/location-code
Question type: QTA
Question text: "What is your location code?"
Registration date: [TBD]
Organization: ATSC
Contact information: [TBD]

FIG. 45

Question ID: atsc.org/PDIQ/state
Question type: QTA
Question xactionSetId: 1
Question text: "What state are you located in?"
Registration date: [TBD]
Organization: ATSC
Contact information: [TBD]

FIG. 46

Question ID: atsc.org/PDIQ/county
Question type: QTA
Question xactionSetId: 1
Question text: "What county are you located in?"
Registration date: [TBD]
Organization: ATSC
Contact information: [TBD]

FIG. 47

Question ID: atsc.org/PDIQ/sector
Question type: QSA
Question xactionSetId: 1
Question text: "What part of your county are you located in?"
Selections:
   NorthWest (1)
   North Central (2)
   NorthEast (3)
   West Central (4)
   Center (5)
   East Central (6)
   SouthWest (7)
   South Central (8)
   SouthEast (9)
Registration date: [TBD]
Organization: ATSC
Contact information: [TBD]

FIG. 48

Question ID: atsc.org/PDIQ/ZIPcode
Question type: QTA
Question text: "What is your 5-digit ZIP code?"
[QSA selections:]
Registration date: [TBD]
Organization: ATSC
Contact information: [TBD]

FIG. 49

Question ID: atsc.org/PDIQ/postalcode
Question type: QTA
Question text: "What is your postal code?"
Registration date: [TBD]
Organization: ATSC
Contact information: [TBD]

FIG. 50

Question ID: atsc.org/PDIQ/gender
Question type: QSA
Question text: "What is your gender?"
Selections (with Selection ID values):
   Male (1)
   Female (2)
Registration date: [TBD]
Organization: ATSC
Contact information: [TBD]

FIG. 51

Question ID: atsc.org/PDIQ/age-bracket
Question type: QSA
Question text: "What age bracket are you in?"
Selections:
    Ages 2-5 (1)
    Ages 6-11 (2)
    Ages 12-17 (3)
    Ages 18-34 (4)
    Ages 35-49 (5)
    Ages 50-54 (6)
    Ages 55-64 (7)
    Ages 65+ (8)
Registration date: [TBD]
Organization: ATSC
Contact information: [TBD]

FIG. 52

Question ID: atsc.org/PDIQ/working
Question type: QSA
Question text: "Are you working at a paying job?"
QSA selections:
    Yes (1)
    No (2)
Registration date: [TBD]
Organization: ATSC
Contact information: [TBD]

FIG. 53

Question ID: atsc.org/PDIQ/working
Question type: QBA
Question text: "Are you working at a paying job?"
Registration date: [TBD]
Organization: ATSC
Contact information: [TBD]

FIG. 54

| String getPDITableList() | |
|---|---|
| Description | Return an XML structure with a list of the PDI tables, giving the pdiTableId for each one. The XML structure is as following XML schema. a pdiTableId element which has a single pdiTableId child element, with cardinality 0 to unbounded. (The case of 0 pdiTableId instances would indicate that the broadcaster has not provided a PDI Table.) <br><br> <table><tr><th>Element/Attribute</th><th>cardinality</th><th>XML datatype</th><th>Description</th></tr><tr><td>PDITableList</td><td></td><td></td><td>Table of PDI questions/answers</td></tr><tr><td>pdiTableId</td><td>0..N</td><td>anyURI</td><td>Globally unique ID of PDI Table</td></tr></table> |
| Arguments | pdiTableId — A globally unique identifier of the PDI Table, in the form of a URI |

FIG. 55

| String getPDITable(String pdiTableId) | |
|---|---|
| Description | Return the PDI Table XML document for the receiver. Each pdiTable is associated with an identified by the globally unique pdiTableId identifier provided as input to the method. The returned value is a string that contains the serialized PDI Table XML instances, optionally containing PDI-Q or PDI-A XML instances. |
| Arguments | pdiTableId     A globally unique identifier of the PDI Table, in the form of a URI |

FIG. 56

| String getPDIA(String pdiTableId) | |
|---|---|
| Description | Return the PDI-A XML document for the receiver. Each pdiTable is associated with an identified by the globally unique pdiTableId identifier provided as input to the method. The returned value is a string that contains the serialized PDI-A XML instances. |
| Arguments | pdiTableId | A globally unique identifier of the PDI Table, in the form of a URI |

METHOD AND APPARATUS FOR PROCESSING DIGITAL SERVICE SIGNAL

Pursuant to 35 U.S.C. §119(e), this application claims the benefit of U.S. Provisional Applications Nos. 61/694,761, filed on Aug. 29, 2012, 61/697,272, filed on Sep. 5, 2012 and 61/706,096, filed on Sep. 26, 2012, which is hereby incorporated by reference as if fully set forth herein.

BACKGROUND OF THE INVENTION

Field of the Invention

The present invention relates a method and apparatus for processing a digital service signal, and more particularly, to a method and apparatus for processing a digital service signal for a personalization service.

Discussion of the Related Art

Along with developments of digital technologies, as digital broadcast services have been supplied, technologies for supplying higher-quality broadcast services have drawn attention.

Recently, broadcast technologies based on a non real time (NRT) service have been developed in order to effectively use a broadcast network. The NRT service is a next generation broadcast technology service for transmitting a predetermined amount of content in the form of file using some width bands of a terrestrial broadcast network.

In particular, the advanced television system committee (ATSC) includes ATSC-NRT as a technology for supplying an NRT service via transmission of terrestrial digital television (TV) broadcast. The ATSC-NRT is used to supply a video on demand (VOD) service using a terrestrial digital TV broadcast network based on download & play technologies. A conventional DTV terrestrial service is limited to limited reception and to supply real time broadcast. However, the NRT service may supply various contents as well as mobile broadcast at a point of time that is desired by a user, instead of a predetermined period of time. In detail, the NRT service may supply various DTV services such as a push VOD service, a target advertisement service, etc. That is, due to the supply of the NRT service, spatial and temporal regions of terrestrial broadcast have collapsed and a choice of content has been turned over to a user from a broadcaster.

As it is possible to supply such an NRT service, there is a user's increasing demand to more actively use content and an increasing need to supply a broadcast service by a broadcaster according to users' demands.

However, a current broadcast system collects user information and does not establish a system for processing the collected user information, and thus, it is difficult to effectively supply broadcast services proper to users.

Accordingly, there is a limit to supply an optimal service for users, and thus, a user receives content that is not desired by the user, thereby decreasing user convenience.

SUMMARY OF THE INVENTION

An object of the present invention devised to solve the problem lies on selecting and providing content according to a user's demand based on user information in a non real time (NRT) service.

The object of the present invention can be achieved by providing a method of processing digital service signals according to the present invention includes receiving a PDI (Profiles, Demographics, Interests) table, wherein the PDI table includes at least one question element having attributes of a PDI question, wherein the PDI table further includes a table Id field identifying the PDI table, a table version field indicating a version of the PDI table and a time field indicating a date and a time of the most recent change to the at least one PDI question, extracting the PDI question from the PDI table, wherein each of the at least one question element has a different type, receiving a PDI answer according to the extracted PDI question, receiving filtering criteria information, filtering contents of the digital service signal by comparing the filtering criteria information against the received PDI answer and downloading the filtered contents, wherein the type of the at least one question element indicates a type for the PDI question with one of an integer answer, a Boolean answer, a selection answer, a text answer and an answer with no PDI question.

Preferably, a type of the filtering criteria information indicates a type for the PDI question with one of an integer answer, a Boolean answer, a selection answer, a text answer and an answer with no PDI question, the filtering further includes determining whether the filtering criteria information matches the PDI answer.

Preferably, the PDI table is carried via an IP subnet.

Preferably, the method further includes sending requests including signatures of the contents periodically to an automatic content recognition (ACR) server and receiving responses including triggers for receiving the URLList information and a TPT including the filtering criteria information from the ACR server.

Preferably, when the PDI table is delivered via the broadcast stream, the method further includes receiving a table section including sequence number information to distinguish the PDI table and receiving the PDI table using the sequence number information of the table section.

Preferably, the PDI table further includes at least one of a protocol version field indicating a protocol version of the PDI table, an expire field indicating an expiration date and time of each of the PDI question and a xactionSetId field indicating whether each of the PDI question belongs to a set of the PDI questions.

Preferably, the at least one question element further includes a situation field indicating information of location and time, wherein the situation field includes a location field including information of a latitude and a longitude.

Preferably, the method further includes storing a history of service usage; monitoring the service usage periodically or by receiving a request signal and applying the monitoring result to update the contents.

In another aspect of the present invention, provided herein is a method of processing digital service signals according to the present invention includes generating a PDI table, wherein the PDI table includes at least one question element having attributes a PDI question, wherein the PDI table further includes a table Id field identifying the PDI table, a table version field indicating a version of the PDI table and a time field indicating a date and a time of the most recent change to the PDI question and generating a filtering criteria information and transmitting the PDI table, the filtering criteria information and contents of the digital service signal, wherein the type of the at least one question element indicates a type for the PDI question with one of an integer answer, a Boolean answer, a selection answer, a text answer and an answer with no PDI question.

Preferably, when the PDI table is transmitted via the broadcast stream, the method further includes compressing the generated PDI table, dividing the compressed PDI table into blocks and inserting the blocks into sections carried in the Service Signaling Channel (SSC), wherein the sections includes sequence number information to distinguish the PDI table.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4 is a diagram showing the syntax of a content identifier (ID) according to an embodiment of the present invention;

FIG. 17A illustrates a PDI table according to another embodiment of the present invention;

FIG. 17B illustrates a PDI table according to another embodiment of the present invention;

FIG. 18A illustrates a PDI table according to another embodiment of the present invention;

FIG. 18B illustrates a PDI table according to another embodiment of the present invention;

FIG. 19 is a diagram illustrating a filtering criteria table according to an embodiment of the present invention;

FIG. 21 is a diagram illustrating a filtering criteria table according to another embodiment of the present invention;

FIG. 22 is a diagram illustrating a filtering criteria table according to another embodiment of the present invention;

FIG. 24 is a diagram illustrating a PDI table section according to an embodiment of the present invention;

FIG. 25 is a diagram illustrating a PDI table section according to another embodiment of the present invention;

FIG. 26 is a diagram illustrating a PDI table section according to another embodiment of the present invention;

FIG. 27 is a diagram illustrating a PDI table section according to another embodiment of the present invention;

FIG. 28 is a flowchart of a digital broadcast system according to another embodiment of the present invention;

FIG. 30 is a diagram illustrating capabilities descriptor syntax according to an embodiment of the present invention;

FIG. 31 is a diagram illustration a consumption model according to an embodiment of the present invention;

FIG. 32 is a diagram illustrating filtering criteria descriptor syntax according to an embodiment of the present invention;

FIG. 33 is a diagram illustrating filtering criteria descriptor syntax according to another embodiment of the present invention;

FIG. 35 is a diagram illustrating an HTTP request table according to an embodiment of the present invention;

FIG. 37 is a diagram illustrating a URL list table according to an embodiment of the present invention;

FIG. 38 is a diagram illustrating a TPT according to an embodiment of the present invention;

FIG. 43 is a diagram illustrating a receiver targeting criteria table according to an embodiment of the present invention;

FIG. 44 is a diagram illustrating a pre-registered PDI question according to an embodiment of the present invention;

FIG. 45 is a diagram illustrating a pre-registered PDI question according to another embodiment of the present invention;

FIG. 46 is a diagram illustrating a pre-registered PDI question according to another embodiment of the present invention;

FIG. 47 is a diagram illustrating a pre-registered PDI question according to another embodiment of the present invention;

FIG. 48 is a diagram illustrating a pre-registered PDI question according to another embodiment of the present invention;

FIG. 49 is a diagram illustrating a pre-registered PDI question according to another embodiment of the present invention;

FIG. 50 is a diagram illustrating a pre-registered PDI question according to another embodiment of the present invention;

FIG. 51 is a diagram illustrating a pre-registered PDI question according to another embodiment of the present invention;

FIG. 52 is a diagram illustrating a pre-registered PDI question according to another embodiment of the present invention;

FIG. 53 is a diagram illustrating a pre-registered PDI question according to another embodiment of the present invention;

FIG. 54 is a diagram illustrating an application programming interface (PDI API) according to an embodiment of the present invention;

FIG. 55 is a diagram showing PDI API according to another embodiment of the present invention;

FIG. 56 is a diagram showing PDI API according to another embodiment of the present invention;

DETAILED DESCRIPTION OF THE INVENTION

Reference will now be made in detail to the exemplary embodiments of the present invention with reference to the accompanying drawings. The configuration and operation of the present invention will be understood by the embodiments of the present invention and the technical spirit, core configuration, and operation of the present invention should not be construed as being limited to the embodiments set forth herein.

Most of the terms used herein are general terms that have been widely used in the technical art to which the present invention pertains. However, some of the terms used herein may be created reflecting intentions of technicians in this art, precedents, or new technologies. Also, some of the terms used herein may be arbitrarily chosen by the present applicant. In this case, these terms are defined in detail below. Accordingly, the specific terms used herein should be understood based on the unique meanings thereof and the whole context of the present invention.

Figure 1:
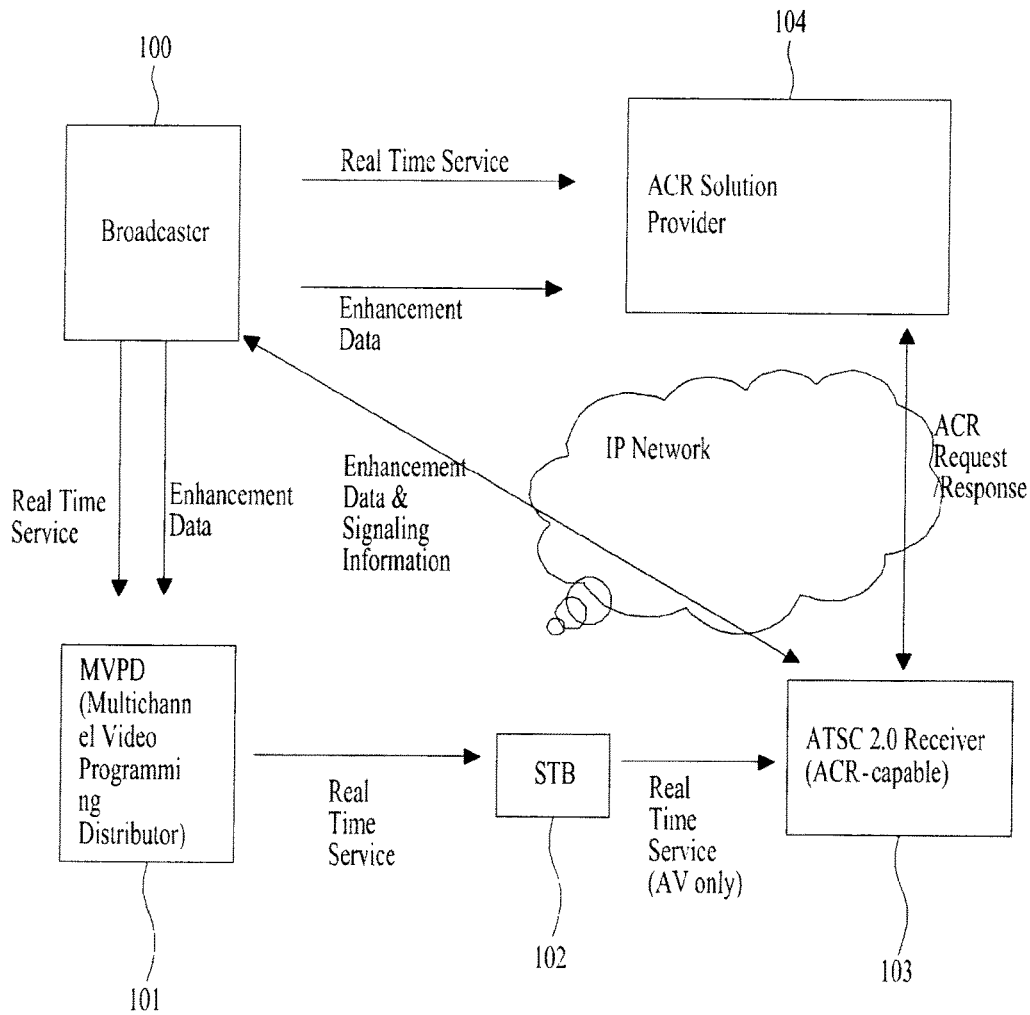
FIG. 1 is a diagram showing an automatic content recognition (ACR) based enhanced television (ETV) service system.

FIG. 1 is a diagram showing an automatic content recognition (ACR) based enhanced television (ETV) service system.

The ACR based ETV service system shown in FIG. 1 may include a broadcaster or content provider 100, a multichannel video programming distributor (MVPD) 101, a set-top box (STB) 102, a receiver 103 such as a digital TV receiver, and an ACR server (or an ACR Solution Provider) 104. The receiver 103 may operate according to definition of the advanced television system committee (ATSC) and may support an ACR function. A real-time broadcast service 110 may include A/V content.

A digital broadcast service may be largely divided into a terrestrial broadcast service provided by the broadcaster 100 and a multi-channel broadcast service, such as a cable broadcast or a satellite broadcast, provided by the MVPD 101. The broadcaster 100 may transmit a real-time broadcast service 110 and enhancement data (or additional data) 120 together. In this case, as shown in FIG. 1, the receiver 103 may receive only the real-time broadcast service 110 and may not receive the enhancement data 120 through the MVPD 101 and the STB 102.

Accordingly, in order to receive the enhancement data 120, the receiver 103 analyzes and processes A/V content output as the real-time broadcast service 110 and identifies broadcast program information and/or broadcast program related metadata. Using the identified broadcast program information and/or broadcast program related metadata, the receiver 103 may receive the enhancement data from the broadcaster 100 or the ACR server 104 (140). In this case, the enhancement data may be transmitted via an Internet protocol (IP) network 150.

If the enhancement data is received from a separate ACR server 104 (140), in a mechanism between the ACR server 104 and the receiver 103, a request/response model among triggered declarative object (TDO) models defined in the ATSC 2.0 standard may be applied to the ACR server 104. Hereinafter, the TDO and request/response model will be described.

TDO indicates additional information included in broadcast content. TDO serves to timely triggers additional information within broadcast content. For example, if an audition program is broadcast, a current ranking of an audition participant preferred by a viewer may be displayed along with the broadcast content. At this time, additional information of the current rating of the audition participant may be a TDO. Such a TDO may be changed through interaction with viewers or provided according to viewer's intention.

In the request/response ACR model of the standard ATSC 2.0, the digital broadcast receiver 103 is expected to generate signatures of the content periodically (e.g. every 5 seconds) and send requests containing the signatures to the ACR server 104. When the ACR server 104 gets a request from the digital broadcast receiver 103, it returns a response. The communications session is not kept open between request/response instances. In this model, it is not feasible for the ACR server 104 to initiate messages to the client.

As digital satellite broadcasting has been introduced, digital data broadcasting has appeared as a new supplementary service. An interactive data broadcast, which is a representative interactive service, may transmit not only a data signal but also an existing broadcast signal to a subscriber so as to provide various supplementary services.

A digital data broadcast may be largely divided into an independent service using a virtual channel and a broadcast-associated service via an enhanced TV (ETV). The independent service includes only text and graphics without a broadcast image signal and is provided in a format similar to an existing Internet web page. Representative examples of the independent service include a weather and stock information provision service, a TV banking service, a commercial transaction service, etc. The broadcast-associated service transmits not only a broadcast image signal but also additional text and graphic information. A viewer may obtain information regarding a viewed broadcast program via a broadcast-associated service. For example, there is a service for enabling a viewer to view a previous story or a filming location while viewing a drama.

In a broadcast-associated service of a digital data broadcast, an ETV service may be provided based on ACR technology. ACR means technology for automatically recognizing content via information hidden in the content when a device plays audio/video (A/V content) back.

In implementation of ACR technology, a watermarking or fingerprinting scheme may be used to acquire information regarding content. Watermarking refers to technology for inserting information indicating a digital content provider into digital content. Fingerprinting is equal to watermarking in that specific information is inserted into digital content and is different therefrom in that information regarding a content purchaser is inserted instead of information regarding a content provider.

Figure 2:
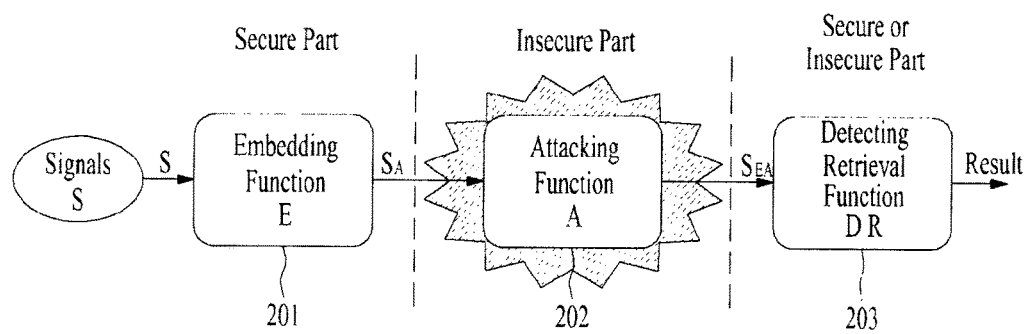
FIG. 2 is a diagram showing the flow of digital watermarking technology according to an embodiment of the present invention.

FIG. 2 is a diagram showing the flow of digital watermarking technology according to an embodiment of the present invention.

As digital satellite broadcasting has been introduced, digital data broadcasting has appeared as a new supplementary service. An interactive data broadcast, which is a representative interactive service, may transmit not only a data signal but also an existing broadcast signal to a subscriber so as to provide various supplementary services.

A digital data broadcast may be largely divided into an independent service using a virtual channel and a broadcast-associated service via an enhanced TV (ETV). The independent service includes only text and graphics without a broadcast image signal and is provided in a format similar to an existing Internet web page. Representative examples of the independent service include a weather and stock information provision service, a TV banking service, a commercial transaction service, etc. The broadcast-associated service transmits not only a broadcast image signal but also additional text and graphic information. A viewer may obtain information regarding a viewed broadcast program via a broadcast-associated service. For example, there is a service for enabling a viewer to view a previous story or a filming location while viewing a drama.

In a broadcast-associated service of a digital data broadcast, an ETV service may be provided based on ACR technology. ACR means technology for automatically recognizing content via information hidden in the content when a device plays audio/video (A/V content) back.

In implementation of ACR technology, a watermarking or fingerprinting scheme may be used to acquire information regarding content. Watermarking refers to technology for inserting information indicating a digital content provider into digital content. Fingerprinting is equal to watermarking in that specific information is inserted into digital content and is different therefrom in that information regarding a content purchaser is inserted instead of information regarding a content provider.

Hereinafter, watermarking technology will be described with reference to FIG. 2 in detail.

Digital watermarking is the process of embedding information into a digital signal in a way that is difficult to remove. The signal may be audio, pictures or video, for example. If the signal is copied, then the information is also carried in the copy. A signal may carry several different watermarks at the same time.

In visible watermarking, the information is visible in the picture or video. Typically, the information is text or a logo which identifies the owner of the media. When a television broadcaster adds its logo to the corner of transmitted video, this is also a visible watermark.

In invisible watermarking, information is added as digital data to audio, picture or video, but it cannot be perceived as such, although it may be possible to detect that some amount of information is hidden. The watermark may be intended for widespread use and is thus made easy to retrieve or it may be a form of steganography, where a party communicates a secret message embedded in the digital signal. In either case, as in visible watermarking, the objective is to attach ownership or other descriptive information to the signal in a way that is difficult to remove. It is also possible to use hidden embedded information as a means of covert communication between individuals.

One application of watermarking is in copyright protection systems, which are intended to prevent or deter unauthorized copying of digital media. In this use a copy device retrieves the watermark from the signal before making a copy; the device makes a decision to copy or not depending on the contents of the watermark. Another application is in source tracing.

A watermark is embedded into a digital signal at each point of distribution. If a copy of the work is found later, then the watermark can be retrieved from the copy and the source of the distribution is known. This technique has been reportedly used to detect the source of illegally copied movies.

Annotation of digital photographs with descriptive information is another application of invisible watermarking.

While some file formats for digital media can contain additional information called metadata, digital watermarking is distinct in that the data is carried in the signal itself.

The information to be embedded is called a digital watermark, although in some contexts the phrase digital watermark means the difference between the watermarked signal and the cover signal. The signal where the watermark is to be embedded is called the host signal.

A watermarking system is usually divided into three distinct steps, embedding (201), attack (202) and detection (or extraction; 203).

In embedding (201), an algorithm accepts the host and the data to be embedded and produces a watermarked signal.

The watermarked signal is then transmitted or stored, usually transmitted to another person. If this person makes a modification, this is called an attack (202). While the modification may not be malicious, the term attack arises from copyright protection application, where pirates attempt to remove the digital watermark through modification. There are many possible modifications, for example, lossy compression of the data, cropping an image or video, or intentionally adding noise.

Detection (203) is an algorithm which is applied to the attacked signal to attempt to extract the watermark from it. If the signal was unmodified during transmission, then the watermark is still present and it can be extracted. In robust watermarking applications, the extraction algorithm should be able to correctly produce the watermark, even if the modifications were strong. In fragile watermarking, the extraction algorithm should fail if any change is made to the signal.

A digital watermark is called robust with respect to transformations if the embedded information can reliably be detected from the marked signal even if degraded by any number of transformations. Typical image degradations are JPEG compression, rotation, cropping, additive noise and quantization. For video content temporal modifications and MPEG compression are often added to this list. A watermark is called imperceptible if the watermarked content is perceptually equivalent to the original, unwatermarked content. In general it is easy to create robust watermarks or imperceptible watermarks, but the creation of robust and imperceptible watermarks has proven to be quite challenging. Robust imperceptible watermarks have been proposed as tool for the protection of digital content, for example as an embedded 'no-copy-allowed' flag in professional video content.

Digital watermarking techniques can be classified in several ways.

First, a watermark is called fragile if it fails to be detected after the slightest modification (Robustness). Fragile watermarks are commonly used for tamper detection (integrity proof). Modifications to an original work that are clearly noticeable are commonly not referred to as watermarks, but as generalized barcodes. A watermark is called semi-fragile if it resists benign transformations but fails detection after malignant transformations. Semi-fragile watermarks are commonly used to detect malignant transformations. A watermark is called robust if it resists a designated class of transformations. Robust watermarks may be used in copy protection applications to carry copy and access control information.

Second, a watermark is called imperceptible if the original cover signal and the marked signal are (close to) perceptually indistinguishable (Perceptibility). A watermark is called perceptible if its presence in the marked signal is noticeable, but non-intrusive.

Third, about a capacity, the length of the embedded message determines two different main classes of watermarking schemes:

The message is conceptually zero-bit long and the system is designed in order to detect the presence or the absence of the watermark in the marked object. This kind of watermarking schemes is usually referred to as Italic zero-bit or Italic presence watermarking schemes. Sometimes, this type of watermarking scheme is called 1-bit watermark, because a 1 denotes the presence (and a 0 the absence) of a watermark.

The message is a n-bit-long stream (, with n=|m|) or M={0,1}n and is modulated in the watermark. These kinds of schemes are usually referred to as multiple bit watermarking or non zero-bit watermarking schemes.

Forth, there are several ways for the embedding step. A watermarking method is referred to as spread-spectrum if the marked signal is obtained by an additive modification. Spread-spectrum watermarks are known to be modestly robust, but also to have a low information capacity due to host interference. A watermarking method is said to be of quantization type if the marked signal is obtained by quantization. Quantization watermarks suffer from low robustness, but have a high information capacity due to rejection of host interference. A watermarking method is referred to as amplitude modulation if the marked signal is embedded by additive modification which is similar to spread spectrum method but is particularly embedded in the spatial domain.

Figure 3:
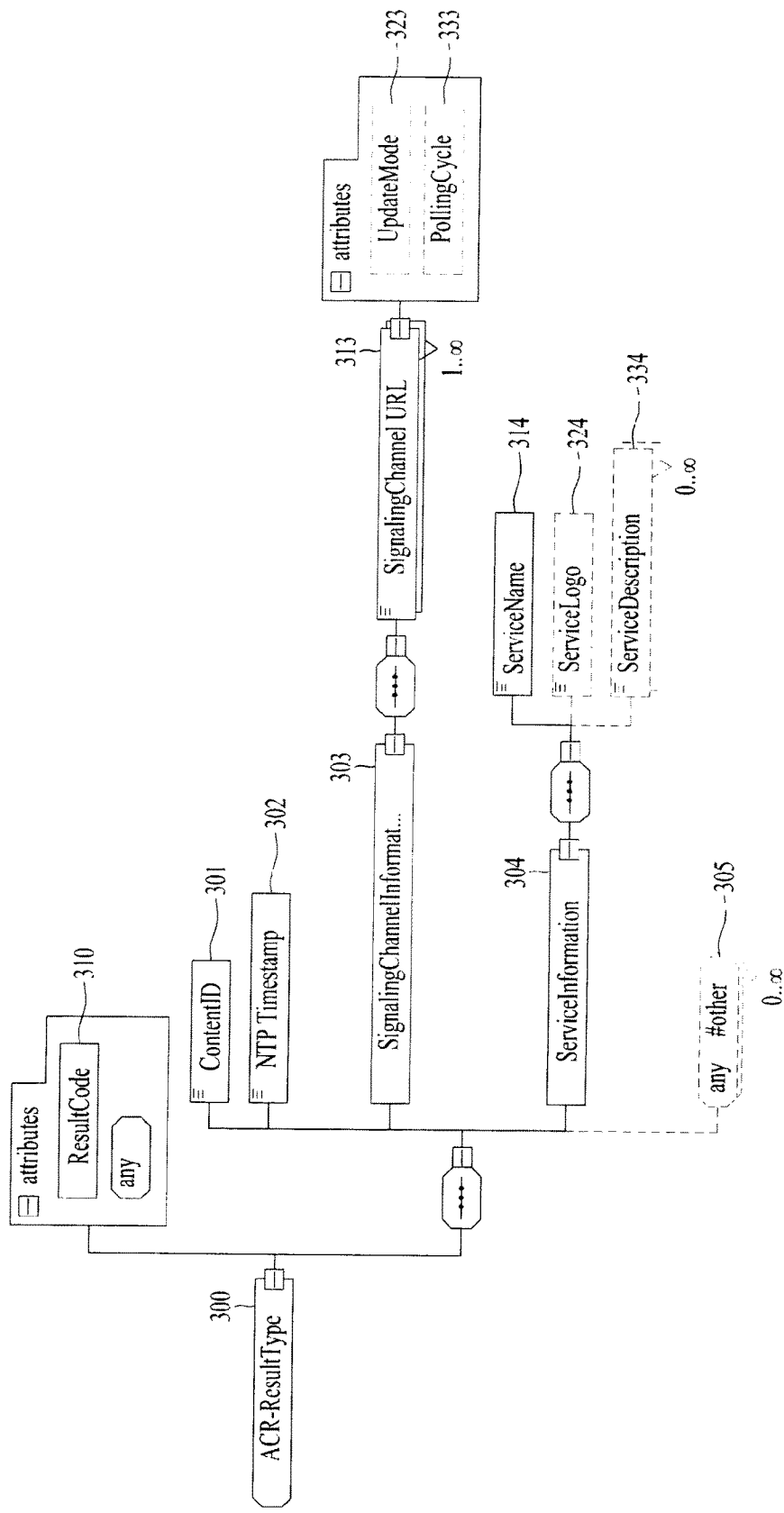
FIG. 3 is a diagram showing an ACR query result format according to an embodiment of the present invention.

FIG. 3 is a diagram showing an ACR query result format according to an embodiment of the present invention.

According to the existing ACR service processing system, if a broadcaster transmits content for a real-time service and enhancement data for an ETV service together and a TV receiver receives the content and the ETV service, the content for the real-time service may be received but the enhancement data may not be received.

In this case, according to the embodiment of the present invention, it is possible to solve problems of the existing ACR processing system through an independent IP signaling channel using an IP network. That is, a TV receiver may receive content for a real-time service via an MVPD and receive enhancement data via an independent IP signaling channel.

In this case, according to the embodiment of the present invention, an IP signaling channel may be configured such that a PSIP stream is delivered and processed in the form of a binary stream. At this time, the IP signaling channel may be configured to use a pull method or a push method.

The IP signaling channel of the pull method may be configured according to an HTTP request/response method. According to the HTTP request/response method, a PSIP binary stream may be included in an HTTP response signal for an HTTP request signal and transmitted through SignalingChannelURL. In this case, a polling cycle may be periodically requested according to Polling_cycle in metadata delivered as an ACR query result. In addition, information about a time and/or a cycle to be updated may be included in a signaling channel and transmitted. In this case, the receiver may request signaling information from a server based on update time and/or cycle information received from the IP signaling channel.

The IP signaling channel of the push method may be configured using an XMLHTTPRequest application programming interface (API). If the XMLHTTPRequest API is used, it is possible to asynchronously receive updates from the server. This is a method of, at a receiver, asynchronously requesting signaling information from a server through an XMLHTTPRequest object and, at the server, providing signaling information via this channel in response thereto if signaling information has been changed. If there is a limitation in standby time of a session, a session timeout response may be generated and the receiver may recognize the session timeout response, request signaling information again and maintain a signaling channel between the receiver and the server.

In order to receive enhancement data through an IP signaling channel, the receiver may operate using watermarking and fingerprinting. Fingerprinting refers to technology for inserting information about a content purchaser into content instead of a content provider. If fingerprinting is used, the receiver may search a reference database to identify content. A result of identifying the content is called an ACR query result. The ACR query result may include a query provided to a TV viewer and answer information of the query in order to implement an ACR function. The receiver may provide an ETV service based on the ACR query result.

Information about the ACR query result may be inserted/embedded into/in A/V content on a watermark based ACR system and may be transmitted. The receiver may extract and acquire ACR query result information through a watermark extractor and then provide an ETV service. In this case, an ETV service may be provided without a separate ACR server and a query through an IP network may be omitted.

FIG. 3 is a diagram of an XML scheme indicating an ACR query result according to an embodiment of the present invention. As shown in FIG. 3, the XML format of the ACR query result may include a result code element 310 and the ACR query result type 300 may include a content ID element 301, a network time protocol (NTP) timestamp element 302, a signaling channel information element 303, a service information element 304 and an other-identifier element 305. The signaling channel information element 303 may include a signaling channel URL element 313, an update mode element 323 and a polling cycle element 333, and the service information element 304 may include a service name element 314, a service logo element 324 and a service description element 334.

Hereinafter, the diagram of the XML schema of the ACR query result shown in FIG. 3 will be described in detail and an example of the XML schema will be described.

The result code element 310 may indicate a result value of an ACR query. This may indicate query success or failure and a failure reason if a query fails in the form of a code value. For example, if the value of the result code element 310 is 200, this may indicate that a query succeeds and content information corresponding thereto is returned and, if the value of the result code element 310 is 404, this may indicate that content is not found.

The content ID element 301 may indicate an identifier for globally and uniquely identifying content and may include a global service identifier element, which is an identifier for identifying a service.

The NTP timestamp element 302 may indicate that a time of a specific point of a sample frame interval used for an ACR query is provided in the form of an NTP timestamp. Here, the specific point may be a start point or end point of the sample frame. NTP means a protocol for synchronizing a time of a computer with a reference clock through the Internet and may be used for time synchronization between a time server and client distributed on a computer network. Since NTP uses a universal time coordinated (UTC) time and ensures accuracy of 10 ms, the receiver may accurately process a frame synchronization operation.

The signaling channel information element 303 may indicate access information of an independent signaling channel on an IP network for an ETV service.

More specifically, the signaling channel URL element 313, which is a sub element of the signaling channel information element 303, may indicate URL information of a signaling channel. The signaling channel URL element 313 may include an update mode element 323 and a polling cycle element 333 as sub elements. The update mode element 323 may indicate a method of acquiring information via an IP signaling channel. For example, in a pull mode, the receiver may periodically perform polling according to a pull method to acquire information and, in a push mode, the server may transmit information to the receiver according to a push method. The polling cycle element 333 may indicate a basic polling cycle value of the receiver according to a pull method if the update mode element 323 is a pull mode. Then, the receiver may specify a basic polling cycle value and transmit a request signal to the server at a random time interval, thereby preventing requests from overloading in the server.

The service information element 304 may indicate information about a broadcast channel. The content id element 301 may indicate an identifier of a service which is currently being viewed by a viewer and the service information element 304 may indicate detailed information about the broadcast channel. For example, the detailed information indicated by the service information element 304 may be a channel name, a logo, or a text description.

More specifically, the service name element 314 which is a sub element of the service information element 304 may indicate a channel name, the service logo element 324 may indicate a channel logo, and the service description element 334 may indicate a channel text description.

The following shows the XML schema of elements of the ACR query result shown in FIG. 3 according to the embodiment of the present invention.

```
<xs:complexType name="ACR-ResultType">
  <xs:sequence>
    <xs:element name="ContentID" type="xs:anyURI"/>
    <xs:element name="NTPTimestamp" type="xs:unsignedLong"/>
    <xs:element name="SignalingChannelInformation">
      <xs:complexType>
        <xs:sequence>
          <xs:element name="SignalingChannelURL"
```

-continued

```
            maxOccurs="unbounded">
            <xs:complexType>
              <xs:simpleContent>
                <xs:extension base="xs:anyURI">
                  <xs:attribute name="UpdateMode">
                    <xs:simpleType>
                      <xs:restriction base="xs:string">
                        <xs:enumeration value="Pull"/>
                        <xs:enumeration value="Push"/>
                      </xs:restriction>
                    </xs:simpleType>
                  </xs:attribute>
                  <xs:attribute name="PollingCycle" type="xs:unsignedInt"/>
                </xs:extension>
              </xs:simpleContent>
            </xs:complexType>
          </xs:element>
        </xs:sequence>
      </xs:complexType>
    </xs:element>
    <xs:element name="ServiceInformation">
      <xs:complexType>
        <xs:sequence>
          <xs:element name="ServiceName" type="xs:string"/>
          <xs:element name="ServiceLogo" type="xs:anyURI"
            minOccurs="0"/>
          <xs:element name="ServiceDescription" type="xs:string"
            minOccurs="0" maxOccurs="unbounded"/>
        </xs:sequence>
      </xs:complexType>
    </xs:element>
    <xs:any namespace="##other" processContents="skip"
      minOccurs="0" maxOccurs="unbounded"/>
  </xs:sequence>
  <xs:attribute name="ResultCode" type="xs:string" use="required"/>
  <xs:anyAttribute processContents="skip"/>
</xs:complexType>
```

FIG. 4 is a diagram showing the syntax of a content identifier (ID) according to an embodiment of the present invention.

FIG. 4 shows the syntax of the content ID according to the ATSC standard according to the embodiment of the present invention. The ATSC content ID may be used as an identifier for identifying content received by the receiver.

The syntax of the content ID illustrated in FIG. 4 is the syntax of a content ID element of the ACR query result format described with reference to FIG. 3.

The ATSC Content Identifier is a syntax that is composed of a TSID (Transmitting Subscriber Identification) and a "house number" with a period of uniqueness. A "house number" is any number that the holder of the TSID wishes as constrained herein. Numbers are unique for each value of TSID. The syntax of the ATSC Content Identifier structure shall be as defined in FIG. 11.

'TSID', a 16 bit unsigned integer field, shall contain a value of transport_stream_id. The assigning authority for these values for the United States is the FC Ranges for Mexico, Canada, and the United States have been established by formal agreement among these countries. Values in other regions are established by appropriate authorities.

'end_of_day' field, this 5-bit unsigned integer shall be set to the hour of the day in UTC in which the broadcast day ends and the instant after which the content_id values may be re-used according to unique_for. The value of this field shall be in the range of 0-23. The values 24-31 are reserved. Note that the value of this field is expected to be static per broadcaster.

'unique_for' field, this 9-bit unsigned integer shall be set to the number of days, rounded up, measure relative to the hour indicated by end_of_day, during which the content_id value is not reassign to different content. The value shall be in the range 1 to 511. The value zero shall be forbidden. The value 511 shall have the special meaning of "indefinitely". Note that the value of this field is expected to be essentially static per broadcaster, only changing when the method of house numbering is changed. Note also that decoders can treat stored content_values as unique until the unique_for fields expire, which can be implemented by decrementing all stored unique_for fields by one every day at the end_of_day until they reach zero.

'content_id' field, this variable length field shall be set to the value of the identifier according to the house number system or systems for the value of TSID. Each such value shall not be assigned to different content within the period of uniqueness set by the values in the end_of_day an unique_for fields. The identifier may be any combination of human readable and/or binary values and need not exactly match the form of a house number, not to exceed 242 bytes 1.

When a receiver according to the embodiment of the present invention cannot globally uniquely identify a service via the syntax of the content ID illustrated in FIG. 4, the receiver according to the present embodiment may identify the service using a global service identifier. The global service identifier according to the present embodiment may be included in the content ID element of the ACR query result format described with reference to FIG. 3.

[Example 1] below represents a global service identifier of a URI format according to an embodiment of the present invention. A global service identifier of [Example 1] may be used for an ATSC-M/H service.

Example 1 urn:oma:bcast:iauth:atsc:service:<region>:<xsid>:<serviceid><region> is a two-letter international country code as specified by ISO 639-2.

<xsid> is defined as for local services, the decimal encoding of the TSID, as defined in that region. <xsid> is also defined as for regional services (major >69), "0".

<serviceid> is defined as <major>.<minor>, where <major> can indicate Major Channel number and <minor> can indicate Minor Channel Number.

The aforementioned global service identifier may be presented in the following URI format.

Example 2 urn:oma:bcast:iauth:atsc:service:us:1234:5.1

Example 3 urn:oma:bcast:iauth:atsc:service:us:0:100.200

A receiver according to the embodiment of the present invention may identify content using a global content identifier based on the aforementioned global service identifier.

[Example 4] below represents a global content identifier of a URI format according to an embodiment of the present invention. A global service identifier of [Example 4] may be used for an ATSC service. In detail, [Example 4] represents a case in which an ATSC content identifier is used as a global content identifier according to an embodiment of the present invention.

Example 4 urn:oma:bcast:iauth:atsc:content<region>:<xsidz>:<contentid>:<unique_for>:<end_of_day>

<region> is a two-letter international country code as specified by ISO 639-2 [4].

<xsidz> is defined as for local services, the decimal encoding of the TSID, as defined in that region, followed by "."<serviceid> unless the emitting broadcaster can ensure the uniqueness of the global content id without use of <serviceid>. <xsidz> is also defined as for regional services (major >69), <serviceid>.

In both cases, <serviceid> is as defined in Section A1 for the service carrying the content. <content_id> is the base64 [5] encoding of the content_id field defined in FIG. 4, considering the content_id field as a binary string. <unique_for> is the decimal encoding of the unique_for field defined in FIG. 4. <end_of_day> is the decimal encoding of the end_of_day field defined in FIG. 4.

The ATSC content identifier having the format defined in the aforementioned Examples may be used to identify content on an ACR processing system.

Hereinafter, a receiver designed to embody watermarking and fingerprinting technologies will be described with regard to an embodiment of the present invention with reference to FIGS. 5 and 6. Receivers illustrated in FIGS. 5 and 6 may be conFIG.d in different manners according to a designer's intention.

Figure 5:
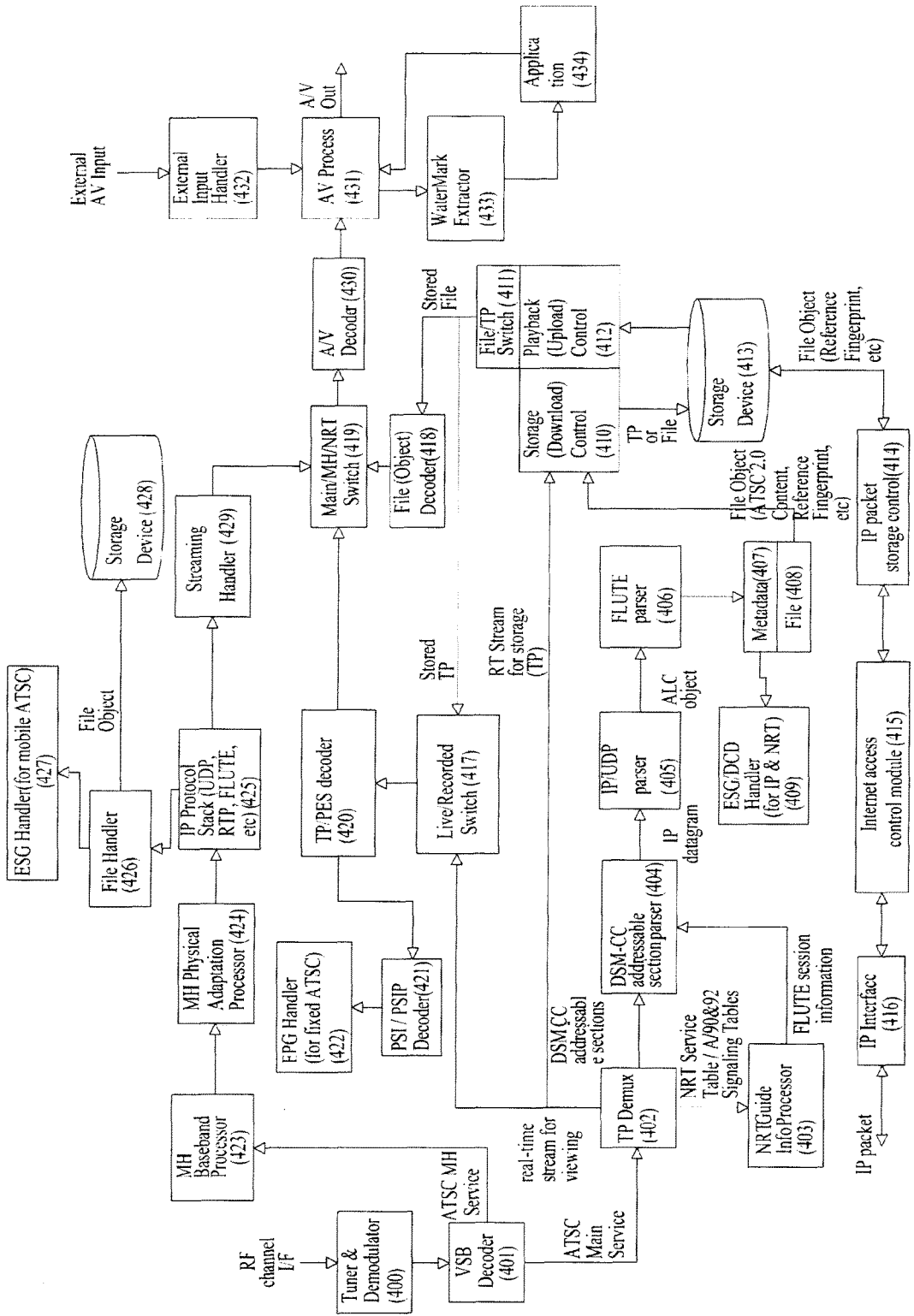
FIG. 5 is a diagram showing the structure of a receiver according to the embodiment of the present invention.

FIG. 5 is a diagram showing the structure of a receiver according to the embodiment of the present invention.

More specifically, FIG. 5 shows an embodiment of the configuration of a receiver supporting an ACR based ETV service using watermarking.

As shown in FIG. 5, the receiver supporting the ACR based ETV service according to the embodiment of the present invention may include an input data processor, an ATSC main service processor, an ATSC mobile/handheld (MH) service processor and/or an ACR service processor. The input data processor may include a tuner/demodulator 400 and/or a vestigial side band (VSB) decoder 401. The ATSC main service processor may include a transport protocol (TP) demux 402, a Non Real Time (NRT) guide information processor 403, a digital storage media command and Control (DSM-CC) addressable section parser 404, an Information Provider (IP)/User Datagram Protocol (UDP) parser 405, a FLUTE parser 406, a metadata module 407, a file module 408, an electronic service guide (ESG)/data carrier detect (DCD) handler 409, a storage control module 410, a file/TP switch 411, a playback control module 412, a first 1 storage device 413, an IP packet storage control module 414, an Internet access control module 415, an IP interface 416, a live/recorded switch 417, a file (object) decoder 418, a TP/Packetized Elementary Stream (PES) decoder 420, a Program Specific Information (PSI)/program and system information protocol (PSIP) decoder 421 and/or an Electronic Program Guide (EPG) handler 422. The ATSC MH service processor may include a main/MH/NRT switch 419, a MH baseband processor 423, an MH physical adaptation processor 424, an IP protocol stack 425, a file handler 426, an ESG handler 427, a second storage device 428 and/or a streaming handler 429. The ACR service processor may include a main/MH/NRT switch 419, an A/V decoder 430, an A/V process module 431, an external input handler 432, a watermark extractor 433 and/or an application 434.

Hereinafter, operation of each module of each processor will be described.

In the input data processor, the tuner/demodulator 400 may tune and demodulate a broadcast signal received from an antenna. Through this process, a VSB symbol may be extracted. The VSB decoder 401 may decode the VSB symbol extracted by the tuner/demodulator 400.

The VSB decoder 401 may output ATSC main service data and MH service data according to decoding. The ATSC main service data may be delivered to and processed by the ATSC main service processor and the MH service data may be delivered to and processed by the ATSC MH service processor.

The ATSC main service processor may process a main service signal in order to deliver main service data excluding an MH signal to the ACR service processor. The TP demux 402 may demultiplex transport packets of ATSC main service data transmitted via the VSB signal and deliver the demultiplexed transport packets to other processing modules. That is, the TP demux 402 may demultiplex a variety of information included in the transport packets and deliver information such that elements of the broadcast signal are respectively processed by modules of the broadcast receiver. The demultiplexed data may include real-time streams, DSM-CC addressable sections and/or an NRT service table/A/90&92 signaling table. More specifically, as shown in FIG. 5, the TP demux 402 may output the real-time streams to the live/recorded switch 417, output the DSM-CC addressable sections to the DSM-CC addressable section parser 404 and output the NRT service table/A/90&92 signaling table to the NRT guide information processor 403.

The NRT guide information processor 403 may receive the NRT service table/A/90&92 signaling table from the TP demux 402 and extract and deliver FLUT session information to the DSM-CC addressable section parser 404. The DSM-CC addressable section parser 404 may receive the DSM-CC addressable sections from the TP demux 402, receive the FLUT session information from the NRT guide information processor 403 and process the DSM-CC addressable sections. The IP/UDP parser 405 may receive the data output from the DSM-CC addressable section parser 404 and parse IP datagrams transmitted according to the IP/UDP. The FLUTE parser 406 may receive data output from the IP/UDP parser 405 and process FLUTE data for transmitting a data service transmitted in the form of an asynchronous layered coding (ALC) object. The metadata module 407 and the file module 408 may receive the data output from the FLUTE parser 406 and process metadata and a restored file. The ESG/DCD handler 409 may receive data output from the metadata module 407 and process an electronic service guide and/or downlink channel descriptor related to a broadcast program. The restored file may be delivered to the storage control module 410 in the form of a file object such as ATSC 2.0 content and reference fingerprint. The file object may be processed by the storage control module 410 and divided into a normal file and a TP file to be stored in the first storage device 413. The playback control module 412 may update the stored file object and deliver the file object to the file/TP switch 411 in order to decode the normal file and the TP file. The file/TP switch 411 may deliver the normal file to the file decoder 418 and deliver the TP file to the live/recorded switch 417 such that the normal file and the TP file are decoded through different paths.

The file decoder 418 may decode the normal file and deliver the decoded file to the ACR service processor. The decoded normal file may be delivered to the main/MH/NRT switch 419 of the ACR service processor. The TP file may be delivered to the TP/PES decoder 420 under the control of the live/recorded switch 417. The TP/PES decoder 420 decodes the TP file and the PSI/PSIP decoder 421 decodes the decoded TP file again. The EPG handler 422 may process the decoded TP file and process an EPG service according to ATSC.

The ATSC MH service processor may process the MH signal in order to transmit ATSC MH service data to the ACR service processor. More specifically, the MH baseband processor 423 may convert the ATSC MH service data signal into a pulse waveform suitable for transmission. The MH physical adaptation processor 424 may process the ATSC MH service data in a form suitable for an MH physical layer.

The IP protocol stack module 425 may receive the data output from the MH physical adaptation processor 424 and process data according to a communication protocol for Internet transmission/reception. The file handler 426 may receive the data output from the IP protocol stack module 425 and process a file of an application layer. The ESG handler 427 may receive the data output from the file handler 426 and process a mobile ESG. In addition, the second storage device 428 may receive the data output from the file handler 426 and store a file object. In addition, some of the data output from the IP protocol stack module 425 may become data for an ACR service of the receiver instead of a mobile ESG service according to ATSC. In this case, the streaming handler 429 may process real streaming received via a real-time transport protocol (RTP) and deliver the real streaming to the ACR service processor.

The main/MH/NRT switch 419 of the ACR service processor may receive the signal output from the ATSC main service processor and/or the ATSC MH service processor. The A/V decoder 430 may decode compression A/V data received from the main/MH/NRT switch 419. The decoded A/V data may be delivered to the A/V process module 431.

The external input handler 432 may process the A/V content received through external input and transmit the A/V content to the A/V process module 431.

The A/V process module 431 may process the A/V data received from the A/V decoder 430 and/or the external input handler 432 to be displayed on a screen. In this case, the watermark extractor 433 may extract data inserted in the form of a watermark from the A/V data. The extracted watermark data may be delivered to the application 434. The application 434 may provide an enhancement service based on an ACR function, identify broadcast content and provide enhancement data associated therewith. If the application 434 delivers the enhancement data to the A/V process module 431, the A/V process module 431 may process the received A/V data to be displayed on a screen.

In detail, the watermark extractor 433 illustrated in FIG. 5 may extract data (or watermark) inserted in the form of a watermark from the A/V data received through external input. The watermark extractor 433 may extract a watermark from the audio data, extract a watermark from the video data, and extract a watermark from audio and video data. The watermark extractor 433 may acquire channel information and/or content information from the extracted watermark.

The receiver according to the present embodiment may tune an ATSC mobile handheld (MH) channel and receive corresponding content and/or metadata using the channel information and/or the content information that are acquired by the watermark extractor 433. In addition, the receiver according to the present embodiment may receive corresponding content and/or metadata via the Internet. Then, the receiver may display the receive content and/or the metadata using trigger, etc.

Figure 6:
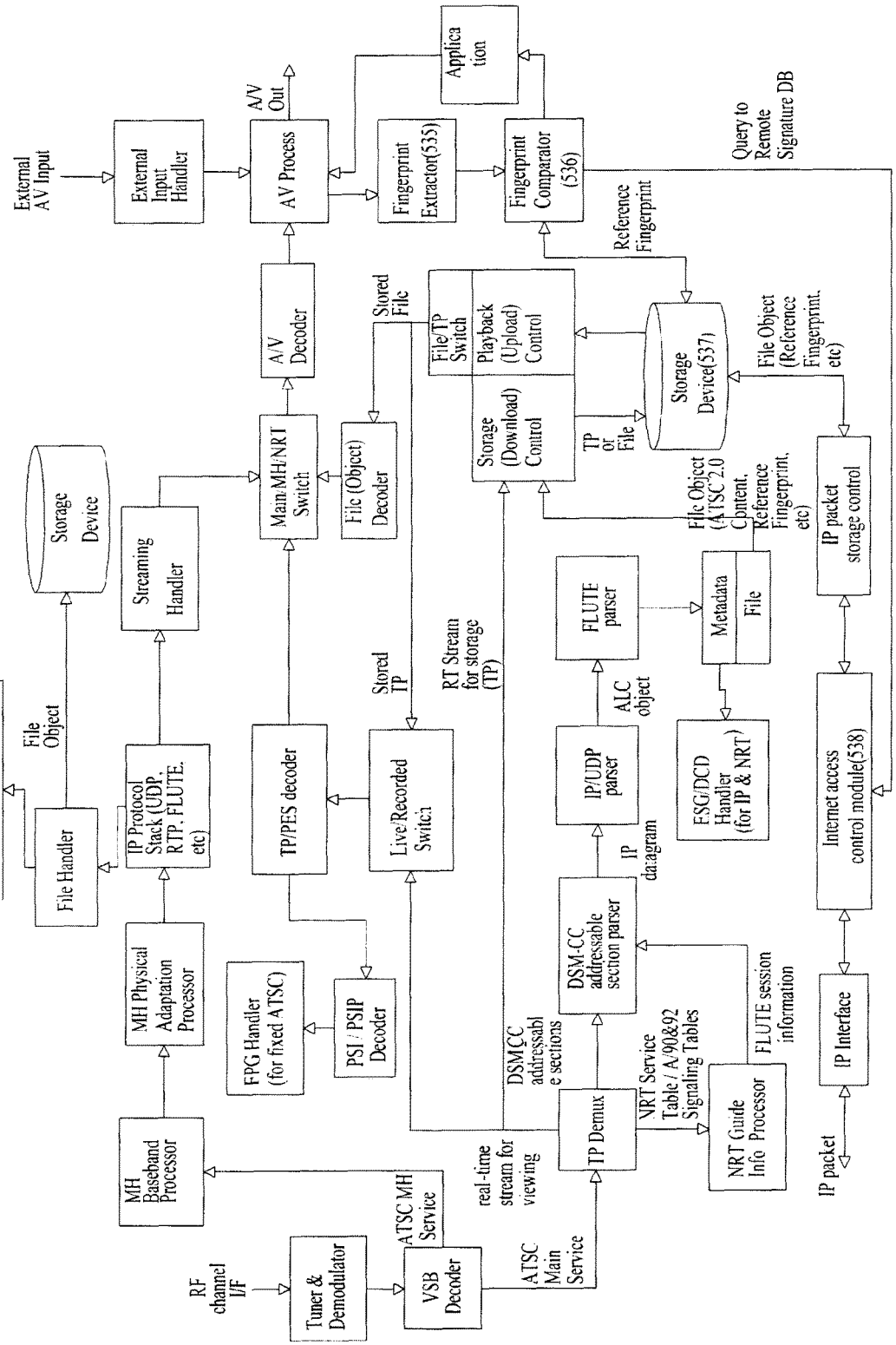
FIG. 6 is a diagram showing the structure of a receiver according to another embodiment of the present invention.

FIG. 6 is a diagram showing the structure of a receiver according to another embodiment of the present invention.

More specifically, FIG. 6 shows an embodiment of the configuration of a receiver supporting an ACR based ETV service using fingerprinting.

The basic structure of the receiver illustrated in FIG. 6 is basically the same as that of the receiver illustrated in FIG. 6. However, the receiver illustrated in FIG. 6 is different from the receiver illustrated in FIG. 5 in that the receiver of FIG. 6 further includes a fingerprint extractor 535 and/or a fingerprint comparator 536 according to an embodiment of the present invention. In addition, the receiver of FIG. 6 may not include the watermark extractor 433 among the elements illustrated in FIG. 5.

The basic structure of the receiver of FIG. 6 is basically the same as the structure of the receiver illustrated in FIG. 5, and thus, a detailed description thereof will be omitted. Hereinafter, an operation of the receiver will be described in terms of the fingerprint extractor 535 and/or the fingerprint comparator 536.

The fingerprint extractor 535 may extract data (or signature) inserted into A/V content received through external input. The fingerprint extractor 535 according to the present embodiment may extract signature from audio content, extract signature from video content, or extract signature from audio content and video content.

The fingerprint comparator 536 may acquire channel information and/or content information using the signature extracted from the A/V content. The fingerprint comparator 536 according to the present embodiment may acquire the channel information and/or the content information through a local search and/or a remote search.

In detail, as illustrated in FIG. 6, a route for an operation of the fingerprint comparator 536 that accesses a storage device 537 is referred to as a local search. In addition, as illustrated in FIG. 6, a route for an operation of the fingerprint comparator 536 that accesses an internet access control module 538 is referred to as a remote search. The local search and the remote search will be described below.

In the local search according to the present embodiment, the fingerprint comparator 536 may compare the extracted signature with a reference fingerprint stored in the storage device 537. The reference fingerprint is data that the fingerprint comparator 536 further receives in order to process the extracted signature.

In detail, the fingerprint comparator 536 may match and compare the extracted signal and the reference fingerprint in order to determine whether the extracted signal and the reference fingerprint are identical to acquire channel information and/or content information.

As the comparison result, when the extracted signal is identical to the reference fingerprint, the fingerprint comparator 536 may transmit the comparison result to application. The application may transmit content information and/or channel information related to the extracted signature using the comparison result to the receiver.

As the comparison result, when the extracted signature is not matched with the reference fingerprint or the number of reference fingerprints is not sufficient, the fingerprint comparator 536 may receive a new reference fingerprint through an ATSC MH channel. Then, the fingerprint comparator 536 may re-compare the extracted signature and the reference fingerprint.

In the remote search according to the present embodiment, the fingerprint comparator 536 may receive channel information and/or content information from a signature database server on the Internet.

In detail, the fingerprint comparator 536 may access the Internet via the internet access control module 538 to access the signature database server. Then, the fingerprint comparator 536 may transmit the extracted signature as a query parameter to the signature database server.

When all broadcasters use one integrated signature database server, the fingerprint comparator 536 may transmit the query parameter to a corresponding signature database server. When broadcasters separately manage respective signature database servers, the fingerprint comparator 536 may transmit query parameters to respective signature databases. In addition, the fingerprint comparator 536 may simultaneously transmit the query parameter to two or more signature database servers.

The receiver according to the present embodiment may tune an ATSC MH channel using the channel information and/or the content information that are acquired by the fingerprint comparator 536 and receive corresponding content and/or metadata. Then, the receiver may display the received content and/or metadata using trigger, etc.

Figure 7:
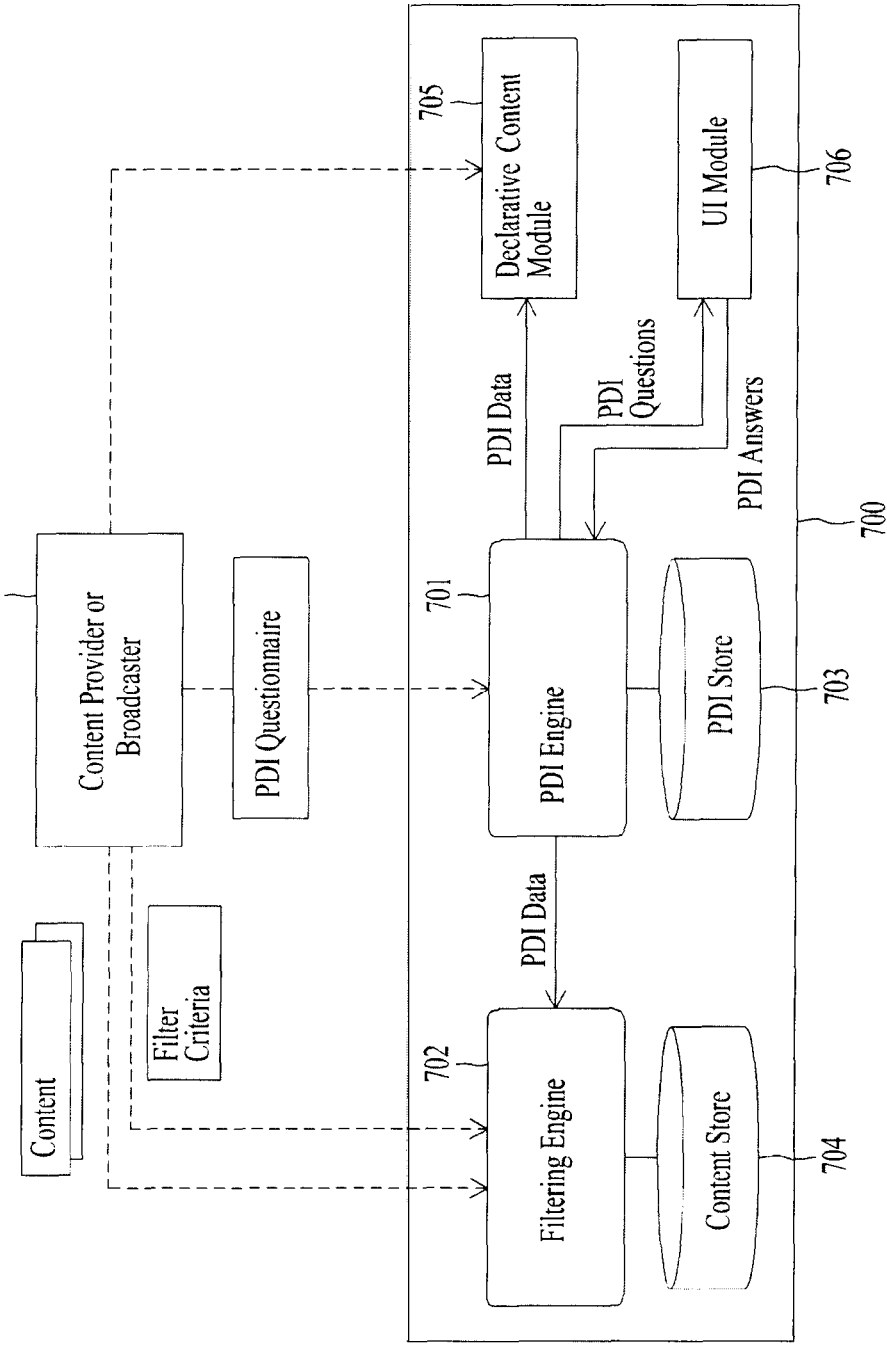
FIG. 7 is a diagram illustrating a digital broadcast system according to an embodiment of the present invention.

FIG. 7 is a diagram illustrating a digital broadcast system according to an embodiment of the present invention.

In detail, FIG. 7 illustrates a personalization broadcast system including a digital broadcast receiver (or a receiver) for a personalization service. The personalization service according to the present embodiment is a service for selecting and supplying content appropriate for a user based on user information. In addition, the personalization broadcast system according to the present embodiment may provide a next generation broadcast service for providing an ATSC 2.0 service or a personalization service.

According to an embodiment of the present invention, as an example of the user information, user's profiles, and demographics and interests information (or PDI data) are defined. Hereinafter, elements of the personalization broadcast system will be described.

The answers to the questionnaires, taken together, represent the user's Profile, Demographics, and Interests (PDI). The data structure that encapsulates the questionnaire and the answers given by a particular user is called a PDI Questionnaire or a PDI Table. A PDI Table, as provided by a network, broadcaster or content provider, includes no answer data, although the data structure accommodates the answers once they are available. The question portion of an entry in a PDI Table is informally called a "PDI Question" or "PDI-Q." The answer to a given PDI question is referred to informally as a "PDI-A." A set of filter criteria is informally called a "PDI-FC."

The client device such as an ATSC 2.0-capable receiver includes a function allowing the creation of answers to the questions in the questionnaire (PDI-A instances). This PDI-generation function uses PDI-Q instances as input and produces PDI-A instances as output. Both PDI-Q and PDI-A instances are saved in non-volatile storage in the receiver. The client also provides a filtering function in which it compares PDI-A instances against PDI-FC instances to determine which content items will be suitable for downloading and use.

On the service provider side as shown, a function is implemented to maintain and distribute the PDI Table. Along with content, content metadata are created. Among the metadata are PDI-FC instances, which are based on the questions in the PDI Table.

As illustrated in FIG. 7, the personalization broadcast system may include a content provider (or broadcaster) 707 and/or a receiver 700. The receiver 700 according to the present embodiment may include a PDI engine 701, a filtering engine 702, a PDI store 703, a content store 704, a declarative content module 705, and/or a user interface (UI) module 706. As illustrated in FIG. 7, the receiver 700 according to the present embodiment may receive content, etc. from the content provider 707. The structure of the aforementioned personalization broadcast system may be changed according to a designer's intention.

The content provider 707 according to the present embodiment may transmit content, PDI questionnaire, and/or filtering criteria to the receiver 700. The data structure that encapsulates the questionnaire and the answers given by a particular user is called a PDI questionnaire. According to an embodiment of the present invention, the PDI questionnaire may include questions (or PDI questions) related to profiles, demographics and interests, etc. of a user.

The receiver 700 may process the content, the PDI questionnaire, and/or the filtering criteria, which are received from the content provider 707. Hereinafter, the digital broadcast system will be described in terms of operations of modules included in the receiver 700 illustrated in FIG. 7.

The PDI engine 701 according to the present embodiment may receive the PDI questionnaire provided by the content provider 707. The PDI engine 701 may transmit PDI questions contained in the received in the PDI questionnaire to the UI module 706. When a user's input corresponding to a corresponding PDI question is present, the PDI engine 701 may receive a user's answer and other information (hereinafter, referred to as a PDI answer) related to the corresponding PDI question from the UI module 706. Then, the PDI engine 701 may process PDI questions and PDI answers in order to supply the personalization service to generate PDI data. That is, according to an embodiment of the present invention, the PDI data may contain the aforementioned PDI questions and/or PDI answers. Therefore, the PDI answers to the PDI questionnaires, taken together, represent the user's profile, demographics, and interests (or PDI).

In addition, the PDI engine 701 according to the present embodiment may update the PDI data using the received PDI answers. In detail, the PDI engine 701 may delete, add, and/or correct the PDI data using an ID of a PDI answer. The ID of the PDI answer will be described below in detail with regard to an embodiment of the present invention. In addition, when another module requests the PDI engine 701 to transmit PDI data, the PDI engine 701 may transmit PDI data appropriate for the corresponding request to the corresponding module.

The filtering engine 702 according to the present embodiment may filter content according to the PDI data and the filtering criteria. The filtering criteria refers to a set filtering criterions for filtering only contents appropriate for a user using the PDI data. In detail, the filtering engine 702 may receive the PDI data from the PDI engine 701 and receive the content and/or the filtering criteria from the content provider 707. In addition, when the convent provider 707 transmits a parameter related to declarative content, the convent provider 707 may transmit a filtering criteria table related to the declarative content together. Then, the filtering engine 702 may match and compare the filtering criteria and the PDI data and filter and download the content using the comparison result. The downloaded content may be stored in the content store 704. A filtering method and the filtering criteria will be described in detail with reference to FIGS. 9 and 10.

According to an embodiment of the present invention, the UI module 706 may display the PDI received from the PDI engine 701 and receive the PDI answer to the corresponding PDI question from the user. The user may transmit the PDI answer to the displayed PDI question to the receiver 700 using a remote controller. The UI module 706 may transmit the received PDI answer to the PDI engine 701.

The declarative content module 705 according to the present embodiment may access the PDI engine 701 to acquire PDI data. In addition, as illustrated in FIG. 7, the declarative content module 705 may receive declarative content provided by the content provider 707. According to an embodiment of the present invention, the declarative content may be content related to application executed by the receiver 700 and may include a declarative object (DO) such as a triggered declarative object (TDO).

Although no illustrated in FIG. 7, the declarative content module 705 according to the present embodiment may access the PDI store 703 to acquire the PDI question and/or the PDI answer. In this case, the declarative content module 705 may use an application programming interface (API). In detail, the declarative content module 705 may retrieve the PDI store 703 using the API to acquire at least one PDI question. Then, the declarative content module 705 may transmit the PDI question, receive the PDI answer, and transmit the received PDI answer to the PDI store 703 through the UI module 706.

The PDI store 703 according to the present embodiment may store the PDI question and/or the PDI answer.

The content store 704 according to the present embodiment may store the filtered content.

As described above, the PDI engine 701 illustrated in FIG. 7 may receive the PDI questionnaire from the content provider 707. The receiver 700 may display PDI questions of the PDI questionnaire received through the UI module 706 and receive the PDI answer to the corresponding PDI question from the user. The PDI engine 701 may transmit PDI data containing the PDI question and/or the PDI answer to the filtering engine 702. The filtering engine 702 may filter content through the PDI data and the filtering criteria. Thus, the receiver 700 may provide the filtered content to the user to embody the personalization service.

Figure 8:
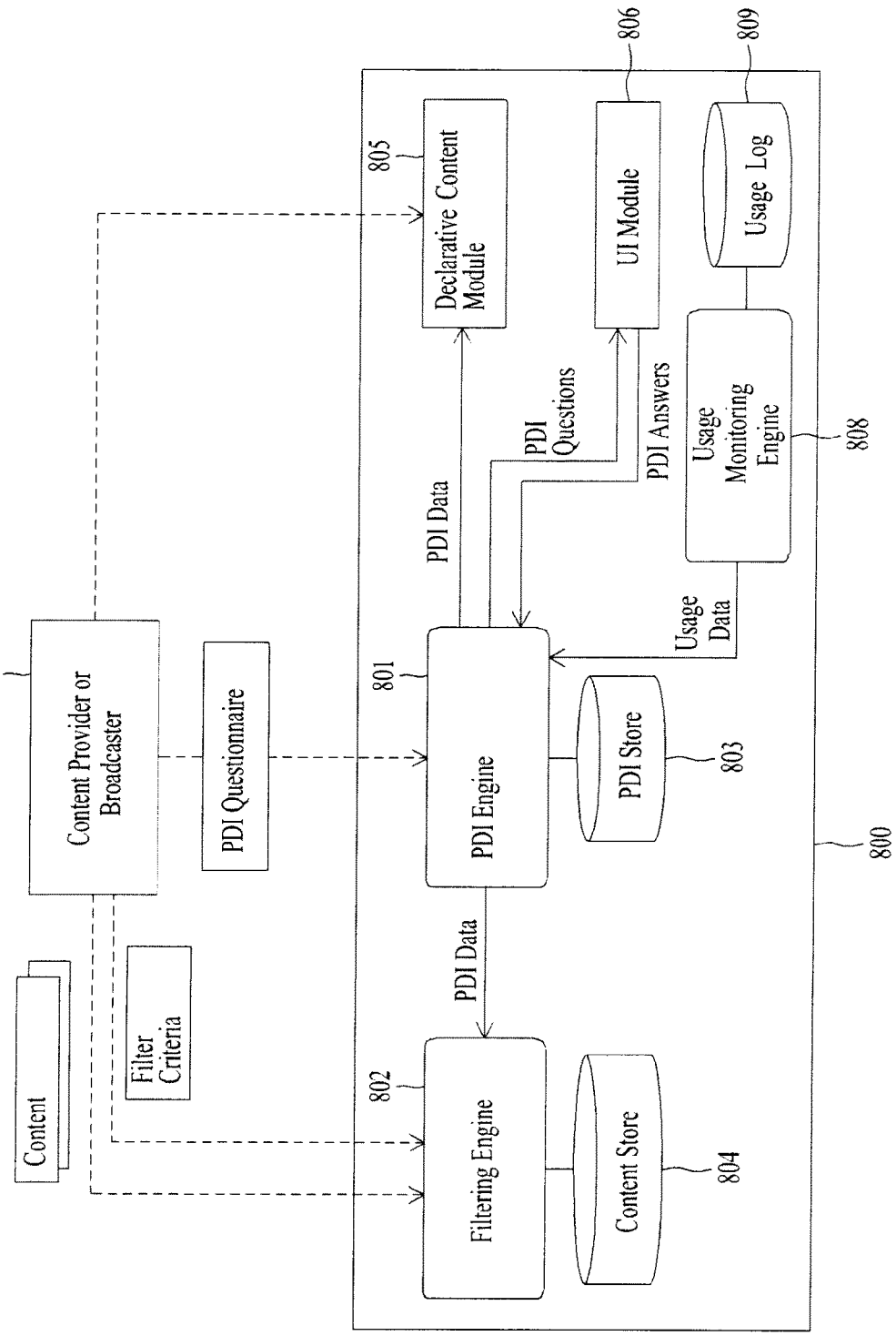
FIG. 8 is a diagram illustrating a digital broadcast system according to an embodiment of the present invention.

FIG. 8 is a diagram illustrating a digital broadcast system according to an embodiment of the present invention.

In detail, FIG. 8 illustrates the structure of a personalization broadcast system including a receiver for a personalization service. The personalization broadcast system according to the present embodiment may provide an ATSC 2.0 service. Hereinafter, elements of the personalization broadcast system will be described.

As illustrated in FIG. 8, the personalization broadcast system may include a content provider (or broadcaster 807) and/or a receiver 800. The receiver 800 according to the present embodiment may include a PDI engine 801, a filtering engine 802, a PDI store 803, a content store 804, a declarative content module 805, a UI module 806, a usage monitoring engine 808, and/or a usage log module 809. As illustrated in FIG. 7, the receiver 800 according to the present embodiment may receive content, etc. from the content provider 807. Basic modules of FIG. 8 are the same as the modules of FIG. 7, except that the broadcast system of FIG. 8 may further include the usage monitoring engine 808 and/or the usage log module 809 unlike the broadcast system of FIG. 7. The structure of the aforementioned personalization broadcast system may be changed according to a designer's intention. Hereinafter, the digital broadcast system will be described in terms of the usage monitoring engine 808 and the usage log module 809.

The usage log module 809 according to the present embodiment may store information (or history information) regarding a broadcast service usage history of a user. The history information may include two or more usage data. The usage data according to an embodiment of the present invention refers to information regarding a broadcast service used by a user for a predetermined period of time. In detail, the usage data may include information indicating that news is watched for 40 minutes at 9 pm, information indicating a horror movie is downloaded at 11 pm, etc.

The usage monitoring engine 808 according to the present embodiment may continuously monitor a usage situation of a broadcast service of the user. Then, the usage monitoring engine 808 may delete, add, and/or correct the usage data stored in the usage log module 809 using the monitoring result. In addition, the usage monitoring engine 808 according to the present embodiment may transmit the usage data to the PDI engine 801 and the PDI engine 801 may update the PDI data using the transmitted usage data.

Figure 9:
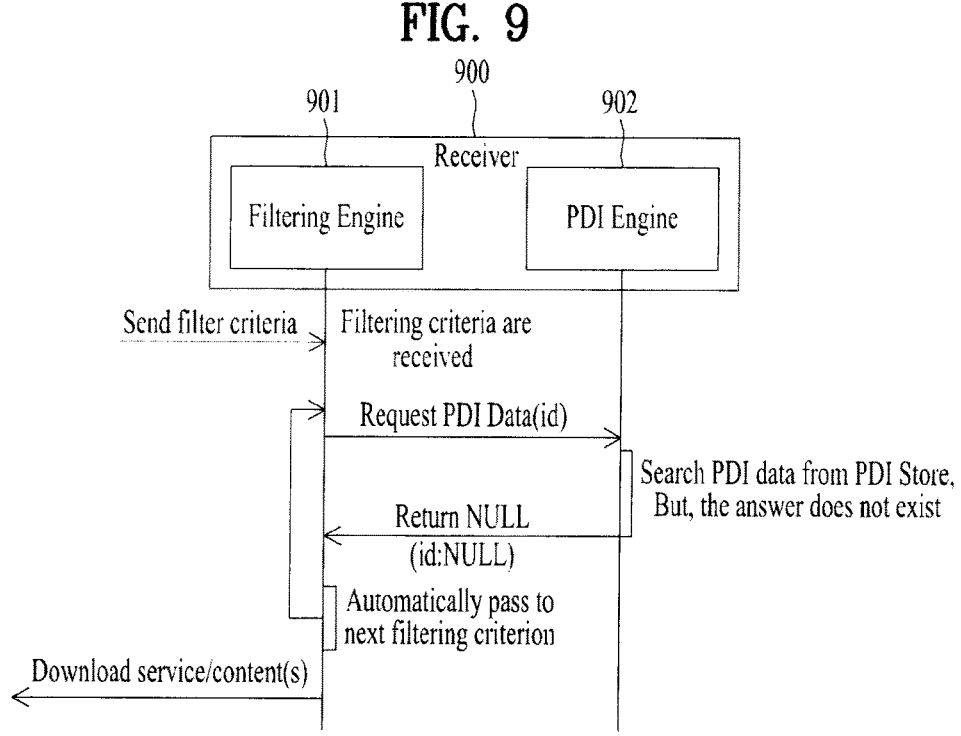
FIG. 9 is a flowchart of a digital broadcast system according to another embodiment of the present invention.

FIG. 9 is a flowchart of a digital broadcast system according to another embodiment of the present invention.

In detail, FIG. 9 is a flowchart of operations of a filtering engine and a PDI engine of the personalization broadcast system described with reference to FIGS. 7 and 8.

As illustrated in FIG. 9, a receiver 900 according to the present embodiment may include a filtering engine 901 and/or a PDI engine 902. Hereinafter, operations of the filtering engine 901 and the PDI engine 902 according to the present embodiment will be described. The structure of the aforementioned receiver may be changed according to a designer's intention.

As described with reference to FIG. 7, in order to filter content, the receiver 900 according to the present embodiment may match and compare filtering criteria and PDI data.

In detail, the filtering engine 901 according to the present embodiment may receive filtering criteria from a content provider and transmit a signal (or a PDI data request signal) for requesting PDI data to the PDI engine 902. The PDI engine 902 according to the present embodiment may search for PDI data corresponding to the corresponding PDI data request signal according to the transmitted PDI data request signal.

The filtering engine 901 illustrated in FIG. 9 may transmit the PDI data request signal including a criterion ID (identifier) to the PDI engine 902. As described above, the filtering criteria may be a set of filtering criterions, each of which may include a criterion ID for identifying the filtering criterions. In addition, according to an embodiment of the present invention, a criterion ID may be used to identify a PDI question and/or a PDI answer.

The PDI engine 902 that has received the PDI data request signal may access a PDI store to search for the PDI data. According to an embodiment of the present invention, the PDI data may include a PDI data ID for identifying a PDI question and/or a PDI answer. The PDI engine 902 illustrated in FIG. 9 may match and compare whether the criterion ID and PDI data ID in order to determine whether the criterion ID and the PDI data ID are identical to each other.

As the matching result, when the criterion ID and the PDI data ID are identical to each other and values thereof are identical to each other, the receiver 900 may download corresponding content. In detail, the filtering engine 901 according to the present embodiment may transmit a download request signal for downloading content to the content provider.

As the matching result, when the criterion ID and the PDI data ID are not identical to each other, the PDI engine 902 may transmit a null ID (identifier) to the filtering engine 901, as illustrated in FIG. 9. The filtering engine 901 that has received the null ID may transmit a new PDI data request signal to the PDI engine 902. In this case, the new PDI data request signal may include a new criterion ID.

The receiver 900 according to the present embodiment may match all filtering criterions contained in the filtering criteria with the PDI data using the aforementioned method. As the matching result, when the all filtering criterions are matched with the PDI data, the filtering engine 901 may transmit the download request signal for downloading contents to the content provider.

Figure 10:
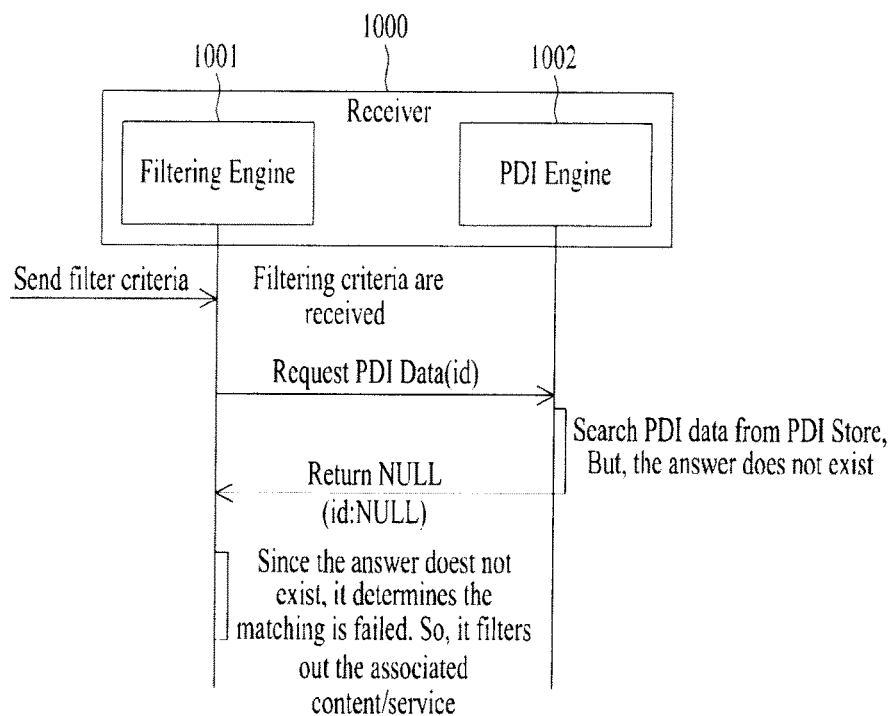
FIG. 10 is a flowchart of a digital broadcast system according to another embodiment of the present invention.

FIG. 10 is a flowchart of a digital broadcast system according to another embodiment of the present invention.

In detail, FIG. 10 is a flowchart of operations of a filtering engine and a PDI engine of the personalization broadcast system described with reference to FIGS. 7 and 8.

As illustrated in FIG. 10, a receiver 1000 according to the present embodiment may include a filtering engine 1001 and/or a PDI engine 1002. The structure of the aforementioned receiver may be changed according to a designer's intention. Basic operations of the filtering engine 1001 and the PDI engine 1002 illustrated in FIG. 10 are the same as the operations described with reference to FIG. 9.

However, as the matching result of the filtering criterion and the PDI data, when the criterion ID is not identical to the PDI data ID, the receiver 1000 illustrated in FIG. 10 may not download corresponding content, according to an embodiment of the present invention.

In detail, when the filtering engine 1001 according to the present embodiment receives a null ID, a new PDI data request signal may not be transmitted to the PDI engine 1002, according to an embodiment of the present invention. In addition, when all the filtering criterions contained in the filtering criteria are not matched with the PDI data, the filtering engine 1001 according to the present embodiment may not transmit the download request signal to the content provider, according to an embodiment of the present invention.

Figure 11:
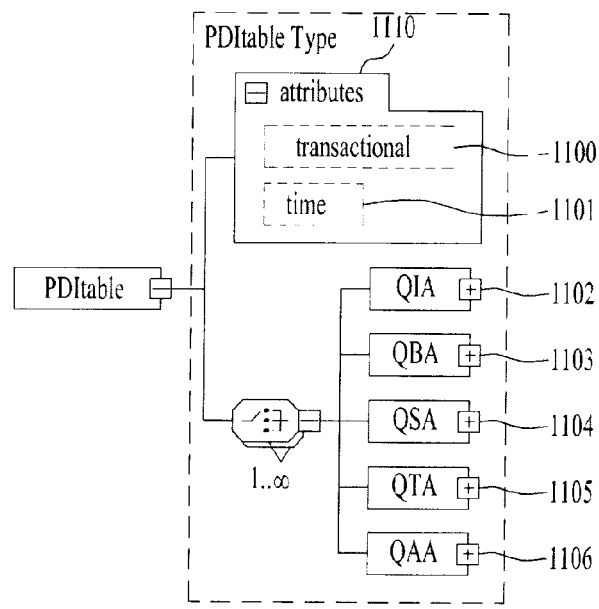
FIG. 11 is a diagram illustrating a PDI Table according to an embodiment of the present invention.

FIG. 11 is a diagram illustrating a PDI Table according to an embodiment of the present invention.

The personalization broadcast system described with reference to FIG. 7 may use PDI data in order to provide a personalization service and process the PDI data in the form of PDI Table. The data structure that encapsulates the questionnaire and the answers given by a particular user is called a PDI questionnaire or a PDI Table. A PDI Table, as provided by a network, broadcaster or content provider, includes no answer data, although the data structure accommodates the answers once they are available. The question portion of an entry in a PDI Table is informally called a "PDI question" or "PDI-Q." The answer to a given PDI question is referred to informally as a "PDI-A." A set of filtering criteria is informally called a "PDI-FC". According to an embodiment of the present invention, the PDI table may be represented in XML schema. A format of the PDI table according to the present embodiment may be changed according to a designer's intention.

As illustrated in FIG. 11, the PDI table according to the present embodiment may include attributes 1110 and/or PDI type elements. The attributes 1110 according to the present embodiment may include a transactional attribute 1100 and a time attribute 1101. The PDI type elements according to the present embodiment may include question with integer answer (QIA) elements 1102, question with Boolean answer (QBA) elements 1102, question with selection answer (QSA) elements 1104, question with text answer (QTA) elements 1105, and/or question with any-format answer (QAA) elements 1106. Hereinafter, elements of the PDI table illustrated in FIG. 11 will be described.

In detail, the attributes 1110 illustrated in FIG. 11 may indicate information of attributes of the PDI table according to the present embodiment. Thus, even if the PDI type elements included in the PDI table are changed, the attributes 1110 may not be changed in the PDI table according to the present embodiment. For example, the transactional attribute 1100 according to the present embodiment may indicate information regarding an objective of a PDI question. The time attribute 1101 according to the present embodiment may indicate information regarding time when the PDI table is generated or updated. In this case, even if PDI type elements are changed, PDI tables including different PDI type elements may include the transactional attribute 1100 and/or the time attribute 1101.

The PDI table according to the present embodiment may include one or two or more PDI type elements 1102 as root elements. In this case, the PDI type elements 1102 may be represented in a list form.

The PDI type elements according to the present embodiment may be classified according to a type of PDI answer. For example, the PDI type elements according to the present embodiment may be referred to as "QxA" elements. In this case, "x" may be determined according to a type of PDI answer. The type of the PDI answer according to an embodiment of the present invention may include an integer type, a Boolean type, a selection type, a text type, and any type of answers other than the aforementioned four types.

QIA elements 1103 according to an embodiment of the present invention may include an integer type of PDI answer to one PDI question and/or corresponding PDI question.

QBA elements 1104 according to an embodiment of the present invention may include a Boolean type of PDI answer to one PDI question and/or corresponding PDI question.

QSA elements 1105 according to an embodiment of the present invention may include a multiple selection type of PDI answer to one PDI question and/or corresponding PDI question.

QTA elements 1106 according to an embodiment of the present invention may include a text type of PDI answer to one PDI question and/or corresponding PDI question.

QAA elements 1107 according to an embodiment of the present invention may include a predetermined type of PDI answer, other than integer, Boolean, multiple-selection, and text types, to one PDI question and/or corresponding PDI question.

Figure 12:
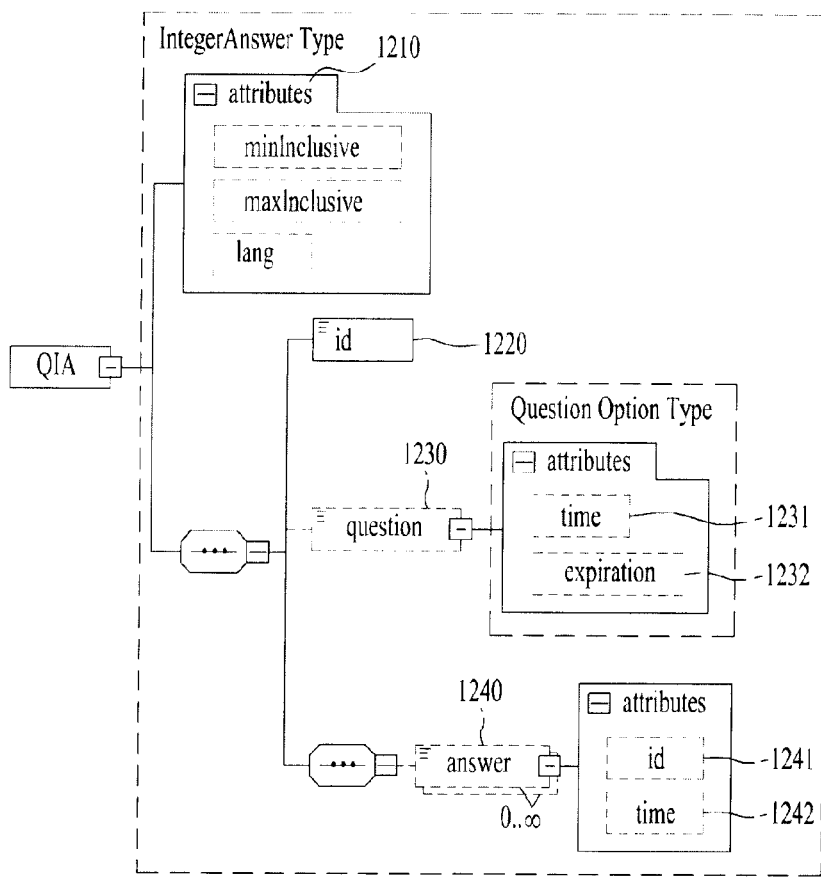
FIG. 12 is a diagram illustrating a PDI Table according to another embodiment of the present invention.

FIG. 12 is a diagram illustrating a PDI Table according to another embodiment of the present invention.

In detail, FIG. 12 illustrates XML schema of QIA elements among the PDI type elements described with reference to FIG. 11.

As illustrated in FIG. 12, the QIA elements may include attributes 1210 indicating information regarding attributes related to a PDI question type, identifier attribute 1220, a question element 1230, and/or an answer element 1240.

In detail, the attributes 1210 according to the present embodiment may include language attribute indicating a language of a PDI question. In addition, the attributes 1210 of the QIA elements according to the present embodiment may include a mininclusive attribute 1230 indicating a minimum integer of a PDI question and/or a maxinclusive attribute 1240 indicating a maximum integer of the PDI question.

The identifier attribute 1220 according to the present embodiment may be used to identify the PDI question and/or the PDI answer.

The question element 1230 according to the present embodiment may include the PDI question. As illustrated in FIG. 12, the question element 1230 may include attributes indicating information regarding the PDI question. For example, the question element 1230 may include time attribute 1231 indicating time when the PDI question is generated or transmitted and/or expiration time of the PDI question.

In addition, the answer element 1240 according to the present embodiment may include the PDI answer. As illustrated in FIG. 12, the answer element 1240 may include attributes indicating information regarding the PDI answer. For example, as illustrated in FIG. 12, the answer element 1240 may include identifier attribute 1241 used to recognize each PDI answer and/or time attribute 1242 indicating time when each PDI answer is generated or corrected.

Figure 13:
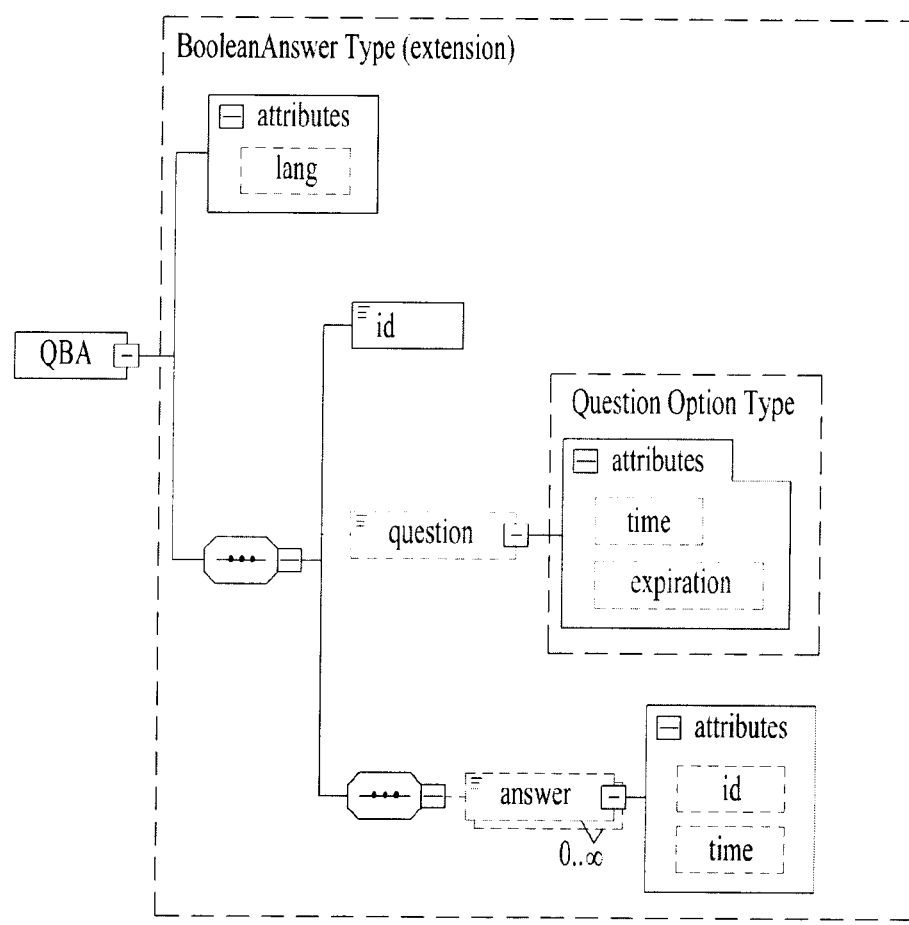
FIG. 13 is a diagram illustrating a PDI table according to another embodiment of the present invention.

FIG. 13 is a diagram illustrating a PDI table according to another embodiment of the present invention.

In detail, FIG. 13 illustrates XML schema of QBA elements among the PDI type elements described with reference to FIG. 11.

As illustrated in FIG. 13, basic elements of the XML schema of the QBA elements are the same as the elements described with reference to FIG. 12, and thus, a detailed description thereof is omitted.

Figure 14:
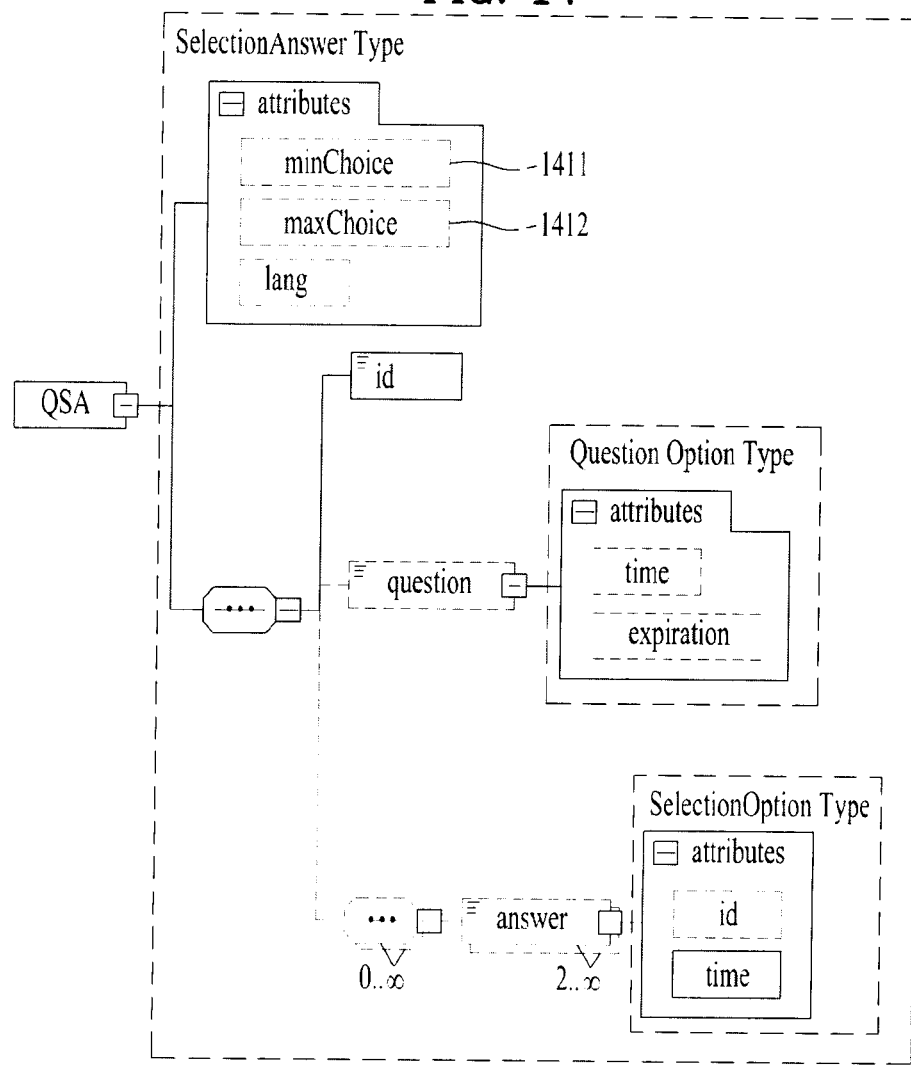
FIG. 14 is a diagram illustrating a PDI table according to another embodiment of the present invention.

FIG. 14 is a diagram illustrating a PDI table according to another embodiment of the present invention.

In detail, FIG. 14 illustrates XML schema of the QSA elements among the PDI type elements described with reference to FIG. 11.

Basic elements of the XML schema of the QSA elements illustrated in FIG. 14 are the same as the elements described with reference to FIG. 14, and thus, a detailed description thereof is omitted.

However, according to the attribute of multiple selection question, the attribute of the QSA elements according to the present embodiment may further include minchoice attribute 1411 and/or maxchoice attribute 1412. The minchoice attribute 1411 according to the present embodiment may indicate a minimum number of PDI answers that can be selected by the user. The maxchoice attribute 1412 according to the present embodiment may indicate a maximum number of PDI answers that can be selected by the user.

Figure 15:
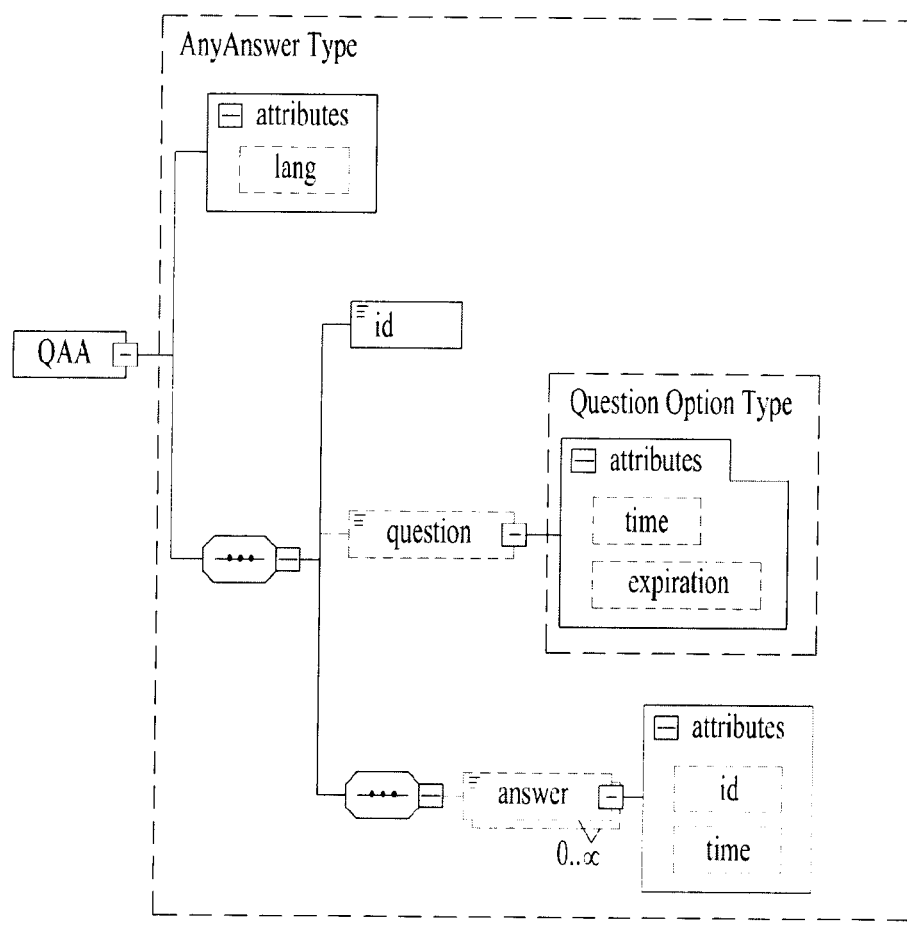
FIG. 15 is a diagram illustrating a PDI table according to another embodiment of the present invention.

FIG. 15 is a diagram illustrating a PDI table according to another embodiment of the present invention.

In detail, FIG. 15 illustrates XML schema of the QAA elements among the PDI type elements described with reference to FIG. 11.

As illustrated in FIG. 15, basic elements of the XML schema of the QAA elements are the same as the elements described with reference to FIG. 12, and thus, a detailed description thereof is omitted.

Figure 16:
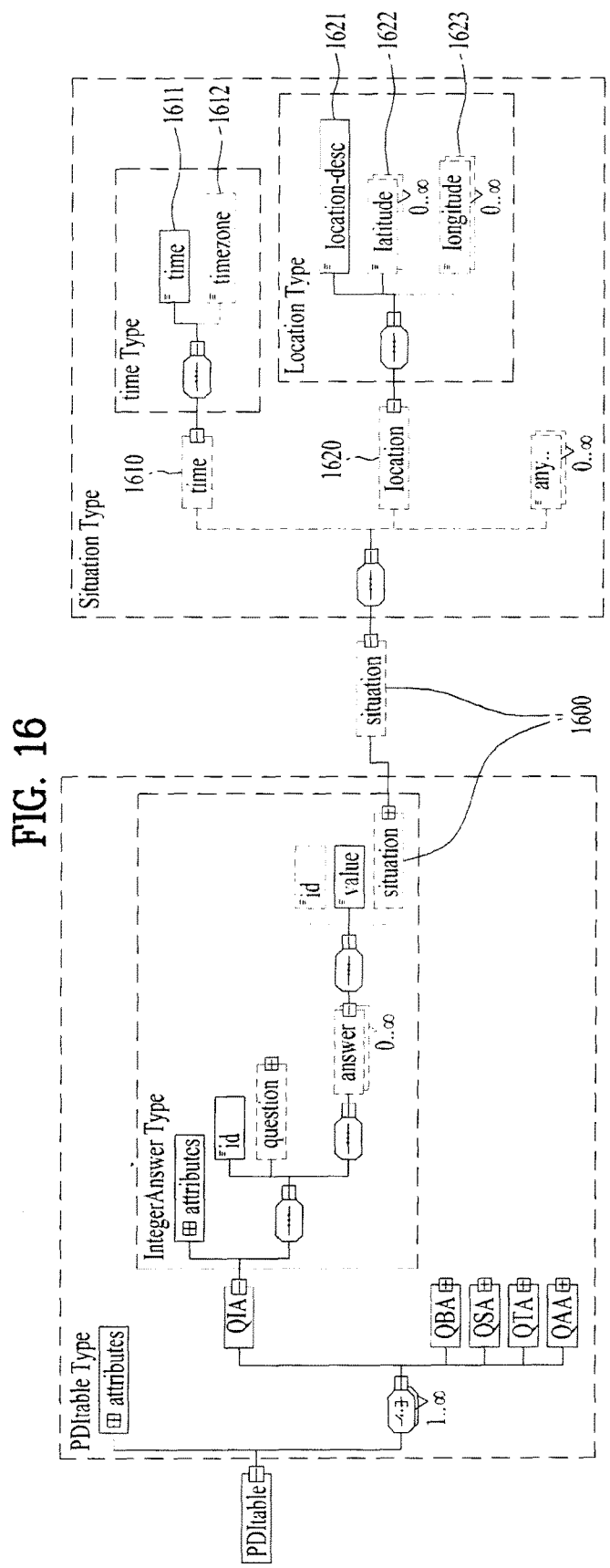
FIG. 16 is a diagram illustrating a PDI table according to another embodiment of the present invention.

FIG. 16 is a diagram illustrating a PDI table according to another embodiment of the present invention.

In detail, FIG. 16 illustrates an extended format of a PDI table in XML schema as the PDI table described with reference to FIGS. 11 through 15.

As described above, according to an embodiment of the present invention, the PDI table is used to provide a personalization service. However, despite of the same user, preferred content may be changed according to a situation to which the user belongs.

Thus, in order to overcome this problem, according to an embodiment of the present invention, the PDI table may further include an element indicating information regarding the situation of the user.

The PDI table illustrated in FIG. 16 may further include situation element 1600 as the element indicating the information regarding the situation of the user. The basic XML schema of the PDI table illustrated in FIG. 16 is the same as the XML schema described with reference to FIGS. 11 through 15, and thus, a detailed description thereof is omitted. Hereinafter, the situation element 1600 will be described.

The situation element 1600 according to the present embodiment may indicate information regarding a timezone and/or location as the information of situation of the user. As illustrated in FIG. 16, the situation element 1600 may further include a time element 1610, a location element 1620, and/or other elements indicating the information of situation of the user. Hereinafter, each element will be described.

The time element 1610 according to the present embodiment may include information regarding time of an area to which the user belongs. For example, the time element 1610 may include time attribute 1611 indicating time information in the form of "yyyy-mm-dd" and/or timezone attribute 1612 indicating a time zone of the area to which the user belongs.

The location element 1620 according to the present embodiment may include information of a location to which the user belongs. For example, as illustrated in FIG. 16, the location element 1620 may include location-desc attribute 1621 indicating information of a corresponding location, latitude attribute 1622 indicating information of latitude of the corresponding location, and/or longitude attribute 1623 indicating information of longitude of the corresponding location.

FIGS. 17A and 17B (hereinafter, FIG. 17) illustrate a PDI table according to another embodiment of the present invention.

In detail, FIG. 17 illustrates the PDI table in the XML schema described with reference to FIGS. 11 through 16 with regard to an embodiment of the present invention.

FIG. 17 depicts the XML schema definition for a root element called PDI Table, which defines the structure of PDI table instance documents. According to an embodiment of the present invention, the PDI table instance document refers to an actual document obtained by realizing the PDI table in the XML schema.

FIG. 17 also depicts the XML schema definitions for root elements QIA, QBA, QSA, QTA, or QAA, which represent individual questions that can be passed back and forth between DOs and the underlying receiver, using the PDI application programming interface (API). The PDI API according to the present embodiment will be described in detail. The elements shown in FIG. 17 may conform to the definitions in the XML schema with namespace "http://www.atsc.org/XMLSchemas/iss/pdi/1".

Differences between PDI question (or PDI-Q) and PDI answer (or PDI-A) are specified in the usage rules rather than the schema itself. The question portion of an entry in a PDI Table is informally called a "PDI Question" or "PDI-Q". The answer to a given PDI question is referred to informally as a "PDI-A". For example, while the schema indicates minOccurs="0" for the "q" element of the various types of questions, when the schema is used for PDI-Q, use of the "q" elements in that case are mandatory. When the schema is used for PDI-A, inclusion of the "q" elements is optional.

PDI-Q instance documents can conform to the "PDI Table" XML schema that is part of ATSC 2.0 Standard, with its namespace, and that definition can take precedence over the description provided here in the event of any difference. According to an embodiment of the present invention, the PDI-Q instance document refers to an actual document obtained by realizing the PDI table including PDI-Q in the XML schema.

A PDI-Q instance document consists of one or more elements of type QIA (integer-answer type question), QBA (Boolean-answer type question), QSA (selection-type question), and/or QTA (textual-answer type question).

No "A" (answer) child elements of these top-level elements can be present in a PDI-Q instance.

The identifier attribute ("id") in each of these elements can serve as a reference or linkage to corresponding elements in a PDI-A instance document. According to an embodiment of the present invention, the PDI-A instance document refers to an actual document obtained by realizing the PDI table including PDI-A in the XML schema.

PDI-A instance documents can conform to the "PDI Table" XML schema that is part of ATSC 2.0 Standard, with its namespace, and that definition can take precedence over the description provided here in the event of any difference.

A PDI-A instance document consists of one or more elements of type QIA (integer-answer type question), QBA (Boolean-answer type question), QSA (selection-type answer question), QTA (textual-answer type question), and/or QAA (any-format answer type question).

Each of these elements has at least one "A" (answer) child element. They may or may not include any "Q" (question string) child elements.

The identifier attribute ("id") in each of these elements can serve as a reference or linkage to corresponding elements in a PDI-Q instance document.

Hereinafter, semantics of the elements and attributes included in the PDI table illustrated in FIG. 17 will be described.

As illustrated in FIG. 17, in the PDI table according to the present embodiment, "@" may be indicated at the front of a name of attribute so as to distinguish between the attributes and the elements.

The PDI table according to the present embodiment may include PDI type elements. In detail, the PDI type elements may include QIA elements, QBA elements, QSA elements, QTA elements, and/or QAA elements, as described with reference to FIG. 11.

As illustrated in FIG. 17, the PDI table according to the present embodiment may include protocolversion attribute, pditableid attribute, pditableversion attribute, and/or time attribute regardless of the question type elements.

The id attributes of the QIA, QBA, QSA, QTA and QAA elements all have the same semantics, as do the expire attributes of each of these elements. Similarly the lang attributes of each of the Q elements each have the same semantics, as do the time attributes of each of the A elements. In addition, the id attributes may refer to the PDI data identifier that has been described with reference to FIG. 9.

A PDITable element contains the list of one or more question elements. Each one is in the format of QIA, QBA, QSA, QTA, or QAA. The use of the <choice> construct with cardinality 0 . . . N means that any number of QIA, QBA, QSA, QTA and QAA elements can appear in any order.

A protocol Version attribute of the PDITable element consists of 2 hex digits. The high order 4 bits indicates the major version number of the table definition. The low order 4 bits indicates the minor version number of the table definition. The major version number for this version of this standard is set to 1. Receivers are expected to discard instances of the PDI indicating major version values they are not equipped to support. The minor version number for this version of the standard is set to 0. Receivers are expected to not discard instances of the PDI indicating minor version values they are not equipped to support. In this case they are expected to ignore any individual elements or attributes they do not support.

A pdiTableId attribute of the PDITable element can be a globally unique identifier of this PDI Table element.

A pdiTableVersion attribute with 8-bit of the PDITable element indicates the version of this PDI Table element. The initial value can be 0. The value can be incremented by 1 each time this PDI Table element changes, with rollover to 0 after 255.

A time attribute of the PDITable element indicates the date and time of the most recent change to any question in this PDI Table.

A QIA element represents an integer-answer type of question. It includes optional limits specifying the maximum and minimum allowed values of the answer.

A QIA.loEnd attribute of QIA indicates the minimum possible value of an "A" child element of this QIA element. I.e., the value of an "A" element is no less than loEnd. If the loEnd attribute is not present, that indicates that there is no minimum.

A QIA.hiEnd attribute of QIA indicates the maximum possible value of an "A" child element of this QIA element. I.e., the value of an answer is no greater than hiEnd. If the hiEnd attribute is not present, that indicates that there is no maximum.

A QIA.Q element is a child element of the QIA element. The value of the QIA.Q element can represent the question string to be presented to users. The question must be formulated to have an integer-type answer. There may be multiple instances of this element, in different languages.

A QIA.A element as a child element of the QIA element can have a integer-value. The QIA.A element can represent an answer to the question in QIA.Q.

A QBA element represents a Boolean-answer type of question.

A QBA.Q element is a child element of the QBA element. The value of the QBA.Q element can represent the question string to be presented to users. The question must be formulated to have a yes/no or true/false type of answer. There may be multiple instances of this element in different languages.

A QBA.A element as a child element of the QBA element can have a Boolean-value. A QBA.A element can represent an answer to the question in QBA.Q.

A QSA element represents a selection-answer type of question.

A QSA.minChoices attribute of the QSA element can specify the minimum number of selections that can be made by a user.

A QSA.maxChoices attribute of the QSA element can specify the maximum number of selections that can be made by a user.

A QSA.Q element is a child element of the QSA element. The value of the QSA.Q element represents the question string to be presented to users. The question must be formulated to have an answer that corresponds to one or more of the provided selection choices.

A QSA.Q.Selection element is a child element of the QSA.Q element. The value of the QSA.Q.Selection element can represent a possible selection to be presented to the user. If there are multiple QSA.Q child elements of the same QSA element (in different languages), each of them has the same number of Selection child elements, with the same meanings.

A QSA.Q.Selection.id attribute of QSA.Q.Selection can be an identifier for the Selection element, unique within the scope of QSA.Q. If there are multiple QSA.Q child elements of the same QSA element (in different languages), there can be a one-to-one correspondence between the id attributes of their Selection elements, with corresponding Selection elements having the same meaning.

A QSA.A is a child element of the QSA element. Each instance of this child element of the QSA element can specify one allowed answer to this selection-type question, in the form of the id value of one of the Selection elements.

A QTA element represents a textual-answer (free-form entry) type of question.

A QTA.Q element is a child element of the QTA element. The value of the QTA.Q element can represent the question string to be presented to users. The question must be formulated to have a free-form text answer.

A QTA.A element is a child element of the QTA element. The value of the QTA.A element can represent an answer to the question in QTA,Q.

A QAA element may be used to hold various types of information, like an entry in a database.

A QAA.A element is a child element of the QAA element. The value of the QAA.A element contains some type of information.

An id attribute of the QIA, QBA, QSA, QTA, and QAA elements can be a URI which is a globally unique identifier for the element in which it appears.

An expire element of the QIA, QBA, QSA, QTA, and QAA elements can indicate a date and time after which the element in which it appears is no longer relevant and is to be deleted from the table.

A lang attribute of the QIA.Q, QBA.Q, QSA.Q, QTA.Q, and QTA.A elements can indicate the language of the question or answer string. In the case of QSA.Q, the lang attribute can also indicate the language of the Selection child elements of QSA.Q. If the lang attribute is not present, that can indicate that the language is English.

A time attribute of the QIA.A, QBA.A, QSA.A, QTA.A, and QAA.A elements can indicate the date and time the answer was entered into the table.

Although not illustrated in FIG. 17, the PDI table according to the present embodiment may further include QIAD element, QBAD element, QSAD element, QTAD element, and/or QAAD element. The aforementioned elements will be collectively called the QxAD elements. Hereinafter, the QxAD elements will be described.

A QIAD element as a root element shall contain an integer-answer type of question in the QIA child element. QIA includes optional limits specifying the maximum and minimum allowed values of the answer.

A QBAD element as a root element shall represent a Boolean-answer type of question.

A QSAD element as a root element shall represent a selection-answer type of question.

A QTAD element as a root element shall represent a textual-answer (free-form entry) type of question.

A QAAD element as a root element shall be used to hold various types of information, like an entry in a database.

Although not illustrated in FIG. 17, each PDI type element may further include a QText element and/or time attribute.

A QIA.Q.QText element is a child element of the QIA.Q element. The value of the QIA.Q.QText element shall represent the question string to be presented to users. The question must be formulated to have an integer-type answer.

A QIA.A.answer attribute is an integer-valued attribute of the QIA.A element. The QIA.A.answer attribute shall represent an answer to the question in QIA.Q.QText element.

A QBA.Q.Qtext element is a child element of the QBA.Q element. The value of the QBA.Q.Qtext element shall represent the question string to be presented to users. The question must be formulated to have a yes/no or true/false type of answer. There may be multiple instances of this element in different languages.

A QBA.A.answer attribute is a Boolean-valued attribute of the QBA.A element. The QBA.A@answer attribute shall represent an answer to the question in QBA.Q.QText element.

A QSA.Q.QText element is a child element of the QSA.Q element. The QSA.Q.QText element shall represent the question string to be presented to users. The question must be formulated to have an answer that corresponds to one or more of the provided selection choices. There may be multiple instances of this element in different languages.

A QSA.A.answer attribute of the QSA.A child element shall specify one allowed answer to this selection-type question, in the form of the id value of one of the Selection elements.

A QTA.Q.QText element is a child element of the QTA element. The value of the QTA.Q.QText element shall represent the question string to be presented to users. The question must be formulated to have a free-form text answer.

A QTA.A.answer attribute is a child element of the QTA element. The value of the QTA.A.answer element represents an answer to the question in QTA.Q.QText element.

FIGS. 18A and 18B (hereinafter, FIG. 18) illustrates a PDI table according to another embodiment of the present invention.

In detail, FIG. 18 illustrates the structure of the PDI table in the XML schema described with reference to FIGS. 11 through 16

The basic structure of the PDI table illustrated in FIG. 18 and semantics of the basic elements and attributes are the same as those in FIG. 17. However, unlike the PDI table illustrated in FIG. 17, the PDI table illustrated in FIG. 18 may further include a xactionSetId attribute and/or a text attribute. Hereinafter, the PDI table will be described in terms of the xactionSetId attribute and/or the text attribute.

A xactionSetId attribute of the QxA elements indicates that the question belongs to a transactional set of questions, where a transactional set of questions is a set that is to be treated as a unit for the purpose of answering the questions. It also provides an identifier for the transactional set to which the question belongs. Thus, the set of all questions in a PDI Table that have the same value of the xactionSetId attribute is answered on an "all or nothing" basis.

A text attribute of the QxA elements is a child element of QxA.Q elements. The value of the text attribute can represents the question string to be presented to users.

FIG. 19 is a diagram illustrating a filtering criteria table according to an embodiment of the present invention. The aforementioned personalization broadcast system of FIG. 7 may use filtering criteria in order to provide a personalization service. The filtering criteria described with reference to FIGS. 7, 9, and 10 may be processed in the form of filtering criteria table. According to an embodiment of the present invention, the filtering criteria table may be represented in the form of XML Schema.

According to an embodiment of the present invention, the filtering criteria table may have a similar format to a format of the PDI table in order to effectively compare the PDI data and the filtering criteria. The format of the filtering criteria table according to the present embodiment may be changed according to a designer's intention.

As illustrated in FIG. 19, the filtering criteria table according to the present embodiment may include a filtering criterion element 1900. The filtering criterion element 1900 may include identifier attribute 1901, criterion type attribute 1902, and/or a criterion value element 1903. The filtering criterion according to the present embodiment may be interpreted as corresponding to the aforementioned PDI question. Hereinafter, elements of the filtering criteria table illustrated in FIG. 19 will be described.

The filtering criterion element 1900 according to the present embodiment may indicate filtering criterion corresponding to the PDI question.

The identifier attribute 1901 according to the present embodiment may identify a PDI question corresponding to the filtering criterion.

The criterion type attribute 1902 according to the present embodiment may indicate a type of the filtering criterion. The type of the filtering criterion will be described in detail.

The criterion value element 1903 according to the present embodiment may indicate a value of the filtering criterion. Each criterion value is a possible answer to the PDI question.

In detail, the type of the filtering criterion according to the present invention may be one of an integer type, a Boolean type, a selection type, a text type, and/or any type.

The filtering criterion of the integer type (or integer type criterion) refers to filtering criterion corresponding to a PDI answer of the integer type.

The filtering criterion of the Boolean type (or Boolean type criterion) refers to filtering criterion corresponding to a PDI answer of the Boolean type.

The filtering criterion of the selection type (or selection type criterion) refers to filtering criterion corresponding to a PDI answer of the selection type.

The filtering criterion of the text type (or text type criterion) refers to filtering criterion corresponding to a PDI answer of the text type.

The filtering criterion of any type (or any type criterion) refers to filtering criterion corresponding to a PDI answer of any type.

[Example 5] below shows XML schema of the filtering criteria table illustrated in FIG. 19 according to an embodiment of the present invention.

Example 5

```
<?xml version="1.0" encoding="UTF-8"?>
<xs:schema      xmlns:xs="http://www.w3.org/2001/XMLSchema"
elementFormDefault="qualified" attributeFormDefault="unqualified">
<xs:element name="FilterCriteriaTable" type="FilterCriteriaTableType"/>
<xs:complexType name="FilterCriteriaTableType">
<xs:sequence maxOccurs="unbounded">
<xs:element name="FilterCriterion" type="FilterCriterionType"/>
</xs:sequence>
</xs:complexType>
<xs:complexType name="FilterCriterionType">
<xs:sequence>
   <xs:element      name="CriterionValue"      type="xs:base64Binary"
maxOccurs="unbounded"/>
</xs:sequence>
<xs:attribute name="id" type="xs:anyURI" use="required"/>
<xs:attribute name="CriterionType" type="xs:unsignedByte"
use="required"/>
</xs:complexType>
</xs:schema>
```

Figure 20:
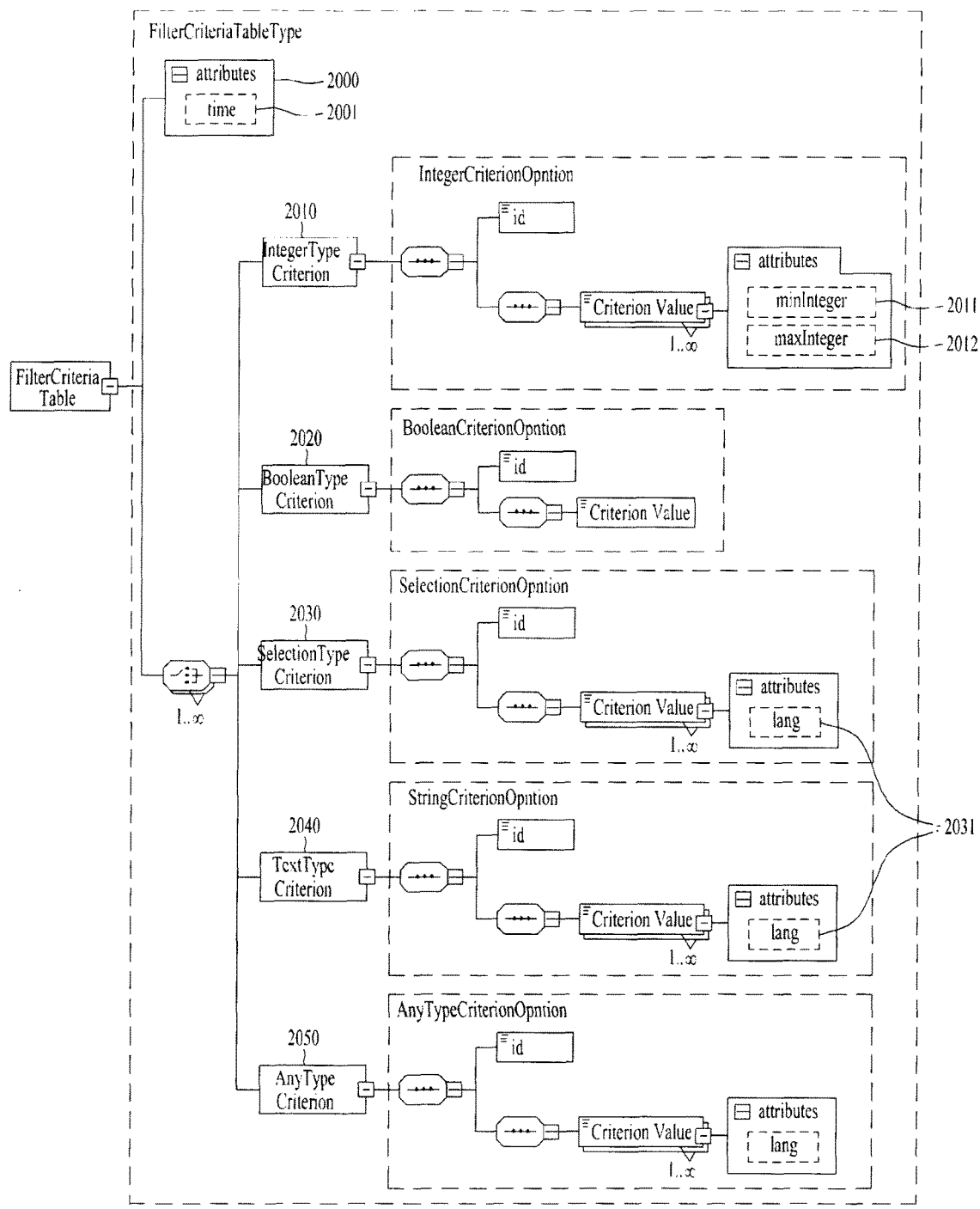
FIG. 20 is a diagram illustrating a filtering criteria table according to another embodiment of the present invention.

FIG. 20 is a diagram illustrating a filtering criteria table according to another embodiment of the present invention.

In detail, FIG. 20 illustrates an extended format of a filtering criteria table in XML schema as the filtering criteria table described with reference to FIG. 19. When the filtering criteria table is configured in the XML schema of the filtering criteria illustrated in FIG. 19, a type of filtering criterion according to an embodiment of the present invention. and detailed attribute for each type thereof cannot be set. Thus, FIG. 20 illustrates a type of filtering criterion and proposes XML schema for setting attribute for each type. A personalization broadcast system according to an embodiment of the present invention may more precisely filter content using a filtering criteria table configured in the XML schema of FIG. 20.

As illustrated in FIG. 20, the filtering criteria table may include attributes 2000 and/or filtering criterion type elements. The attributes 2000 according to the present embodiment may include time attribute 2001. The filtering criterion type elements according to the present embodiment may include an integer type criterion element (or QIA criterion element) 2010, a Boolean type criterion element (or QBA criterion element) 2020, a selection type criterion element (or QSA criterion element) 2030, a text type criterion element (or QTA criterion element) 2040, and/or any type criterion element (or QAA criterion element) 2050. Hereinafter, elements of the filtering criteria table illustrated in FIG. 20 will be described.

In detail, the attributes 2000 illustrated in FIG. 11 may indicate information of attributes of the filtering criteria table according to the present embodiment. Thus, even if filtering criteria type elements included in the filtering criteria table are changed, the attributes 2000 may not be changed. For example, the time attribute 2001 according to the present embodiment may indicate time when the filtering criteria are generated or updated. In this case, filtering criteria tables including different filtering criteria type elements may include the time attribute 2001 even if the filtering criteria type elements are changed.

The filtering criteria table according to the present embodiment may include one or more or more filtering criteria type elements. The filtering criteria type elements according to the present embodiment may indicate a type of filtering criterion. The type of filtering criterion has been described with reference to FIG. 19. In this case, the filtering criteria type elements may be represented in a list form.

The filtering criteria type elements according to the present embodiment may also be referred to as "QxA" criterion. In this case, "x" may be determined according to a type of filtering criterion.

As illustrated in FIG. 20, each of the filtering criteria type elements may include an identifier attribute and/or a criterion value element. An identifier attribute and a criterion value element illustrated in FIG. 20 are the same as those described with reference to FIG. 19.

However, as illustrated in FIG. 20, an integer type criterion element 2010 may further include a min integer attribute 2011 and/or a max integer attribute 2012. The min integer attribute 2011 according to the present embodiment may indicate a minimum value of the filtering criterion represented as an integer type answer. The max integer attribute 2012 according to the present embodiment may indicate a maximum value of the filtering criterion represented as an integer type answer.

As illustrated in FIG. 20, a selection type criterion element 2030 and/or a text type criterion element 2040 may include lang attribute 2031. The lang attribute 2031 according to the present embodiment may indicate a value of the filtering criterion represented in a text type answer.

[Example 6] below shows XML schema of the filtering criteria table illustrated in FIG. 20 according to an embodiment of the present invention.

Example 6

```
<?xml version="1.0" encoding="UTF-8"?>
<xs:schema    xmlns:xs="http://www.w3.org/2001/XMLSchema"
elementFormDefault="qualified"
attributeFormDefault="unqualified">
<xs:element name="FilterCriteriaTable"
type="FilterCriteriaTableType"/>
<xs:complexType name="FilterCriteriaTableType">
<xs:choice maxOccurs="unbounded">
<xs:element name="IntegerTypeCriterion"
type="IntegerCriterionOption"/>
<xs:element name="BooleanTypeCriterion"
type="BooleanCriterionOpntion"/>
<xs:element name="SelectionTypeCriterion"
type="StringCriterionOption"/>
<xs:element name="TextTypeCriterion"
type="StringCriterionOption"/>
<xs:element name="AnyTypeCriterion"
type="AnyTypeCriterionOption"/>
</xs:choice>
<xs:attribute name="time" type="xs:dateTime"/>
</xs:complexType>
<xs:complexType name="IntegerCriterionOption">
<xs:sequence>
<xs:element name="id" type="xs:anyURI"/>
<xs:sequence>
<xs:element name="CriterionValue" maxOccurs="unbounded">
<xs:complexType>
<xs:simpleContent>
<xs:extension base="xs:integer">
<xs:attribute name="minInteger" type="xs:integer"/
<xs:attribute name="maxInteger" type="xs:integer"/>
</xs:extension>
</xs:simpleContent>
</xs:complexType>
</xs:element>
</xs:sequence>
</xs:sequence>
</xs:complexType>
<xs:complexType name="BooleanCriterionOpntion">
<xs:sequence>
<xs:element name="id" type="xs:anyURI"/>
<xs:sequence>
<xs:element name="CriterionValue" type="xs:boolean"/>
</xs:sequence>
</xs:sequence>
</xs:complexType>
<xs:complexType name="StringCriterionOption">
<xs:sequence>
<xs:element name="id" type="xs:anyURI"/>
<xs:sequence>
<xs:element name="CriterionValue" maxOccurs="unbounded">
<xs:complexType>
<xs:simpleContent>
<xs:extension base="xs:string">
<xs:attribute name="lang" type="xs:string" default="EN-US"/>
</xs:extension>
</xs:simpleContent>
</xs:complexType>
</xs:element>
</xs:sequence>
</xs:sequence>
</xs:complexType>
<xs:complexType name="AnyTypeCriterionOption">
<xs:sequence>
<xs:element name="id" type="xs:anyURI"/>
<xs:sequence>
<xs:element name="CriterionValue" maxOccurs="unbounded"/>
<xs:complexType>
<xs:simpleContent>
<xs:extension base="xs:base64Binary">
<xs:attribute name="any" type="xs:anySimpleType"/>
</xs:extension>
```

```
    </xs:simpleContent>
   </xs:complexType>
   </xs:sequence>
   </xs:sequence>
</xs:complexType></xs:schema>
```

FIG. 21 is a diagram illustrating a filtering criteria table according to another embodiment of the present invention.

In detail, FIG. 21 illustrates a filtering criteria table in the XML schema described with reference to FIGS. 19 and 20. Basic elements of the filtering criteria table illustrated in FIG. 21 are the same as the elements described with reference to FIGS. 19 and 20. Hereinafter, semantics of the elements and attributes included in the filtering criteria table illustrated in FIG. 21 will be described.

As illustrated in FIG. 21, in the filtering criteria table according to the present embodiment, "@" may be indicated at the front of a name of attribute so as to distinguish between the attributes and the elements.

In each place where an @id attribute appears in the table, it shall be the @id attribute of a question in a PDI Table, thereby identifying the question that corresponds to the filtering criterion in which the @id attribute appears.

A QIA Criterion element shall represent a filtering criterion corresponding to a question with an integer value.

If a Criterion Value child element of a QIA Criterion element does not contain an @extent element, it shall represent an integer answer for the question corresponding to the filtering criterion. If a Criterion Value child element of a QIA Criterion element contains an @extent attribute, then it shall represent the lower end of a numeric range of answers for the question, and the @extent attribute shall represent the number of integers in the range.

A QBA Criterion element shall represent a filtering criterion corresponding to a question with a Boolean value.

A Criterion Value child element of a QBACriterion element shall represent a Boolean answer for the question corresponding to the filtering criterion.

A QSA Criterion element shall represent a filtering criterion corresponding to a question with selection value(s).

A Criterion Value child element of a QSA Criterion element shall represent the identifier of a selection answer for the question corresponding to the filtering criterion.

A QTA Criterion element shall represent a filtering criterion corresponding to a question with string value.

A Criterion Value child element of a QTA Criterion element shall represent a text answer for the question corresponding to the filtering criterion.

A QAA Criterion element shall represent a filtering criterion corresponding to a "question" that has only a text "answer" with no question.

A Criterion Value child element of a QAACriterion element shall represent a text "answer" for the "question" corresponding to the filtering criterion.

If there is only one Criterion Value element in the Filtering Criteria element, then the filtering decision for whether the service or content item passes the filter shall be "true" (yes) if the value of the Criterion Value element matches a value that is among the answers in the PDI-A for the question corresponding to the element containing the Criterion Value element (where the question is indicated by the id attribute of the element containing the Criterion Value element), and it shall be "false" (no) otherwise.

In the case of a Criterion Value child element of a QIA Criterion element in which the "extent" attribute is present, the value of the Criterion Value element shall be considered to match a value that is among the answers in the corresponding PDI-A if the value of the answer is in the interval defined by the Criterion Value and the extent attribute.

If the total number of Criterion Value elements in the Filtering Criteria element is greater than one, the result of each Criterion Value element shall be evaluated as an intermediate term, returning "true" if the Criterion Value matches a value that is among the answers in the PDI-A for the question corresponding to the filtering criterion (as indicated by the id value) and returning "false" otherwise. Among these intermediate terms, those with the same value of their parent element identifier (QIA.id, QBA.id, etc.) shall be logically ORed to obtain the interim result for each targeting criterion, and these interim results shall be logically ANDed together to determine the final result. If the final result evaluates to "true" for a receiver, it shall imply that the associated content item passes the filter.

FIG. 22 is a diagram illustrating a filtering criteria table according to another embodiment of the present invention.

In detail, FIG. 22 illustrates an extended format of the filtering criteria table illustrated in FIG. 21. Basic elements of the filtering criteria table illustrated in FIG. 22 are the same as the elements described with reference to FIG. 21. Hereinafter, the filtering criteria table illustrated in FIG. 22 will be described in terms of differences from the filtering criteria table described with reference to FIG. 21.

The filtering criteria table illustrated in FIG. 22 allows multiple instances of the set of filtering criteria. Each set includes multiple instance of filtering criteria. Each filtering criterion allows multiple values to be provided for some of the filtering criteria. The filtering logic is "OR" logic among multiple instances of the set of filtering criteria. Within each set of filtering criteria, the filtering logic is "OR" logic among multiple values for the same filtering criterion, and "AND" logic among different filtering criteria.

For example, if the filtering criteria is ((age=20) AND (genre="sport")) OR ((age=10) AND (genre="animation")), filtering criteria table can be represented as an example below.

```
<FilterCriteriaTable       time="2012-09-03T09:30:47.0Z"
xmlns:xsi="http://www.w3.org/2001/XMLSchema-instance">
  <FilterCriterionSet>
    <IntegerTypeCriterion id="abc.tv/age/">
      <CriterionValue>20</CriterionValue>
    </IntegerTypeCriterion>
    <TextTypeCriterion id = "abc.tv/genre/">
      <CriterionValue>sport</CriterionValue>
    </TextTypeCriterion>
  </FilterCriterionSet>
  <FilterCriterionSet>
    <IntegerTypeCriterion id= "abc.tv/age/">
      <CriterionValue>10</CriterionValue>
    </IntegerTypeCriterion>
    <TextTypeCriterion id = "abc.tv/genre//">
      <CriterionValue>animation</CriterionValue>
    </TextTypeCriterion>
  </FilterCriterionSet>
</FilterCriteriaTable>
```

Figure 23:
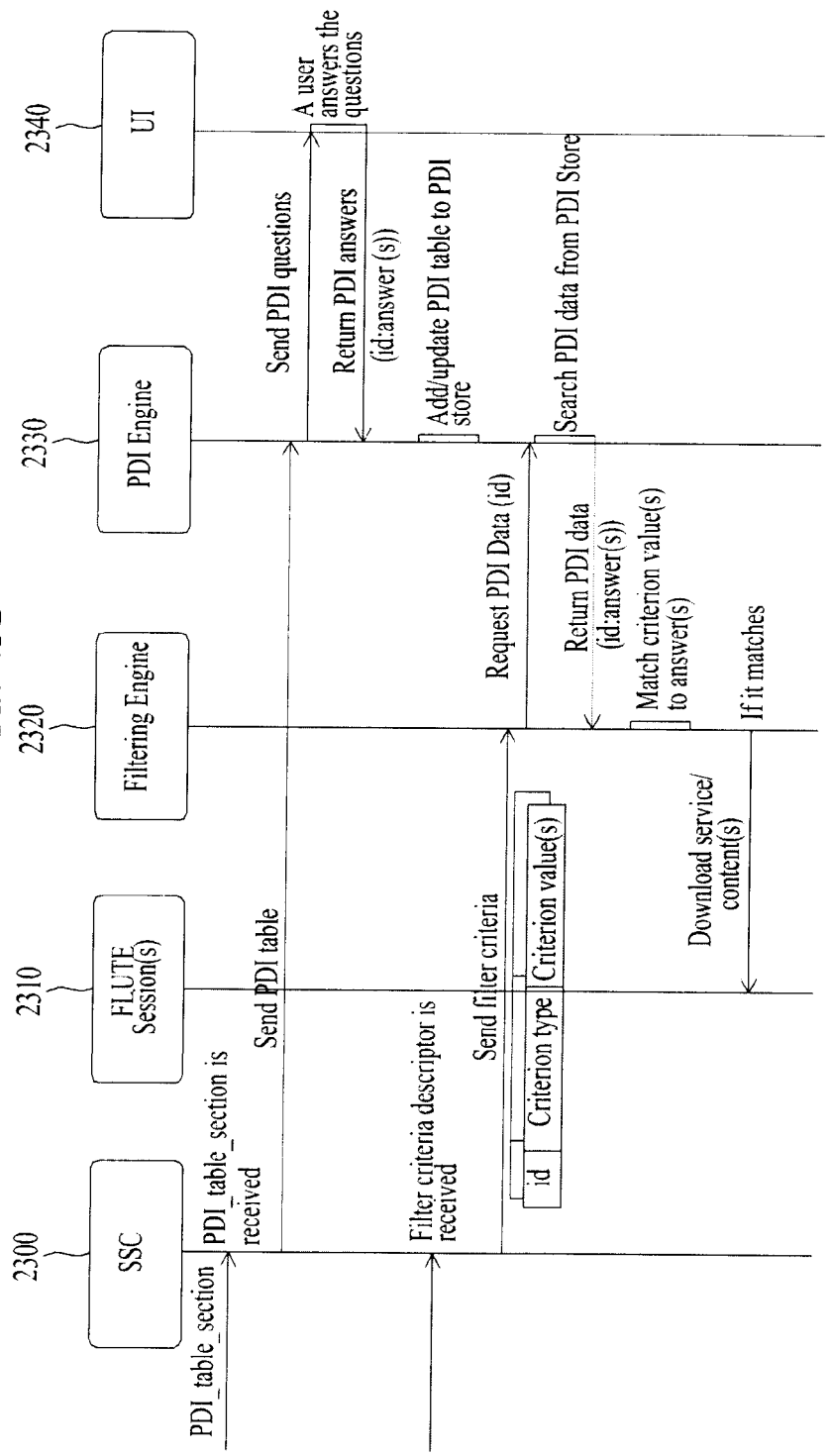
FIG. 23 is a flowchart of a digital broadcast system according to another embodiment of the present invention.

FIG. 23 is a flowchart of a digital broadcast system according to another embodiment of the present invention.

In detail, FIG. 23 is a flowchart of a personalization broadcast system that allows a receiver according to the embodiment of the present invention to receive a PDI table and/or a filtering criteria table via a broadcast network.

The basic structure of the personalization broadcast system according to the present embodiment is the same as the structure described with reference to FIGS. 7 through 10. The PDI table according to the present embodiment is the same as the table described with reference to FIGS. 9 through 18. The filtering criteria table according to the present embodiment is the same as the table described with reference to FIGS. 19 through 22.

As illustrated in FIG. 23, the personalization broadcast system according to the present embodiment may include a service signaling channel (SSC) 2300, a file delivery over unidirectional transport (FLUTE) session 2310, a filtering engine 2320, a PDI engine 2330, and/or a UI 2340. The receiver according to the present embodiment may receive a PDI table through a digital storage media command and control (DSM-CC) section. In this case, the receiver according to the present embodiment may receive the PDI table through the FLUTE session 2310. The structure of the aforementioned personalization broadcast system may be changed according to a designer's intention. Hereinafter, operations of elements of FIG. 23 will be described.

First, the receiver according to the present embodiment may receive the PDI table section through the SSC 2300. In detail, the receiver according to the present embodiment may parse IP datagram corresponding to the SSC 2300 among IP datagram received through the DSM-CC section to receive the PDI table section. In this case, the receiver according to the present embodiment may receive the PDI table section using a well-known IP address and/or UDP port number included in the SSC 2300. The PDI table section according to the present embodiment refers to a table obtained by compressing a PDI table according to an embodiment of the present invention in order to transmit the PDI table via a broadcast network. The PDI table section will be described in detail.

The receiver according to the present embodiment may parse the PDI table section received through the SSC 2300 to acquire the PDI table. Then, the receiver according to the present embodiment may transmit the PDI table to the PDI engine 2330.

The PDI engine 2330 according to the present embodiment may process the received PDI table and extract PDI questions included in a corresponding PDI table. Then, the PDI engine 2330 according to the present embodiment may transmit the extracted PDI questions to the UI 2340.

The UI 2340 according to the present embodiment may display the received PDI questions and receive PDI answers to the corresponding PDI questions. In this case, the UI 2340 according to the present embodiment may receive the PDI answers through a remote controller. Then, the PDI engine 2330 according to the present embodiment may update PDI data using the PDI answer received from the UI 2340. A detailed description thereof has been described with reference to FIGS. 7 and 8.

The receiver according to the present embodiment may receive a service map table (SMT) and/or a non real time information table (NRT-IT) through the SSC 2300. The SMT according to the present embodiment may include signaling information for a personalization service. The NRT-IT according to the present embodiment may include announcement information for a personalization service.

Then, the receiver according to the present embodiment may parse the received SMT and/or NRT-IT to acquire a filtering criteria descriptor. The receiver may transmit filtering criteria to the filtering engine 2320 using the filtering criteria descriptor. In this case, according to an embodiment of the present invention the filtering criteria may be a filtering criteria table with a format of xml document. The filtering criteria table has been described in detail with reference to FIGS. 21 and 22.

Then, the filtering engine 2320 according to the present embodiment may transmit a PDI data request signal to the PDI engine 2330. When the PDI engine 2330 according to the present embodiment receives the PDI data request signal, the PDI engine 2330 may search for PDI data corresponding to the corresponding PDI data request signal and transmit the PDI data to the filtering engine 2320. As a result, the receiver according to the present embodiment may download content using a filtering result. Processes subsequent to the filtering according to the present embodiment have been described in detail with reference to FIGS. 9 and 10.

FIG. 24 is a diagram illustrating a PDI table section according to an embodiment of the present invention.

In detail, FIG. 24 illustrates syntax of the PDI table section described with reference to FIG. 23.

When a PDI table is delivered in the broadcast stream, the XML form of the Table defined in FIG. 23 is compressed using the DEFLATE compression algorithm. The resulting compressed table then is encapsulated in NRT-style private sections by dividing it into blocks and inserting the blocks into sections as shown in the Table of FIG. 24.

As a result, the receiver according to the present embodiment may combine blocks of a PDI-Q instance document in an order of section numbers having the same sequence number and release compression. The receiver according to the present embodiment may generate the PDI-Q instance document as a result of compression release. Then, the receiver may transmit the PDI-Q instance document to a PDI Engine according to an embodiment of the present invention. The detailed method has been described with reference to FIG. 23.

Hereinafter, syntax of the PDI table section illustrated in FIG. 24 will be described.

The blocks shall be inserted into the sections in order of ascending section_number field values. The private sections are carried in the Service Signaling Channel (SSC) of the IP subnet of the virtual channel to which the PDI Table pertains, as the terms "Service Signaling Channel" and "IP subnet" are defined in the ATSC NRT standard. The sequence_number fields in the sections are used to distinguish different PDI table instances carried in the same SSC.

A table_id field with 8-bits, shall be set to identify this table section as belonging to a PDI Table instance. The table_id field may indicate that the PDI table section illustrated in FIG. 24 contains information regarding a PDI table according to an embodiment of the present invention.

A section_syntax_indicator field according to the present embodiment may indicate a format of the PDI table section.

A private_indicator field according to the present embodiment may indicate bit information for users.

A section_length field according to the present embodiment may indicate a number of bytes in the PDI table section.

A table_id_extension field according to the present embodiment may identify the PDI table section.

A protocol_version field according to the present embodiment may contain the protocol versions of the PDI table syntax.

The value of the sequence_number field with 8-bits, is the same as the sequence_number of all other sections of this PDI-Q instance and different from the sequence_number of all sections of any other PDI-Q instance carried in this Service Signaling Channel. The sequence_number field is used to differentiate sections belonging to different instances of the PDI-Q that are delivered in the SSC at the same time.

A PDIQ_data_version field with 5-bits indicates the version number of this PDI-Q instance, where the PDI-Q instance is defined by its pdiTableId value. The version number is incremented by 1 modulo 32 when any element or attribute value in the PDI-Q instance changes.

A current_next_indicator field with a 1-bit always is set to '1' for PDI-Q sections indicates that the PDI-Q sent is always the current PDI-Q for the segment identified by its segment_id.

A section_number field with 8-bits gives the section number of this section of the PDI-Q instance. The section_number of the first section in an PDI-Q instance is set to be 0x00. The section_number is incremented by 1 with each additional section in the PDI-Q instance.

A last_section_number field with 8-bits gives the number of the last section (i.e., the section with the highest section_number) of the PDI-Q instance of which this section is a part.

A service_id field with 16-bits is set to 0x0000 to indicate that this PDI-Q instance applies to all data services in the virtual channel in which it appears, rather than to any particular service.

A pdiq_bytes( ) field with a variable length consists of a block of the PDI-Q instance carried in part by this section. When the pdiq_bytes( ) fields of all the sections of this table instance are concatenated in order of their section_number fields, the result is the complete PDI-Q instance.

FIG. 25 is a diagram illustrating a PDI table section according to another embodiment of the present invention.

In detail, FIG. 25 illustrates syntax of the PDI table section described with reference to FIG. 23. A basic description has been given with reference to FIG. 24. However, unlike the PDI table section illustrated in FIG. 24, the PDI table section illustrated in FIG. 25 may not include a sequence_number field. Hereinafter, the syntax of the PDI table section illustrated in FIG. 25 will be described.

A num_questions field according to the present embodiment may indicate the number of PDI questions included in the PDI table.

A question_id_length field according to the present embodiment may indicate a length of an ID of one PDI question.

A question_id field according to the present embodiment may indicate an ID of one PDI question.

A question_text_length field according to the present embodiment may indicate a length of question_text.

A question_text field according to the present embodiment may include actual content of one PDI question.

An answer_type_code field according to the present embodiment may indicate a type of a PDI answer to a PDI question. In detail, the answer_type_code field according to the present embodiment may include answer type codes represented in [Example 7] below. Hereinafter, each answer type code shown in [Example 7] below may indicate a type of each of the PDI answers described with reference to FIG. 11.

Example 7

| answer_type_code | value |
|---|---|
| 0x00 | Reserved |
| 0x01 | Integer type |
| 0x02 | Boolean type |
| 0x03 | String type (including selection type/text type) |
| 0x04-0x07 | Reserved for future ATSC use |

A num_answer field according to the present embodiment may indicate the number of PDI answers to a PDI question.

An answer_value_length field according to the present embodiment may indicate an actual length of answer_value.

An answer_value field according to the present embodiment may include actual content of a PDI answer represented as answer_type_code.

FIG. 26 is a diagram illustrating a PDI table section according to another embodiment of the present invention.

In detail, FIG. 26 illustrates syntax of the PDI table section described with reference to FIG. 23. A basic description has been given with reference to FIGS. 24 and 25. Fields constituting the syntax of FIG. 26 are the same as fields constituting the syntax of FIG. 25, and thus, a detailed description thereof is omitted.

FIG. 27 is a diagram illustrating a PDI table section according to another embodiment of the present invention.

In detail, FIG. 27 illustrates syntax of the PDI table section described with reference to FIG. 23. A basic description has been given with reference to FIGS. 24 and 25. Basic fields constituting the syntax of FIG. 27 are the same fields constituting the syntax of FIG. 25, and thus, a detailed description thereof is omitted.

However, unlike the syntax of FIG. 25, the syntax of FIG. 27 may further include a sequence_number field. The sequence_number field according to the present embodiment is the same as the sequence_number field described with reference to FIG. 24.

FIG. 28 is a flowchart of a digital broadcast system according to another embodiment of the present invention.

In detail, FIG. 28 illustrates operations of a FLUTE session, a filtering engine, and/or a PDI engine in the personalization broadcast system described with reference to FIG. 23 according to an embodiment of the present invention.

As illustrated in FIG. 28, the personalization broadcast system according to the present embodiment may include a FLUTE session 2800, a filtering engine 2810, and/or a PDI engine 2820. The personalization broadcast system according to the present embodiment may provide a next generation broadcast service for providing an ATSC 2.0 service or a personalization service. The structure of the aforementioned personalization broadcast system may be changed according to a designer's intention.

As described with reference to FIG. 23, the receiver according to the present embodiment may receive a PDI table through a FLUTE session. Hereinafter, a method of receiving a PDI table through a FLUTE session by a receiver will be described with regard to an embodiment of the present invention with reference to FIG. 28.

The receiver according to the present embodiment may receive a field delivery table (FDT) instance through the FLUTE session 2800. The FDT instance is a transmission unit of content transmitted through the same FLUTE session 2800. The FDT instance according to the present embodiment may include content type attribute indicating a type of content. In detail, the content type attribute according to the present embodiment may include content indicating that a file transmitted through the FLUTE session 2800 is a PDI-Q instance document (or a PDI table). The content type attribute according to the present embodiment will be described in detail.

The receiver according to the present embodiment may recognize that a field transmitted through the FLUTE session 2800 is the PDI-Q instance document using the FDT instance. Then, the receiver according to the present embodiment may transmit the PDI-Q instance document to the PDI engine 2820. A detailed description thereof has been described with reference to FIG. 23.

Figure 29:
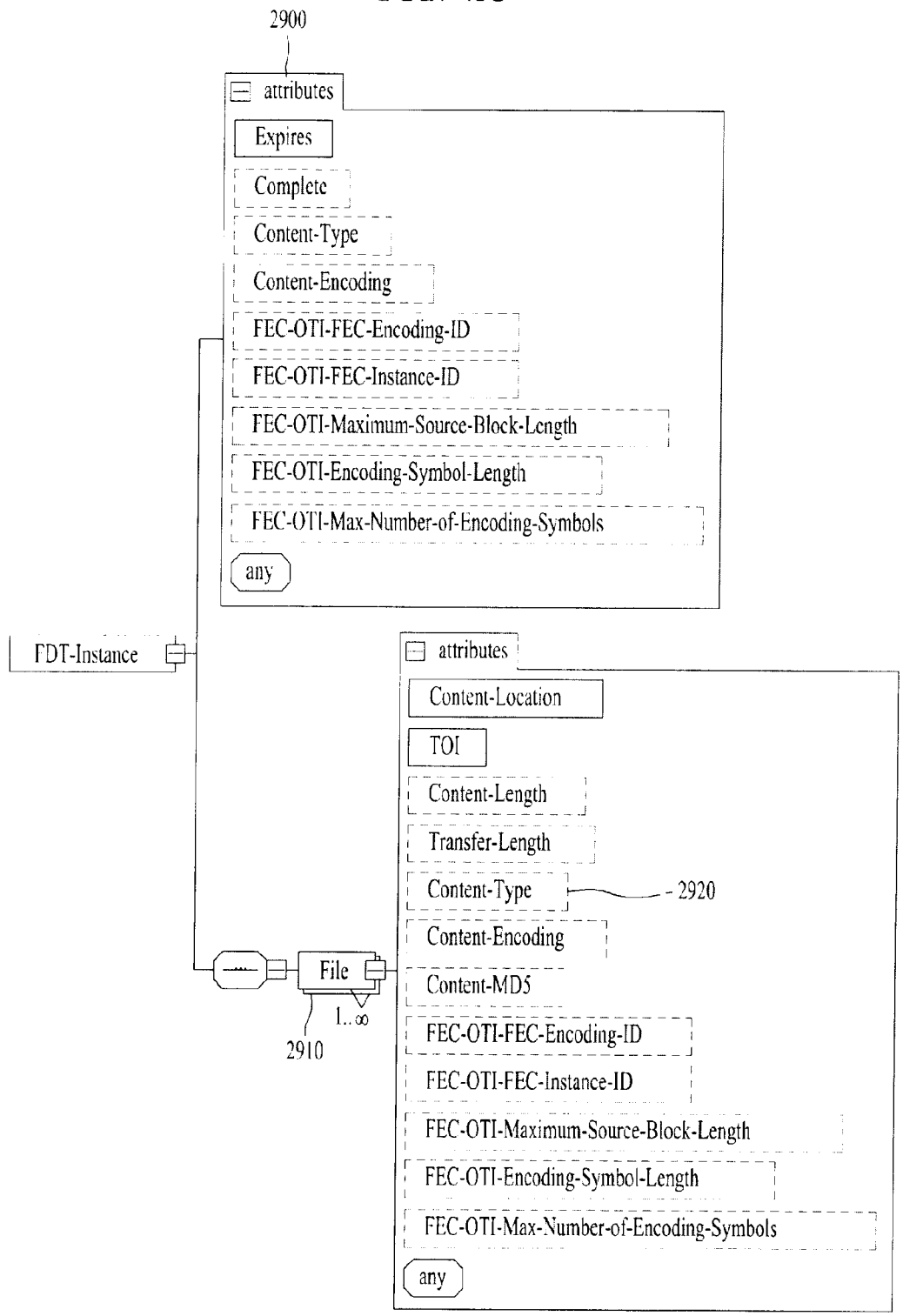
FIG. 29 is a diagram illustrating XML schema of an FDT instance according to another embodiment of the present invention.

FIG. 29 is a diagram illustrating XML schema of an FDT instance according to another embodiment of the present invention.

In detail, FIG. 29 illustrates XML schema of the FDT instance described with reference to FIG. 28. Hereinafter, the aforementioned content type attribute 2900 will be described.

As illustrated in FIG. 29, the FDT instance according to the present embodiment may include attributes 2900 indicating information of attributes of the FDT instance and/or file elements 2910 indicating a file transmitted through the FLUTE session. The file elements 2910 illustrated in FIG. 29 may include attributes indicating information of attributes of a file. As illustrated in FIG. 29, the file elements 2910 may include content type attribute 2920 according to the present embodiment.

As described with reference to FIG. 28, the receiver according to the present embodiment may identify a PDI-Q instance document using a value included in the content type attribute 2920. For example, the content type attribute 2920 illustrated in FIG. 29 may have a value, etc. in the form of MIME protocol represented by "application/atsc-pdiq" or "text/atsc-pdiq+xml".

FIG. 30 is a diagram illustrating capabilities descriptor syntax according to an embodiment of the present invention.

In detail, FIG. 30 illustrates syntax for identifying a PDI table by a receiver according to the embodiment of the present invention, in the personalization broadcast system described with reference to FIG. 23.

The capabilities descriptor according to the present embodiment can be used to indicate that the services in SMT service level or the contents in NRT-IT content level are PDI table or not. Receivers according to the present embodiment utilize this information to notice the service/content is PDI Table or not, and decide whether the service/content should be downloaded or not according to their capabilities, such as supporting PDI engine.

Codes represented in [Example 8] below can be added to capability_code in capabilities descriptor for PDI Table signaling. A capability_code value according to the present embodiment cannot be assigned to other value. A capability_code value represented in [Example 8] below may be differently set according to a designer's intention.

Example 8

| Capability_code value | Meaning |
| --- | --- |
| ... | ... |
| 0x4F | HE ACC v2 with MPEG Surround |
| 0x50 | PDI Table(including PDI-Q) |
| ... | ... |

FIG. 31 is a diagram illustration a consumption model according to an embodiment of the present invention.

In detail, FIG. 31 illustrates a field added onto an SMT in order to identify a PDI table by a receiver according to the embodiment of the present invention, in the personalization broadcast system described with reference to FIG. 23.

NRT service descriptor is located in the service level of NRT SMT, and its NRT_service_category will be 0x04 (PDI) when the service provides PDI Table. So, receivers can notice that PDI Table is providing if the field value is 0x04.

A value of the consumption model illustrated in FIG. 31 may be differently set according to a designer's intention.

FIG. 32 is a diagram illustrating filtering criteria descriptor syntax according to an embodiment of the present invention.

In detail, FIG. 32 illustrates the bit stream syntax of the Filtering Criteria Descriptor for receiving a filtering criteria table by a receiver according to the embodiment of the present invention, in the personalization broadcast system described with reference to FIG. 23.

Filtering criteria according to an embodiment of the present invention are associated with downloadable content, so that the receiver according to the present embodiment can decide whether or not to download the content. There are two categories of downloadable content in an ATSC 2.0 environment: Non-Real Time (NRT) content in stand-alone NRT services and NRT content items used by TDOs in adjunct interactive data services.

Hereinafter, filtering criteria for filtering NRT content in stand-alone NRT services will be described with reference to FIG. 32.

In a filtering Criteria for NRT Services and Content Items according to the embodiment of the present invention, one or more instances of the Filtering Criteria Descriptor defined below can be included in a service level descriptor loop in an SMT, to allow receivers to determine whether to offer the NRT service to the user or not, or it can be included in a content item level descriptor loop in a NRT-IT, to allow receivers to determine whether to download that particular content item and make it available to the user or not.

The one or more instances of the Filtering Criteria Descriptor allow multiple values to be provided for the same or different targeting criteria. The intended targeting logic is "OR" logic among multiple values for the same targeting criterion, and "AND" logic among different targeting criteria.

Hereinafter, semantic definition of each field of the bit stream syntax of the Filtering Criteria Descriptor illustrated in FIG. 32 will be described.

A descriptor_tag field, a 8-bit field can be set to 0xTBD to indicate that the descriptor is a Filtering Criteria Descriptor according to the embodiment of the present invention.

A descriptor_length field, a 8-bit unsigned integer field can indicate the number of bytes following the descriptor_length field itself.

A num_filter_criteria field, a 8-bit field can indicate the number of filtering criteria contained in this descriptor shown in FIG. 32.

A criterion_id_length field, a 8-bit field can indicate the length of the criterion_id field.

A criterion_id field, a variable length field can give the identifier of this filtering criterion, in the form of a URI matching the id attribute of a question (QIA, QBA, QSA, QTA, or QAA element) in the PDI Table of the virtual channel in which this descriptor appears.

A criterion_type_code field, a 3-bit field can give the type of this criterion (question), according to [Example 9] below.

Example 9

| criterion_type_code | Value |
| --- | --- |
| 0x00 | Reserved |
| 0x01 | Integer type(including selection id), in uimsbf format |

-continued

| criterion_type_code | Value |
|---|---|
| 0x02 | Boolean type, 0x01 for "true" and 0x00 for "false" |
| 0x03 | String type |
| 0x04-0x07 | Reserved for future ATSC use |

A num_criterion_values field, a 5-bit field gives the number of targeting criterion values in this loop for this filtering criterion, where each value is a possible answer to the question (QIA, QBA, QSA, QTA, or QAA) identified by the criterion_id.

A criterion_value_length field, a 8-bit field gives the number of bytes needed to represent this targeting criterion value.

A criterion_value field, a variable length field gives this targeting criterion value.

The Filtering Criteria Descriptor according to the embodiment of the present invention indicates values for certain targeting criteria associated with services or content items. In an ATSC 2.0 emission, one or more instances of the filtering_criteria_descriptor( ) defined above may go in the descriptor loop of an NRT service in an SMT or in the descriptor loop of a content item in an NRT-IT. In the former case, they shall apply to the service itself (all content items). In the latter case they shall apply to the individual content item.

If there is only one Filtering Criteria Descriptor in a descriptor loop, and if it has only one criterion value, then the decision for whether the service or content item passes the filter shall be "true" (yes) if the criterion value matches a value that is among the answers in the PDI-A for the question corresponding to the filtering criterion (as indicated by the criterion_id), and it shall be "false" (no) otherwise.

If the total number of criterion values in all Filtering Criteria Descriptors in a single descriptor loop is greater than one, the result of each criterion value shall be evaluated as an intermediate term, returning "true" if the criterion value matches a value that is among the answers in the PDI-A for the question corresponding to the filtering criterion (as indicated by the criterion_id) and returning "false" otherwise. Among these intermediate terms, those with the same value of filtering criterion (as determined by the criterion_id) shall be logically ORed to obtain the interim result for each targeting criterion, and these interim results shall be logically ANDed together to determine the final result. If the final result evaluates to "true" for a receiver, it shall imply that the associated NRT service or content item passes the filter and is available to be downloaded to the receiver.

FIG. 33 is a diagram illustrating filtering criteria descriptor syntax according to another embodiment of the present invention.

In detail, FIG. 33 illustrates the bit stream syntax of the Filtering Criteria Descriptor for receiving a filtering criteria table by a receiver according to the embodiment of the present invention, in the personalization broadcast system described with reference to FIG. 23.

Basic content of the filtering criteria descriptor syntax illustrated in FIG. 33 has been described with reference to FIG. 32.

However, a criterion_type_code field can give the type of this criterion (question), according to [Example 10] below.

Example 10

| criterion_type_code | Value |
|---|---|
| 0x00 | Reserved |
| 0x01 | Integer type |
| 0x02 | Boolean type |
| 0x03 | String type(including selection type/text type) |
| 0x04-0x07 | Reserved for future ATSC use |

Figure 34:
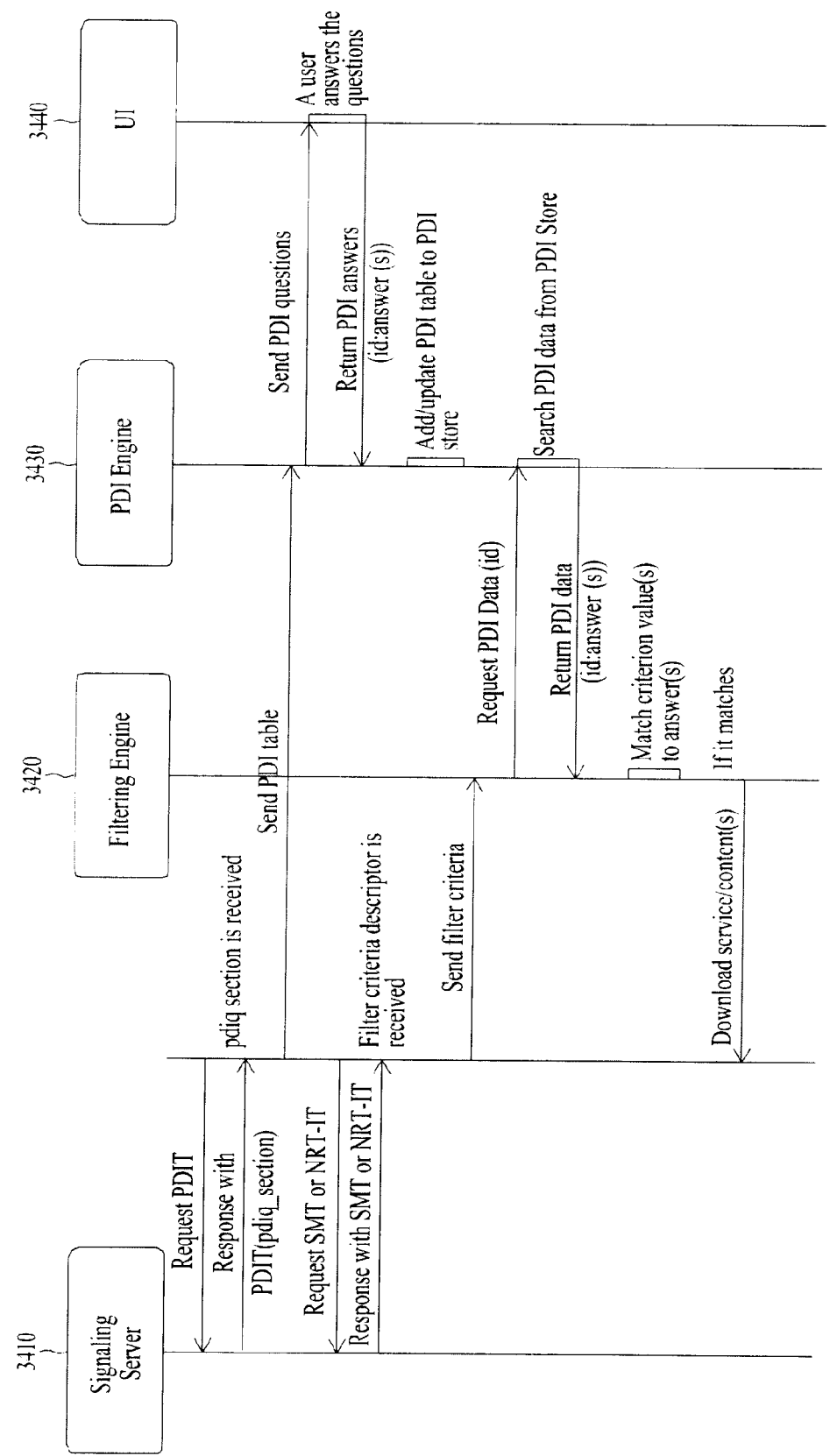
FIG. 34 is a flowchart of a digital broadcast system according to another embodiment of the present invention.

FIG. 34 is a flowchart of a digital broadcast system according to another embodiment of the present invention.

In detail, FIG. 34 is a flowchart of a personalization broadcast system for receiving a PDI table and/or a filtering criteria table through a broadcast network by a receiver according to the embodiment of the present invention.

The basic structure of the personalization broadcast system according to the present embodiment is the same as the structure described with reference to FIGS. 7 through 10. The PDI table according to the present embodiment is the same as the table described with reference to FIGS. 9 through 18. The filtering criteria table according to the present embodiment is the same as the table described with reference to FIGS. 19 through 22.

As illustrated in FIG. 34, the personalization broadcast system according to the present embodiment may include a signaling server 3410, a filtering engine 3420, a PDI engine 3430, and/or a UI 3440. The structure of the aforementioned personalization broadcast system may be changed according to a designer's intention.

Operations of the filtering engine 3420, the PDI engine 3430, and/or the UI 3440 for processing the PDI table and the filtering criteria according to the present embodiment are the same as the operations described with reference to FIG. 23. Hereinafter, the digital broadcast system will be described in terms of an operation of the signaling server 3410 illustrated in FIG. 34.

First, a receiver according to the present embodiment may transmit a request signal for receiving a PDI table section to the signaling server 3410. In this case, the receiver according to the present embodiment may transmit the request signal using a query term. A query will be described in detail.

The signaling server 3410 according to the present embodiment may transmit a PDI table section corresponding to a corresponding query to the receiver. A detailed description of the PDI table section has been given with reference to FIGS. 24 through 27.

FIG. 35 is a diagram illustrating an HTTP request table according to an embodiment of the present invention.

In detail, FIG. 35 illustrates an HTTP protocol for transmitting a query to the signaling server described with reference to FIG. 34 by a receiver according to the present embodiment.

When supported by broadcasters, the protocol shown in FIG. 35 can provides two capabilities. First, for devices that get DTV broadcast signals via a path that delivers only uncompressed audio and video, this protocol is typically the only way for them to access a broadcaster's stand-alone NRT services. Second, even for a device that has access to the full broadcast stream, this protocol provides a way to retrieve data for populating a Program/Service Guide without cycling through all the broadcast streams available in the local broadcast area and waiting for the desired tables to show up. It also allows retrieval of such data at any time, even while a viewer is watching TV, without needing a separate tuner.

The HTTP request table illustrated in FIG. 35 may include a type of a table to be received and a query term indicating a base URL for receiving the corresponding table.

A receiver according to the embodiment of the present invention may receive a specific table using the query term of the HTTP request table illustrated in FIG. 35. In detail, the receiver according to the present embodiment may transmit a request signal to a signaling server using a query term "?table=PDIT[&chan=<chan_id>]". A detailed description thereof has been described with reference to FIG. 34.

Figure 36:
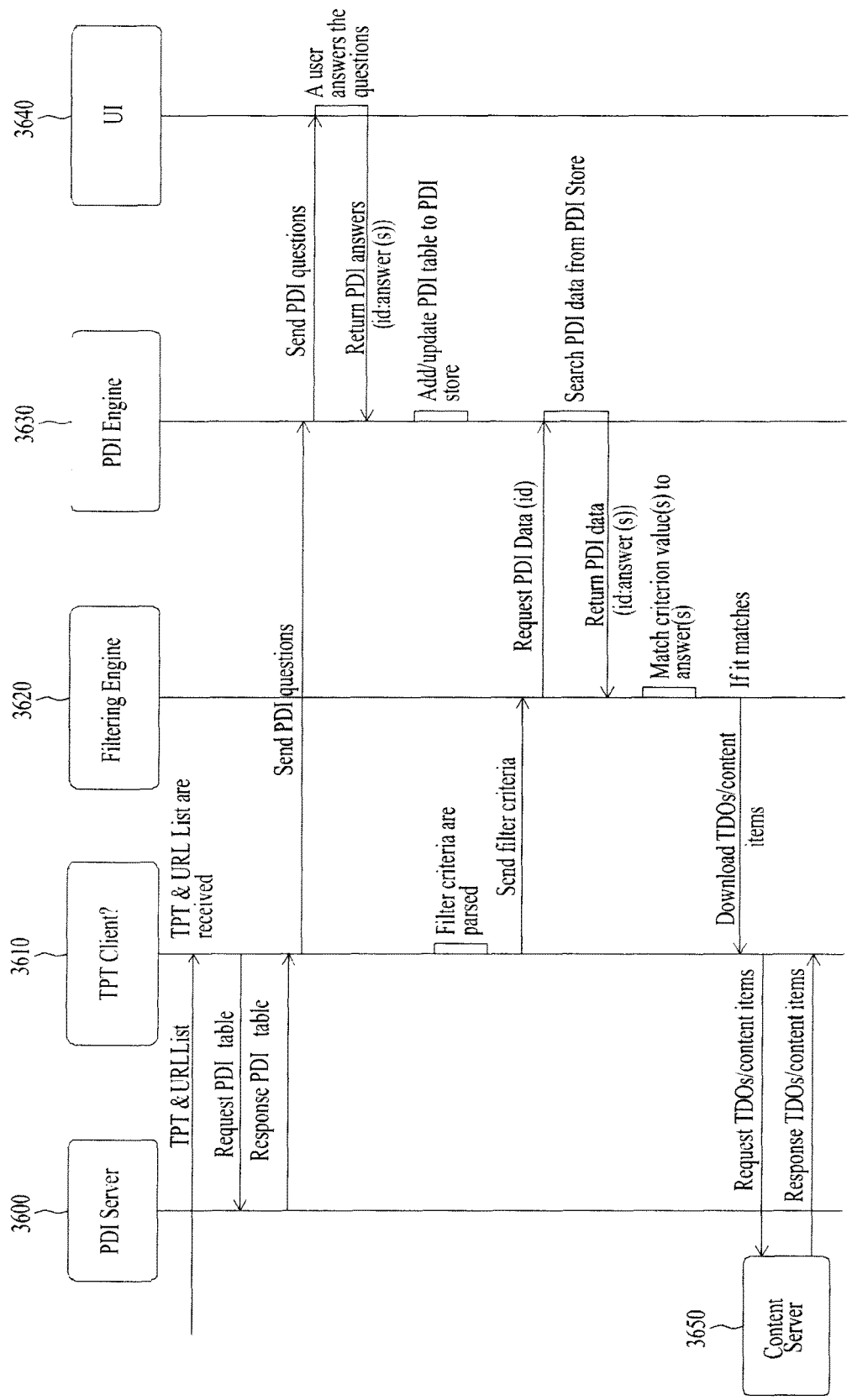
FIG. 36 is a flowchart illustrating a digital broadcast system according to another embodiment of the present invention.

FIG. 36 is a flowchart illustrating a digital broadcast system according to another embodiment of the present invention.

In detail, FIG. 36 is a diagram illustrating a personalization broadcast system for receiving a PDI table and/or a filtering criteria table through the Internet by a receiver according to the embodiment of the present invention.

The basic structure of the personalization broadcast system according to the present embodiment is the same as the structure described with reference to FIGS. 7 through 10. The PDI table according to the present embodiment is the same as the structure described with reference to FIGS. 9 through 18. The filtering criteria table according to the present embodiment is the same as the table described with reference to FIGS. 19 through 22.

When delivered over the Internet, PDI Table instances shall be delivered via HTTP or HTTPS. The Content-Type of a PDI Table in the HTTP Response header shall be "text/xml".

The URL used to retrieve a PDI Table via Internet can be delivered via SDOPrivateDataUrlString commands which are transported in Standard caption service #6 in the DTV closed caption channel, or it can be delivered in a UrlList XML element delivered along with a TPT.

A TPT (TDO Parameters Table) contains metadata about the TDOs of a segment and the Events targeted to them. The term "Triggered Declarative Object" (TDO) is used to designate a Declarative Object that has been launched by a Trigger in a Triggered interactive adjunct data service, or a DO that has been launched by a DO that has been launched by a Trigger, and so on iteratively. A trigger is a signaling element whose function is to identify signaling and establish timing of playout of interactive events.

As illustrated in FIG. 36, the personalization broadcast system according to the present embodiment may include a PDI server 3600, a content server 3650, and/or a receiver. The receiver according to the present embodiment may include a TDO parameter table (TPT) client 3610, a filtering engine 3620, a PDI engine 3630, and/or a UI 3640. The structure of the aforementioned personalization broadcast system may be changed according to a designer's intention. Hereinafter, operations of elements illustrated in FIG. 36 will be described.

The TPT client 3610 according to the present embodiment may receive a TPT and/or a URL list table. A TDO parameters table (TPT) according to the embodiment of the present invention contains metadata about the triggered declarative objects (TDOs) of a segment and the events targeted to them. The TPT according to the present embodiment may include information regarding a PDI table and a filtering criteria table. The URL list table according to an embodiment of the present invention may include URL information of the PDI server 3600. The TPT and the URL list table will be described in detail.

The TPT client 3610 according to the present embodiment may acquire URL information of the PDI server 3600 from the URL list table. The TPT client 3610 may access the PDI server 3600 using the acquired URL information and request the PDI server 3600 to transmit the PDI table according to the present embodiment. The PDI server 3600 according to the present embodiment may transmit the corresponding PDI table to the TPT client 3610 according to the request of the TPT client 3610.

As illustrated in FIG. 36, the TPT client 3610 according to the present embodiment may transmit the received PDI table to the PDI engine 3630. The PDI engine 3630 according to the present embodiment may process the received PDI table and extract PDI questions included in the corresponding PDI table. Then, the PDI engine 3630 according to the present embodiment may transmit the extracted PDI questions to the UI 3640.

The UI 3640 according to the present embodiment may display the received PDI questions and receive PDI answers to the corresponding PDI questions. The UI 3640 according to the present embodiment may receive the PDI answers through a remote controller. Then, the PDI engine 3630 according to the present embodiment may update PDI data using the PDI answer received from the UI 3640. A detailed description thereof has been described with reference to FIGS. 7 and 8.

The TPT client 3610 according to the present embodiment may parse TPT to acquire filtering criteria. As illustrated in FIG. 36, the TPT client 3610 may transmit the filtering criteria to the filtering engine 3620. In this case, according to an embodiment of the present invention, the filtering criteria may be filtering criteria table with a format of xml document. The filtering criteria table has been described in detail with reference to FIGS. 21 and 22.

Then, the filtering engine 3620 according to the present embodiment may transmit a PDI data request signal to the PDI engine 3630. When the PDI engine 3630 according to the present embodiment receives the PDI data request signal, the PDI engine 3630 may search for PDI data corresponding to the corresponding PDI data request signal and transmit the PDI data to the filtering engine 3620. Processes subsequent to the filtering according to the present embodiment have been described in detail with reference to FIGS. 9 and 10.

As a result, a receiver according to the present embodiment may download content using the filtering result. In more detail, the TPT client 3610 may receive the filtering result from the filtering engine 3620 and transmit TDO and/or content download request signal to the content server 3650. The content server 3650 may transmit the TDO and/or the content to the TPT client 3610 according to the TDO and/or the content download request signal.

FIG. 37 is a diagram illustrating a URL list table according to an embodiment of the present invention.

In detail, FIG. 37 is a table containing URL information for receiving PDI table and/or filtering criteria through the Internet by a receiver according to the embodiment of the present invention. A process of transmitting and receiving a URL list table according to an embodiment of the present invention has been described in detail with reference to FIG. 36.

When a URL List table is delivered via the Internet, it can be delivered via HTTP along with a TPT, in the form of a multi-part MIME message.

When delivered over the Internet, TPTs can be delivered via HTTP. The URL information for the TPT of the current segment shall appear in Triggers, delivered either via DTV Closed Caption service #6 or via an ACR server. The response to a request for a TPT may consist of just the TPT for the current segment, or it may consist of a multipart MIME message, with the requested TPT in the first part, and optionally the AMT for the segment in the second part, and optionally a UrlList XML document in the next part.

Hereinafter, semantics of elements included in a URL list table will be described with regard to an embodiment of the present invention.

An UrlList element shown in FIG. 37 contains a list of URLs that are useful to a receiver according to the embodiment of the present invention.

A TptUrl element of the UrlList element shown in FIG. 37 can contain the URL information of a TPT for a future segment in the current interactive adjunct service. When multiple TptUrl elements are included, they shall be arranged in order of the appearance of the segments in the broadcast.

A NrtSignalingUrl element of the UrlList element shown in FIG. 37 can contain the URL information of a server from which receivers can obtain NRT signaling tables for all the virtual channels in the current transport stream, using the request protocol defined in Section 18 of this standard.

An UrsUrl element of the UrlList element shown in FIG. 37 can contain the URL information of a server to which receivers can send usage (audience measurement) reports, using the protocol defined in Section 10 of this standard.

A PdiUrl element of the UrlList element shown in FIG. 37 can contain the URL information of a PDITable. That is, the PdiUrl element according to the present embodiment may indicate URL information of a server that transmits a PDI table and/or filtering criteria.

The aforementioned URL list table of FIG. 37 may be configured in the format shown in [Example 11] below.

Example 11

| Element/Attribute (with @) | No. allowed | Data type | Description & Value |
| --- | --- | --- | --- |
| UrlList | | | List of potentially useful URLs |
| TptUrl | 0 ... N | anyURI | URL of TPT for future segment |
| NrtSignalingUrl | 0 ... 1 | anyURI | URL of NRT Signaling Server |
| UrsUrl | 0 ... 1 | anyURI | URL of Usage Reporting Server |
| PDIUrl | 0 ... 1 | anyURI | URL of PDI-Q |

FIG. 38 is a diagram illustrating a TPT according to an embodiment of the present invention.

In detail, the TPT illustrated in FIG. 38 may include URL information of a PDI table and/or filtering criteria. A process of transmitting and receiving the TPT according to the present embodiment has been described with reference to FIG. 36. Hereinafter, an element of filtering criteria included in the TPT will be described.

In detail, the filter criterion element illustrated in FIG. 38 may include information regarding filtering criteria.

The id attribute according to the present embodiment may indicate a PDI question of the corresponding filtering criteria.

The criterion type attribute according to the present embodiment may indicate a filtering criteria type (or filtering criteria type elements). A type of the filtering criteria according to the present embodiment has been described with reference to FIG. 20.

The criterion value attribute according to the present embodiment may indicate a value of the filtering criteria according to the aforementioned criterion type attribute.

Figure 39:
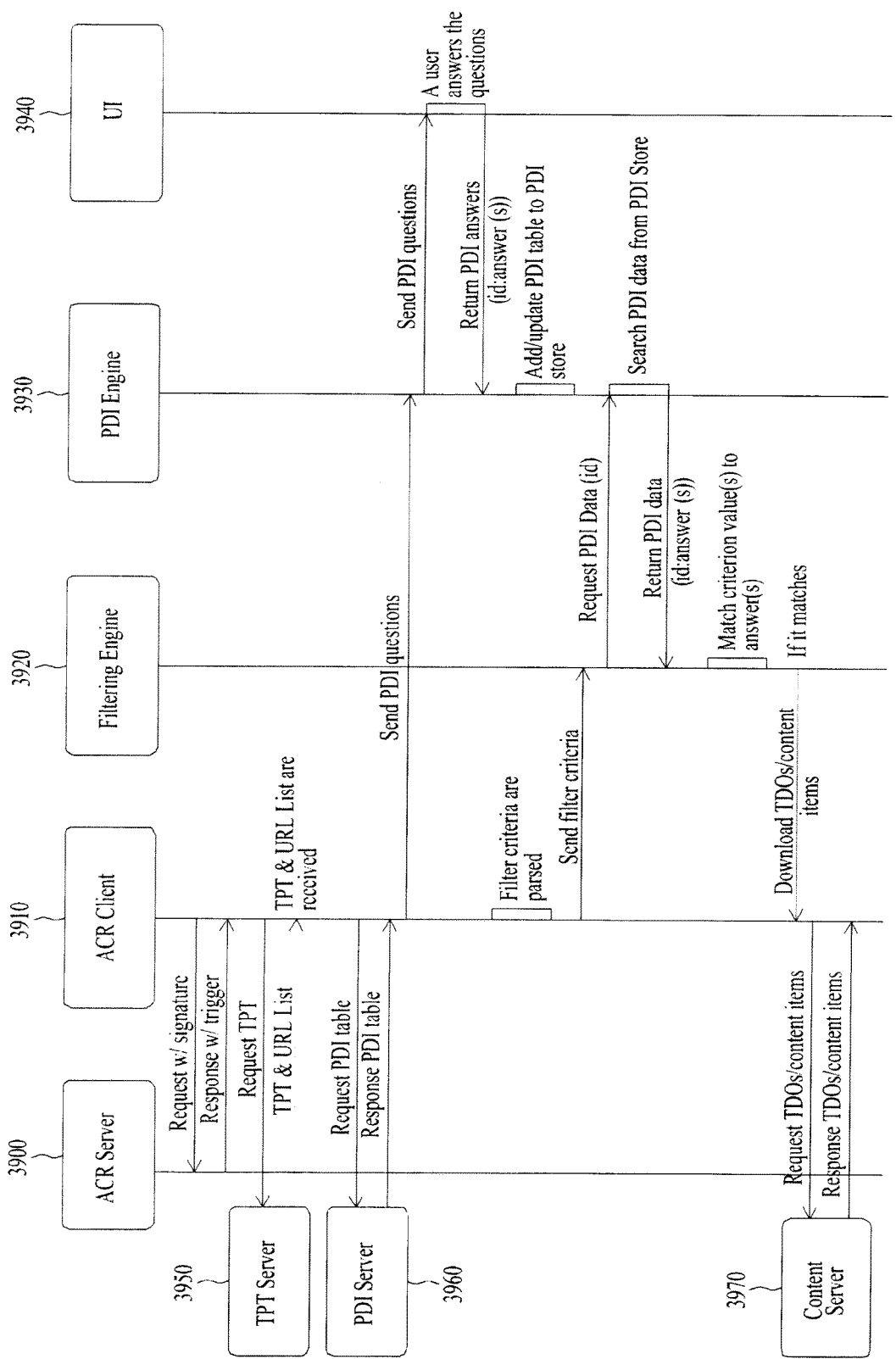
FIG. 39 is a flowchart of a digital broadcast system according to another embodiment of the present invention.

FIG. 39 is a flowchart of a digital broadcast system according to another embodiment of the present invention.

In detail, FIG. 39 is a diagram illustrating a personalization broadcast system for receiving a PDI table and/or a filtering criteria table in an ACR system by a receiver according to the embodiment of the present invention.

The ACR system according to the present embodiment is the same as the system described with reference to FIG. 1. The basic structure of the personalization broadcast system according to the present embodiment is the same as the structure described with reference to FIGS. 7 through 10. The PDI table according to the present embodiment is the same as the table described with reference to FIGS. 9 through 18. The filtering criteria table according to the present embodiment is the same as the table described with reference to FIGS. 19 through 22.

As illustrated in FIG. 39, the personalization broadcast system according to the present embodiment may include an ACR server 3900, a TPT server 3950, a PDI server 3960, a content server 3970, an ACR client 3910, a filtering engine 3920, a PDI engine 3930, and/or a UI 3940. The structure of the aforementioned personalization broadcast system may be changed according to a designer's intention. Operations of elements illustrated in FIG. 39 will be described.

The ACR client 3910 according to the present embodiment may extract signature from fingerprint and transmit a request together with the signature to the ACR server 3900. The ACR server 3900 according to the present embodiment may receive the signature and transmit a response together with trigger, etc. related to the corresponding signature to the ACR client 3910, which has been described in detail with reference to FIGS. 1 through 6.

The ACR client 3910 according to the present embodiment may request a TPT and/or a URL list table to the TPT server 3950 using the received trigger, etc. The TPT server 3950 according to the present embodiment may transmit the TPT and/or the URL list table to the ACR client 3910 according to the request of the ACR client 3910. A detailed description of the TPT and/or the URL list table has been given. Then, the TPT server 3950 according to the present embodiment may transmit the received TPT and/or URL list table to the ACR client 3910.

The ACR client 3910 according to the present embodiment may acquire URL information of the PDI server 3960 from the URL list table. The ACR client 3910 may access the PDI server 3960 using the acquired URL information and request the PDI server 3960 to transmit the PDI table according to the present embodiment. The PDI server 3960 according to the present embodiment may transmit the corresponding PDI table to the ACR client 3910 according to the request of the ACR client 3910.

As illustrated in FIG. 34, the ACR client 3910 according to the present embodiment may transmit the received PDI table to the PDI engine 3930. The PDI engine 3930 according to the present embodiment may process the received PDI table and extract PDI questions included in the corresponding PDI table. Then, the PDI engine 3930 according to the present embodiment may transmit the extracted PDI questions to the UI 3940.

The UI 3940 according to the present embodiment may display the received PDI questions and receive PDI answers to the corresponding PDI questions. The UI 3940 according to the present embodiment may receive the PDI answers through a remote controller. Then, the PDI engine 3930 according to the present embodiment may update PDI data using the PDI answer received from the UI 3940. A detailed description thereof has been described with reference to FIGS. 7 and 8.

In addition, the ACR client 3910 according to the present embodiment may parse TPT to acquire filtering criteria. As illustrated in FIG. 39, the ACR client 3910 may transmit the filtering criteria to the filtering engine 3920. In this case, according to an embodiment of the present invention, the filtering criteria may be a filtering criteria table with a format of xml document. The filtering criteria table has been described in detail with reference to FIGS. 21 and 22.

Then, the filtering engine 3920 according to the present embodiment may transmit a PDI data request signal to the PDI engine 3930. When the PDI engine 3930 according to the present embodiment receives the PDI data request signal, the PDI engine 3930 searches for PDI data corresponding to the corresponding PDI data request signal and transmits the PDI data to the filtering engine 3920. Processes subsequent to the filtering according to the present embodiment have been described in detail with reference to FIGS. 9 and 10.

As a result, a receiver according to the present embodiment may download content using a filtering result. In detail, the ACR client 3910 may receive the filtering result from the filtering engine 3920 and transmit a TDO and/or content download request signal to the content server 3970. The content server 3970 may transmit the TDO and/or the content to the ACR client 3910 according to the TDO and/or content download request signal.

Figure 40:
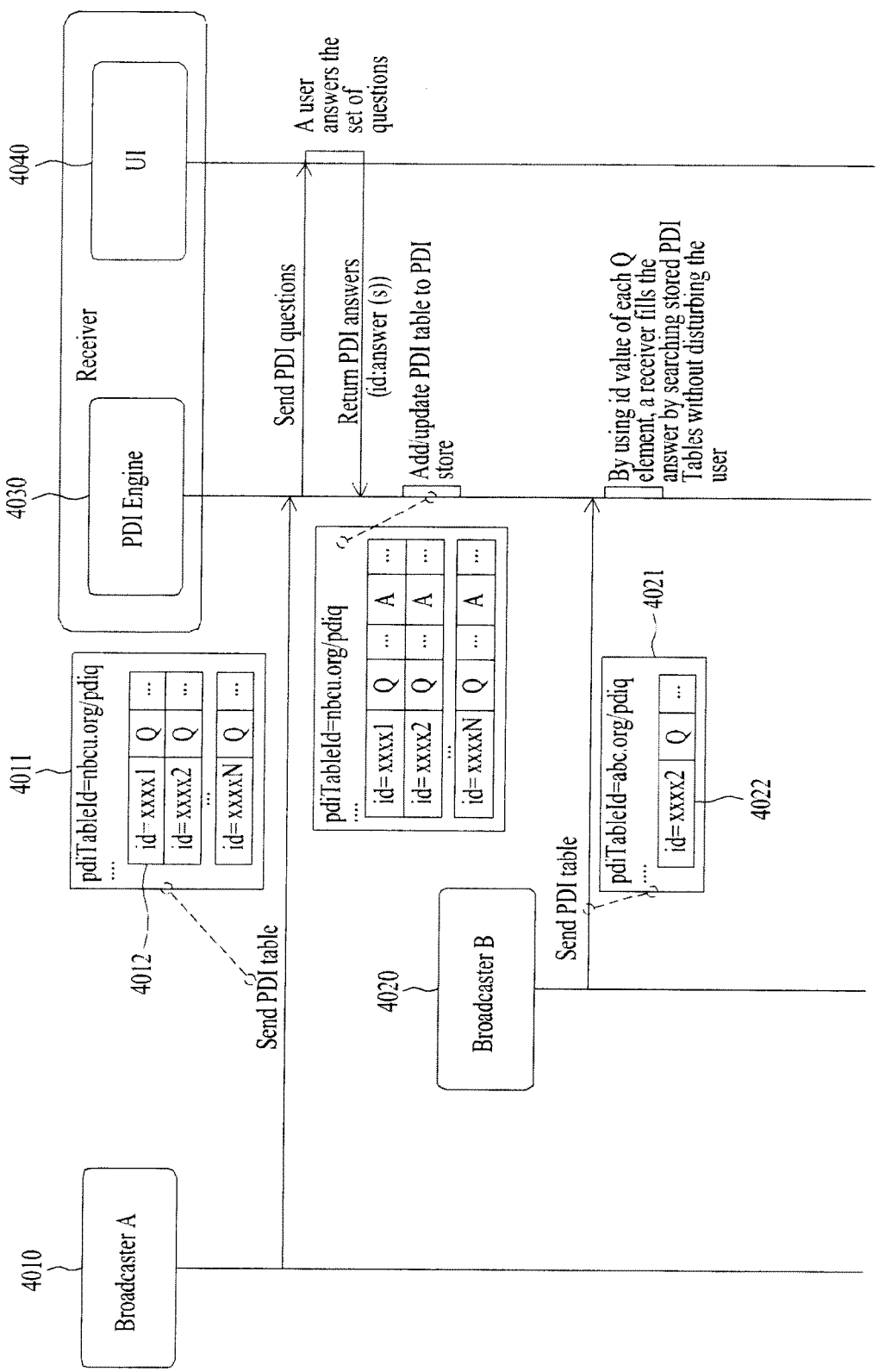
FIG. 40 is a flowchart of a digital broadcast system according to another embodiment of the present invention.

FIG. 40 is a flowchart of a digital broadcast system according to another embodiment of the present invention.

In detail, FIG. 40 is a diagram illustrating a personalization broadcast system for avoiding duplication of PDI answers according to an embodiment of the present invention.

In more detail, FIG. 40 illustrates a personalization broadcast system for updating PDI data using a pre-stored PDI answer when a receiver according to the embodiment of the present invention receives the same PDI question from a plurality of broadcasters and content providers. Due to the personalization broadcast system illustrated in FIG. 40, a user may reduce inconvenience of inputting redundant PDI answers to the same PDI question.

As illustrated in FIG. 40, the personalization broadcast system according to the present embodiment may include two or more broadcasters (or content providers) and/or a receiver. The two or more broadcasters according to the present embodiment may include a broadcaster A 4010 and/or a broadcaster B 4020. The receiver according to the present embodiment may include a PDI engine 4030 and/or a UI 4040. The personalization broadcast system according to the present embodiment may provide an ATSC 2.0 service. The structure of the aforementioned personalization broadcast system may be changed according to a designer's intention. Hereinafter, operations of elements illustrated in FIG. 40 will be described.

First, a receiver according to the present embodiment may receive a first PDI table 4011 from the broadcaster A 4010. The receiver that receives the first PDI table 4011 may transmit the first PDI table 4011 to the PDI engine 4030. The first PDI table 4011 according to the present embodiment may include a first PDI type element 4012. Each of first PDI type elements 4012 according to the present embodiment may include a first identifier element (or first ID) and/or a first PDI question, as described with reference to FIGS. 17 and 18. In addition, as illustrated in FIG. 40, the first PDI table 4011 may include two or more first PDI type elements 4012 having different first IDs.

The PDI engine 4030 according to the present embodiment may extract a first PDI question from the first PDI type element 4012 and transmit the extracted first PDI question to the UI 4040. Then, the UI 4040 according to the present embodiment may receive a first PDI answer to a first PDI question from the user. The PDI engine 4030 may add the first PDI answer to the first PDI type element 4012 and correct the first PDI answer. Detailed operations of the PDI engine 4030 and the UI 4040 according to the present embodiment are the same as the operations described with reference to FIG. 23.

In addition, the PDI engine 4030 according to the present embodiment may receive a second PDI table 4021 from the broadcaster B 4020. The second PDI table 4021 according to the present embodiment may include a second PDI type element 4022. As described with reference to FIGS. 17 and 18, the second PDI type element 4022 may include a second identifier element (or second ID) and/or a second PDI question.

The PDI engine 4030 that receives the second PDI table may access a PDI store and search for the first PDI table that is pre-stored in the PDI store. Then, the PDI engine 4030 according to the present embodiment may compare a second ID and a first ID. As the comparison result, when the second ID and the first ID are identical to each other, the first PDI answer may be added to the second PDI type element 4022 and/or corrected.

As a result, when a receiver according to the present embodiment receives the same PDI question as the pre-stored PDI question, the receiver may not repeatedly display the PDI question and may process the PDI question using the pre-stored PDI answer. Thus, in the personalization broadcast system according to the present embodiment, the user does not have to repeatedly input PDI answers of the same content to the same PDI question so as to receive a personalization service more conveniently.

Figure 41:
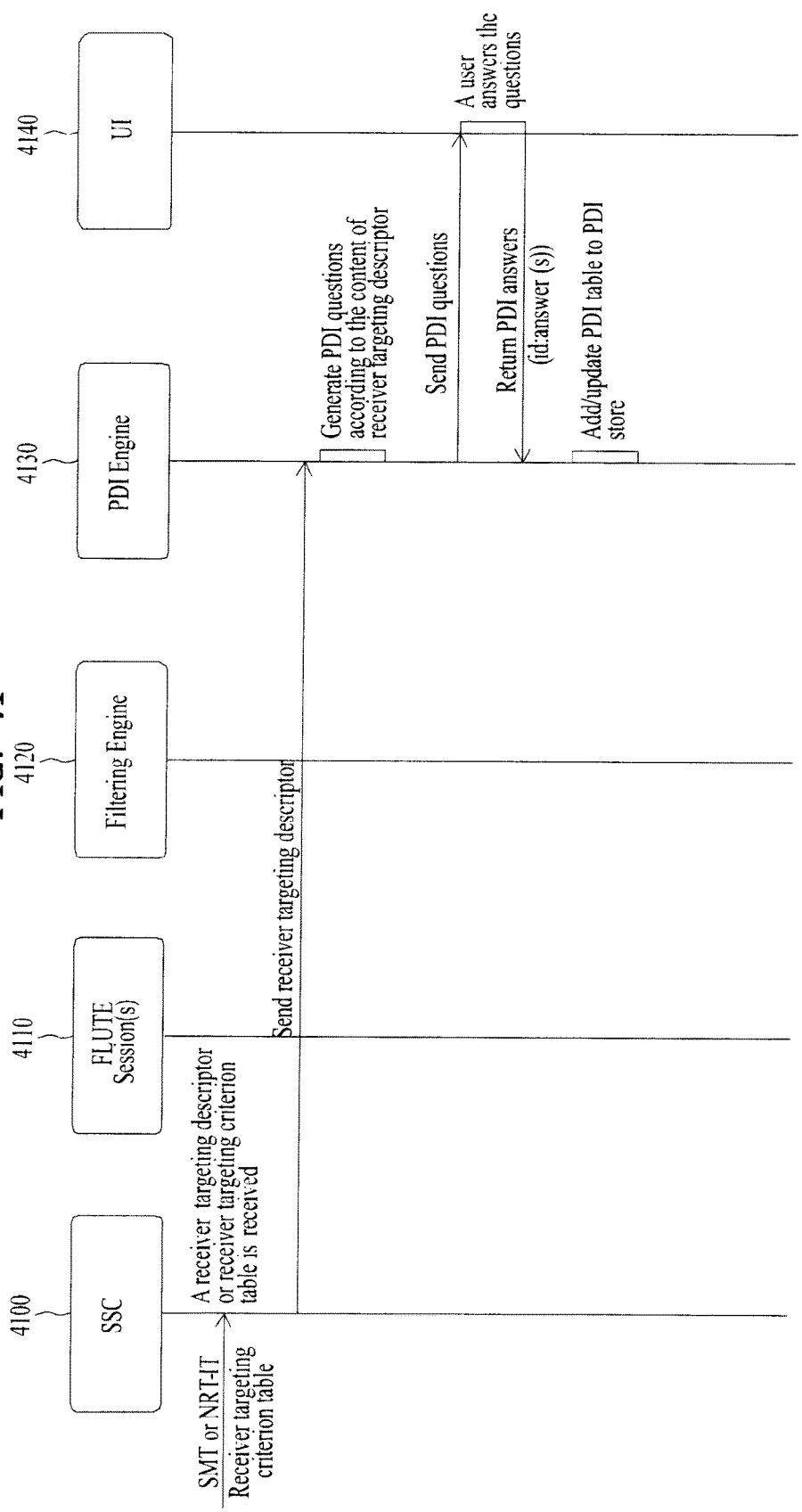
FIG. 41 is a flowchart of a digital broadcast system according to another embodiment of the present invention.

FIG. 41 is a flowchart of a digital broadcast system according to another embodiment of the present invention.

In detail, FIG. 41 is a diagram of personalization broadcast system for avoiding duplication of PDI answers according to an embodiment of the present invention. The personalization broadcast system described with reference to FIG. 40 may use a PDI table that is pre-stored in a receiver according to the present invention in order to avoid duplication of PDI answers. As another embodiment of the present invention for avoiding duplication of PDI answers, FIG. 41 proposes a personalization broadcast system using registration of a PDI question.

In order to support reuse of questions by different broadcasters, so that consumers are not prompted to answer essentially the same question over and over again, questions can be registered with a registrar to be designated by the ATSC. Each registration record can include information about a question ID which is globally unique, as specified in FIG. 17 and FIG. 18, a question type (QIA, QBA, QSA, or QTA), question text in one or more languages, a date of registration and/or contact information for the organization submitting the question for registration. Also, in the case of a QSA, each registration record (or Pre-registered PDI question) can include the allowable selections such as an identifier of each selection, and the text of each selection in one or more languages.

A PDI table may contain a mix of registered questions and non-registered questions.

Both registered and non-registered questions may appear in multiple PDI tables. Whenever a user answers a question that appears in multiple PDI tables, whether by a function provided by the receiver or by an application, the answer is expected to propagate to all instances of the question in all the questionnaires where it appears. Thus, a user only needs to answer any given question once, no matter any many times it appears in different questionnaires.

To avoid having users be deluged with questions, it is recommended that questionnaire creators use registered questions whenever possible, and only use non-registered questions when the questionnaire creator has unique targeting needs that cannot be met with registered questions.

The receiver according to the present embodiment may extract a pre-registered PDI question using the receiver targeting criteria. The receiver targeting criteria according to the present embodiment complies with the standard of ATSC NRT, A/103.

As illustrated in FIG. 41, the personalization broadcast system according to the present embodiment may include a SSC 4100, a FLUTE session 4110, a filtering engine 4120, a PDI engine 4130, and/or a UI 4140. The personalization broadcast system according to the present embodiment may provide an ATSC 2.0 service. The structure of the aforementioned personalization broadcast system may be changed according to a designer's intention. Hereinafter, the personalization broadcast system illustrated in FIG. 41 will be described.

A receiver according to the present embodiment may receive SMT and/or NRT-IT through the SSC 4100 and acquire receiver targeting criteria included in the SMT and/or NRT-IT. According to an embodiment of the present invention, the receiver targeting criteria may be a receiver targeting descriptor or a receiver targeting criterion table.

Then, the PDI engine 4130 according to the present embodiment may convert the acquired receiver targeting criteria to generate a PDI question. The UI 4140 according to the present embodiment may receive the aforementioned question from the PDI engine 4130, display the PDI question, and receive a PDI answer of a user. Detailed operations of the PDI engine 4130 and the UI 4140 according to the present embodiment have been described with reference to FIG. 23.

Figure 42:
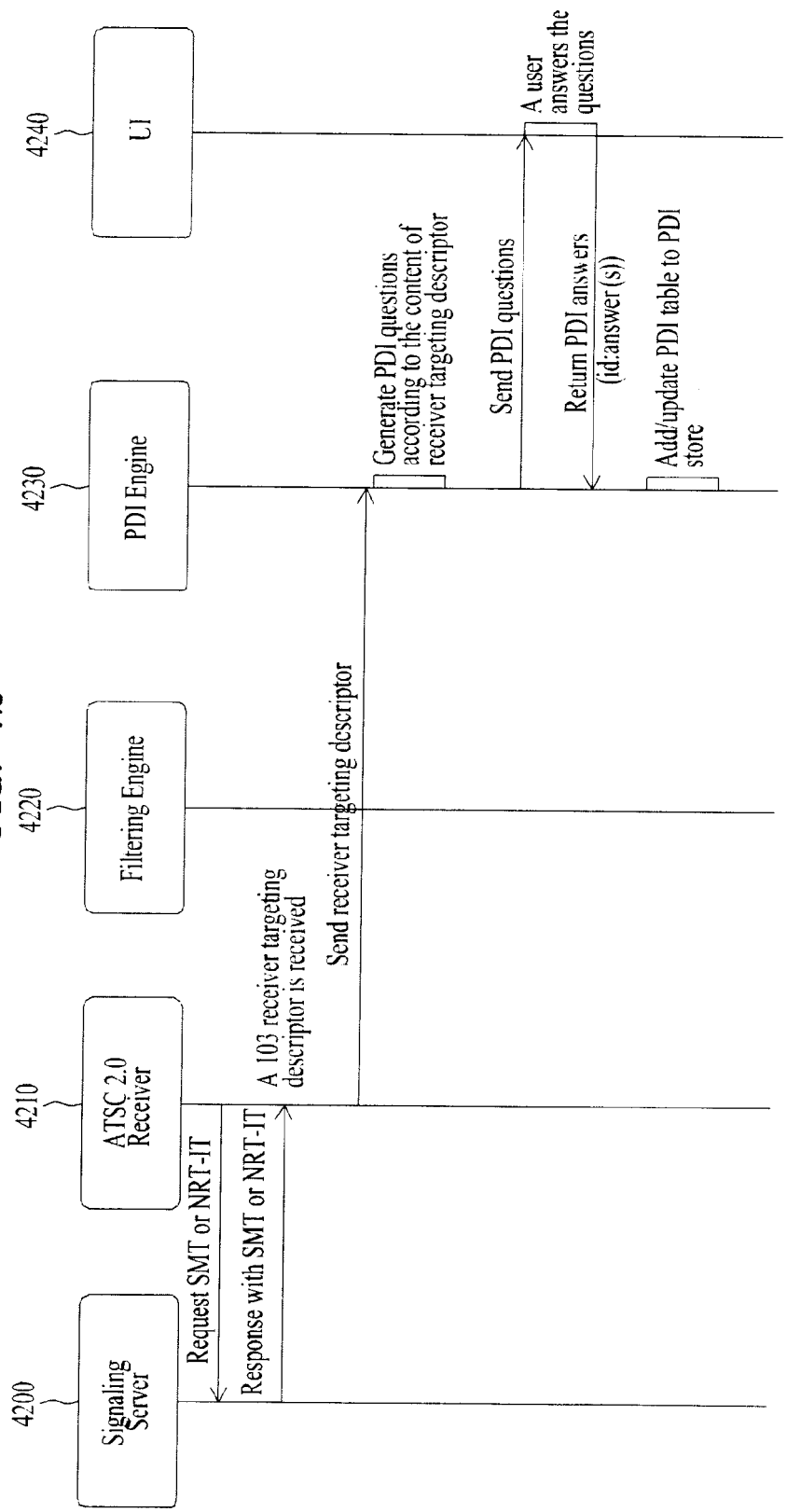
FIG. 42 is a flowchart of a digital broadcast system according to another embodiment of the present invention.

FIG. 42 is a flowchart of a digital broadcast system according to another embodiment of the present invention.

In detail, FIG. 42 illustrates a personalization broadcast system for registering a PDI question.

As illustrated in FIG. 42, the personalization broadcast system according to the present embodiment may include a signaling server 4200, a receiver 4210, a filtering engine 4220, a PDI engine 4230, and a UI 4240. The receiver 4210 may be interpreted as including the filtering engine 4220, the PDI engine 4230, and/or the UI 4240, which may be changed according to a designer's intention. In addition, the personalization broadcast system according to the present embodiment may provide an ATSC 2.0 service. The personalization broadcast system illustrated in FIG. 41 will be described.

Operations of basic elements of FIG. 42 are the same as operations described with reference to FIG. 41. However, the receiver 4210 illustrated in FIG. 42 may request SMT and/or NRT-IT to the signaling server 4200. According to the request of the receiver 4210 according to the present embodiment, the signaling server 4200 may transmit the corresponding SMT and/or NRT-IT to the receiver 4210.

Detailed operations of the receiver 4210, the PDI engine 4230, and/or the UI 4240 after the receiver according to the present embodiment receives the SMT and/or the NRT-IT are the same as the operation described with reference to FIG. 41.

FIG. 43 is a diagram illustrating a receiver targeting criteria table according to an embodiment of the present invention.

In detail, FIG. 43 is a diagram of receiver targeting criteria obtained by representing the receiver targeting criteria described with reference to FIGS. 41 and 42 in the form of table.

As illustrated in FIG. 43, the receiver targeting criteria table may include information regarding a targeting criterion type code, a targeting value length, and/or a targeting value. The targeting criterion type code illustrated in FIG. 43 refers to a code for identifying each targeting criteria. The targeting value length illustrated in FIG. 43 refers to the number of bytes for representing the targeting criteria value. The targeting value illustrated in FIG. 43 refers to information indicated by the targeting criteria.

The receiver according to the present embodiment may convert the targeting criteria according to the targeting criterion type code and acquire a pre-registered PDI question.

In detail, when the targeting criterion type code according to the present embodiment is 0x00, the targeting value is reserved and the targeting value length is not determined.

When the targeting criterion type code according to the present embodiment is 0x01, the targeting value is geographical location as defined in Table 6.21 of A/65, using only the low order 3 bytes, and the targeting value length is 3 bytes. The aforementioned A/65 is ATSC standard for program and system information protocol (PSIP).

When the targeting criterion type code according to the present embodiment is 0x02, the targeting value is alphanumeric postal code as defined in section 6.7.2 of A/65, using the number of bytes appropriate to the region (up to 8), and the targeting value length is variable, which will be described below in more detail.

When the targeting criterion type code according to the present embodiment is 0x03, the targeting value is demographic category as defined in Table 6.18 of A/65, using only the low order 2 bytes, and the targeting value length is 2 bytes, which will be described below in more detail.

When the targeting criterion type code according to the present embodiment is 0x04-0x0F, the targeting value is reserved for future ATSC use and the targeting value length is not determined.

When the targeting criterion type code according to the present embodiment 0x10-0x1F, the targeting value is available for private use and the targeting value length is not determined.

FIGS. 44 through 47 are diagrams illustrating a pre-registered PDI question according to an embodiment of the present invention.

In detail, FIGS. 44 through 47 show tables representing a pre-registered PDI question when the targeting criterion type code described with reference to FIG. 43 is 0x01, according to an embodiment of the present invention.

As illustrated in FIGS. 44 through 47, when the targeting criterion type code is 0x01, the targeting criteria table according to the present embodiment may include pre-registered PDI question information regarding a geographical location. In this case, the receiver according to the present embodiment may convert the targeting criteria table using only the low order 3 bytes to acquire the pre-registered PDI question.

FIG. 44 is a table showing a pre-registered PDI question regarding a location code when the targeting criterion type code is 0x01. Pre-registered PDI question information included in the pre-registered PDI question table illustrated in FIG. 44 is the same as the information described with reference to FIG. 41.

In detail, as illustrated in FIG. 44, when the targeting criterion type code is 0x01, a question ID according to the present embodiment may include information regarding the location code. In addition, the pre-registered PDI question illustrated in FIG. 44 may be a QTA type and may include a question text including content of requesting a PDI answer of a text type of the location code.

[Example 12] below is obtained by representing the table illustrated in FIG. 44 in xml schema according to an embodiment of the present invention.

Example 12

```
<a20:QTA id="atsc.org/PDIQ/location-code">
    <a20:Q xml:lang="en-us">
        <a20:Text>What is your location code?</a20:Text>
    </a20:Q>
</a20:QTA>
```

FIG. 45 is a table showing a pre-registered PDI question of federal information processing standards publication state (FIPS) when the targeting criterion type code is 0x01. Basic content included in the pre-registered PDI question illustrated in FIG. 45 is the same as the content described with reference to FIG. 41. However, the pre-registered PDI question illustrated in FIG. 45 may further include information regarding question xactionSetId. The question xactionSetId will be described below in detail with regard to an embodiment of the present invention.

In detail, as illustrated in FIG. 45, when the targeting criterion type code is 0x01, the question ID according to the present embodiment may include information regarding the FIPS state. In addition, the pre-registered PDI question illustrated in FIG. 45 may be a QTA type and may include a question text including content of requesting a PDI answer of a text type of the FIPS state.

[Example 13] below is obtained by representing the table illustrated in FIG. 45 in xml schema according to an embodiment of the present invention.

Example 13

```
<a20:QTA id="atsc.org/PDIQ/state" xactionSetId="1">
    <a20:Q xml:lang="en-us">
        <a20:Text>What state are you located in?</a20:Text>
    </a20:Q>
</a20:QTA>
```

FIG. 46 is a table showing a pre-registered PDI question regarding an FIPS country when the targeting criterion type code is 0x01. Basic content included in the pre-registered PDI question illustrated in FIG. 46 is the same as the content described with reference to FIG. 41. However, the pre-registered PDI question illustrated in FIG. 46 may further include information regarding question xactionSetId. The question xactionSetId will be described below in detail with regard to an embodiment of the present invention.

In detail, as illustrated in FIG. 46, when the targeting criterion type code is 0x01, the question ID according to the present embodiment may include information regarding the FIPS country. In addition, the pre-registered PDI question illustrated in FIG. 46 may be a QTA type and may include a question text including content of requesting a PDI answer of a text type of the FIPS country.

[Example 14] below is obtained by representing the table illustrated in FIG. 46 in xml schema according to an embodiment of the present invention.

Example 14

```
<a20:QTA id="atsc.org/PDIQ/county" xactionSetId="1">
    <a20:Q xml:lang="en-us">
        <a20:Text>What county are you located in?</a20:Text>
    </a20:Q>
</a20:QTA>
```

FIG. 47 is a table showing a pre-registered PDI question regarding county subdivision when the targeting criterion type code is 0x01. Basic content included in the pre-registered PDI question illustrated in FIG. 47 is the same as the content described with reference to FIG. 41. However, the pre-registered PDI question illustrated in FIG. 47 may further include information regarding question xactionSetId. The question xactionSetId will be described below in detail with regard to an embodiment of the present invention.

In detail, as illustrated in FIG. 47, when the targeting criterion type code is 0x01, the question ID according to the present embodiment may include sector information regarding the country subdivision. The pre-registered PDI question illustrated in FIG. 47 may be a QSA type and may include a question text including content of requesting a PDI answer of a selection type of the country subdivision.

The pre-registered PDI question of the QSA type according to the present embodiment may include selection information of the PDI answer. For example, the pre-registered PDI question of the country subdivision illustrated in FIG. 47 may include 9 selection information regarding northwest, north central, northeast, west central, center, east central, southwest, south central and southeast.

[Example 15] below is obtained by representing the table in xml schema according to an embodiment of the present invention.

Example 15

```
<a20:QSA id="atsc.org/PDIQ/sector" xactionSetId="1">
    <a20:Q xml:lang="en-us">
        <a20:Text>What part of your county are you located in?
        </a20:Text>
        <a20:Selection id="1">NW</a20:Selection>
        <a20:Selection id="2">NC</a20:Selection>
        <a20:Selection id="3">NE</a20:Selection>
        <a20:Selection id="4">WC</a20:Selection>
        <a20:Selection id="5">C</a20:Selection>
        <a20:Selection id="6">EC</a20:Selection>
        <a20:Selection id="7">SW</a20:Selection>
        <a20:Selection id="8">SC</a20:Selection>
        <a20:Selection id="9">SE</a20:Selection>
    </a20:Q>
</a20:QTA>
```

The aforementioned question xactionSetId illustrated in FIGS. 45 through 47 may indicate a set of PDI questions including similar contents. A receiver according to the embodiment of the present invention may combine pre-registered PDI questions containing the same question xactionSetId and use the pre-registered PDI questions in a personalization broadcast service.

For example, the receiver targeting criteria illustrated in FIG. 44 may also be represented as the receiver targeting criteria of FIGS. 45 through 47 having the same question xactionSetId. A receiver according to the embodiment of the present invention may provide a personalization broadcast service using a result obtained by combining the receiver targeting criteria illustrated in FIG. 44 and/or the receiver targeting criteria illustrated in FIGS. 45 through 47.

FIGS. 48 and 49 are diagrams illustrating a pre-registered PDI question according to an embodiment of the present invention.

In detail, FIGS. 48 and 49 are tables illustrating a pre-registered PDI question when the targeting criterion type code described with reference to FIG. 43 is 0x02.

As illustrated in FIGS. 48 and 49, when the targeting criterion type code is 0x02, the targeting criteria table according to the present embodiment may include pre-registered PDI question information regarding an alphanumeric postal code. In this case, a receiver according to the embodiment of the present invention may convert the targeting criteria table using an appropriate number of bytes according to a region to acquire a pre-registered PDI question. The receiver according to the present embodiment may use a maximum of 8 bytes in order to convert the targeting criteria table.

FIG. 48 is a table showing a pre-registered PDI question regarding a 5-digit zip code when the targeting criterion type code is 0x02. The 5-digit zip code refers to the alphanumeric postal code used in US. Content included in the pre-registered PDI question illustrated in FIG. 48 is the same as content described with reference to FIG. 41.

In detail, as illustrated in FIG. 48, when the targeting criterion type code is 0x02, a question ID according to the present embodiment may include information regarding a zip code. The pre-registered PDI question illustrated in FIG. 48 may be a QTA type and may include a question text including content of requesting a PDI answer of a text type of the zip code.

[Example 16] below is obtained by representing the table illustrated in FIG. 48 in xml schema according to an embodiment of the present invention.

Example 16

```
<a20:QTA id="atsc.org/PDIQ/ZIPcode">
  <a20:Q xml:lang="en-us">
    <a20:Text>What is your 5-digit ZIP code?</a20:Text>
  </a20:Q>
</a20:QTA>
```

FIG. 49 is a table showing a pre-registered PDI question regarding a numeric postal code when the targeting criterion type code is 0x02. The numeric postal code refers to an alphanumeric postal code used in regions other than US. Content included in the pre-registered PDI question illustrated in FIG. 49 is the same as content described with reference to FIG. 41.

In detail, as illustrated in FIG. 49, when the targeting criterion type code is 0x02, the question ID according to the present embodiment may include information regarding a postal code. The pre-registered PDI question illustrated in FIG. 49 and may include a question text including content of requesting a PDI answer of a text type of the postal code.

[Example 17] below is obtained by representing the table illustrated in FIG. 49 in xml schema according to an embodiment of the present invention.

Example 17

```
<a20:QTA id="atsc.org/PDIQ/ZIPcode">
  <a20:Q xml:lang="en-us">
    <a20:Text>What is your 5-digit ZIP code?</a20:Text>
  </a20:Q>
</a20:QTA>
```

FIGS. 50 through 53 are diagrams illustrating a pre-registered PDI question according to an embodiment of the present invention.

In detail, FIGS. 50 through 53 are tables illustrating a pre-registered PDI question when the targeting criterion type code described with reference to FIG. 43 is 0x03.

As illustrated in FIGS. 50 through 53, when the targeting criterion type code is 0x03, the targeting criteria table according to the present embodiment may include pre-registered PDI question information regarding a demographic category of a user. In this case, a receiver according to the embodiment of the present invention may convert the targeting criteria table using only the low order 2 bytes to acquire a pre-registered PDI question.

FIG. 50 is a table showing a pre-registered PDI question regarding a gender of a user when the targeting criterion type code is 0x03. Content included in the pre-registered PDI question illustrated in FIG. 50 is the same as content described with reference to FIG. 41.

In detail, as illustrated in FIG. 50, when the targeting criterion type code is 0x03, the question ID according to the present embodiment may include information regarding a gender. In addition, the pre-registered PDI question illustrated in FIG. 50 may be a QSA type and may include a question text including content of requesting a PDI answer of a selection type of the gender of the user.

In addition, the pre-registered PDI question illustrated in FIG. 50 is a QSA type, and thus, may include selection information regarding a PDI answer. For example, the pre-registered PDI question regarding the gender illustrated in FIG. 50 may include two types of male and female selection information.

[Example 18] below is obtained by representing the table illustrated in FIG. 50 in xml schema according to an embodiment of the present invention.

Example 18

```
<a20:QSA id="atsc.org/PDIQ/gender" minChoices="1">
  <a20:Q xml:lang="en-us">
    <a20:Text>What is your gender?</a20:Text>
    <a20:Selection id="1">Male</a20:Selection>
    <a20:Selection id="2">Female</a20:Selection>
  </a20:Q>
</a20:QSA>
```

FIG. 51 is a table showing a pre-registered PDI question regarding an age bracket of a user when the targeting criterion type code is 0x03. Content included in the pre-registered PDI question illustrated in FIG. 51 is the same as content described with reference to FIG. 41.

In detail, as illustrated in FIG. 51, when the targeting criterion type code is 0x03, the question ID according to the present embodiment may include information regarding the age bracket. The pre-registered PDI question illustrated in FIG. 51 may be a QSA type and may include a question text including content of requesting a PDI answer of a selection type of the age bracket.

In addition, the pre-registered PDI question illustrated in FIG. 51 is a QSA type, and thus, may include selection information regarding a PDI answer. For example, the pre-registered PDI question regarding the age bracket illustrated in FIG. 51 may include 8 types of selection information regarding ages 2-5, ages 6-11, ages 12-17, ages 18-34, ages 35-49, ages 50-54, ages 55-64, and ages over 65.

[Example 19] below is obtained by representing the table illustrated in FIG. 51 in xml schema according to an embodiment of the present invention.

Example 19

```
<a20:QSA id="atsc.org/PDIQ/age-bracket" minChoices="1">
  <a20:Q xml:lang="en-us">
    <a20:Text> What age bracket are you in</a20:Text>
    <a20:Selection id="1">Ages 2-5</a20:Selection>
    <a20:Selection id="2">Ages 6-11</a20:Selection>
    <a20:Selection id="3">Ages 12-17</a20:Selection>
    <a20:Selection id="4">Ages 18-34</a20:Selection>
    <a20:Selection id="5">Ages 35-49</a20:Selection>
    <a20:Selection id="6">Ages 50-54</a20:Selection>
    <a20:Selection id="7">Ages 55-64</a20:Selection>
    <a20:Selection id="8">Ages 65+</a20:Selection>
  </a20:Q>
</a20:QSA>
```

FIG. 52 is a table illustrating a pre-registered PDI question regarding whether a user is working when the targeting criterion type code is 0x03. Content included in the pre-registered PDI question illustrated in FIG. 52 is the same as content described with reference to FIG. 41.

In detail, as illustrated in FIG. 52, when the targeting criterion type code is 0x03, the question ID according to the present embodiment may include information regarding working. The pre-registered PDI question illustrated in FIG. 52 may be a QSA type and may include a question text including content of requesting a PDI answer of a selection type regarding whether the user is working.

In addition, the pre-registered PDI question illustrated in FIG. 52 is a QSA type, and thus, may include selection information regarding a PDI answer. For example, the pre-registered PDI question regarding working illustrated in FIG. 50 may include 2 types of selection information regarding yes and no.

[Example 20] below is obtained by representing the table illustrated in FIG. 52 in xml schema according to an embodiment of the present invention.

Example 20

```
<a20:QSA id="atsc.org/PDIQ/working" minChoices="1">
  <a20:Q xml:lang="en-us">
    <a20:Text>Are you working at a paying job?
    </a20:Text>
    <a20:Selection id="1">Yes</a20:Selection>
    <a20:Selection id="2">No</a20:Selection>
  </a20:Q>
</a20:QSA>
```

FIG. 53 is a table showing a pre-registered PDI question regarding a gender of a user when the targeting criterion type code is 0x03. Content included in the pre-registered PDI question illustrated in FIG. 53 is the same as content described with reference to FIG. 41.

In detail, as illustrated in FIG. 53, when the targeting criterion type code is 0x03, the question ID according to the present embodiment may include information regarding working. In addition, the pre-registered PDI question illustrated in FIG. 53 may be a QBA type and may include a question text including content of requesting a PDI answer of a Boolean type regarding whether the user is working.

[Example 21] below is obtained by representing the table illustrated in FIG. 53 in xml schema according to an embodiment of the present invention.

Example 21

```
<a20:QBA id="atsc.org/PDIQ/working" >
  <a20:Q xml:lang="en-us">
    <a20:Text>Are you working at a paying job?
  </a20:Q>
</a20:QBA>
```

FIG. 54 is a diagram illustrating an application programming interface (PDI API) according to an embodiment of the present invention.

In detail, FIG. 54 is a diagram illustrating a function for using PDI data by application such as the aforementioned declarative content object (DO), etc. The PDI API according to the present embodiment refers to an interface for access of a receiver according to the embodiment of the present invention to a PDI store.

An ATSC 2.0 client device supports the PDI APIs to enable accessing (e.g. search or update) PDI Questions.

The APIs provided as part of the ATSC 2.0 DAE allow a DO, given the ID of a given question, to fetch the text of that question from storage, to fetch a previously supplied answer to that question (if available), and to store an answer to that question.

No attempt is made to define or enforce any rules that would prevent a TDO from accessing or writing any particular question or answer. It is envisioned that multiple entities may provide questionnaires usable on a given channel. Such entities could include, but are not limited to, the national network operator, the local broadcaster affiliate, and various program producers/providers.

The ATSC 2.0 client device implements APIs for PDI data storage and retrieval. To implement PDI functionality, the device can use a native application, a file system/database, or even use a remote service to provide the PDI database. The PDI Store is bound to an ATSC client. Only one PDI Store instance exists for the client. The PDI Store allows the DOs to access the client's PDI data and also allows the user, through native applications, to manage (e.g. update, add, or delete) PDI Questions in a consistent manner across different service providers.

FIG. 54 is a table showing PDI API according to an embodiment of the present invention. A receiver according to the embodiment of the present invention may acquire a PDI table list using the PDI API illustrated in FIG. 54.

Hereinafter, the API illustrated in FIG. 54 will be described.

A name of the API illustrated in FIG. 54 is getPDITableList( ) and may be changed according to a designer's intention. Description illustrated in FIG. 54 refers to details of a getPDITableList( ) API function. Arguments illustrated in FIG. 54 refer to a parameter of the getPDITableList( ) API function.

More specifically, the description shown in FIG. 54 indicates that the getPDITableList( ) API function is for returning an XML structure with a list of the PDI tables, giving the pdiTableId for each one. The XML structure is as following XML schema. A pdiTableList element which has a single pdiTableId child element, with cardinality 0 to unbounded. The case of 0 pdiTableId instances would indicate that the broadcaster has not provided a PDI Table.

The arguments shown in FIG. 54 indicate that pdiTableId is a globally unique identifier of the PDI Table, in the form of a URI.

Thus, a receiver according to the embodiment of the present invention may receive the PDI table list with a table format according to XML schema. As illustrated in FIG. 54, the PDI table list may include a pdiTableId element. When cardinality of the pdiTableId element illustrated in FIG. 54 indicates 0, this means that a receiver according to the embodiment of the present invention does not receive a PDI table from a broadcaster.

FIG. 55 is a diagram showing PDI API according to another embodiment of the present invention.

In detail, FIG. 55 is a diagram showing PDI API for acquiring a PDI table by a receiver according to the embodiment of the present invention.

Hereinafter, the API illustrated in FIG. 55 will be described.

A name of the API illustrated in FIG. 55 is getPDITable (String pdiTableId) and may be changed according to a designer's intention. Description illustrated in FIG. 55 refers to details of a getPDITable (String pdiTableId) API function. Arguments illustrated in FIG. 55 refer to a parameter of the getPDITable (String pdiTableId) API API function.

More specifically, the description shown in FIG. 55 indicates that the getPDITable (String pdiTableId) API function is for returning the PDI Table XML document for the receiver. Each pdiTable is associated with an identified by the globally unique pdiTableId identifier provided as input to the method. The returned value is a string that contains the serialized PDI Table XML instances, optionally containing PDI-Q or PDI-A XML instances.

The arguments shown in FIG. 55 indicate that pdiTableId is a globally unique identifier of the PDI Table, in the form of a URI.

Thus, a receiver according to the embodiment of the present invention may receive the PDI table list described with reference to FIG. 54 and then receive a PDI table. In detail, the receiver that receives the PDI table list may receive a PDI table XML document associated with the pdiTableId illustrated in FIG. 54.

In detail, an operation of a receiver based on the PDI API illustrated in FIG. 55 is the same as the operation described with reference to FIGS. 7 through 10, 23, 34, 36, and 39 through 42. In addition, the receiver based on the PDI API illustrated in FIG. 55 may receive the PDI table list in the PDI table format described with reference to FIGS. 11 through 18.

FIG. 56 is a diagram showing PDI API according to another embodiment of the present invention.

In detail, FIG. 56 is a diagram showing PDI API for acquiring a PDI answer by a receiver according to the embodiment of the present invention.

Hereinafter, the API illustrated in FIG. 56 will be described.

A name of the API illustrated in FIG. 56 is getPDIA (String pdiTableId) and may be changed according to a designer's intention. Description illustrated in FIG. 56 refers to details of a getPDIA (String pdiTableId) API function. Arguments illustrated in FIG. 56 refers to a parameter of the getPDIA (String pdiTableId) API function.

More specifically, the description shown in FIG. 56 indicates that the getPDIA (String pdiTableId) API function is for returning the PDI-A XML document for the receiver. Each pdiTable is associated with an identified by the globally unique pdiTableId identifier provided as input to the method. The returned value is a string that contains the serialized PDI-A XML instances.

The arguments shown in FIG. 56 indicate that pdiTableId is a globally unique identifier of the PDI Table, in the form of a URI.

Thus, a receiver that receives the PDI table list described with reference to FIG. 54 and then receive an XML document (or PDI-A instance document) of a PDI-A table associated with the pdiTableId illustrated in FIG. 54. The PDI-A instance document according to the present embodiment is the same as the document described with reference to FIG. 17.

In detail, an operation of a receiver based on the PDI API illustrated in FIG. 56 is the same as the operation described with reference to FIGS. 7 through 10, 23, 34, 36, and 39 through 42.

Although not illustrated in FIG. 54 through 56, the PDI API according to the present embodiment can be described as [Example 22] and/or [Example 23] below.

Example 22

| Object getPDI(String id) | |
|---|---|
| Description | Returns an XML DOM object representing an XML document containing as its root element a PDI QxAD element, the QxA child element of which is the PDI Question identified by the given id, QxA@id. If no PDI Questions with the given value of id exist, this method shall return null.<br>Note: Only one PDI Question with a given value of question id can exist in a PDI Store. More than one PDI Table could hold a PDI Question of the same question id so long as the consistency is maintained. |
| Arguments | id        Identification of the PDI Question |

Example 23

| void setPDI(object id) | |
|---|---|
| Description | First checks if the PDI Question corresponding to the QxA element in the QxAD document represented by the given object already exists in the PDI Store. If it does not, then the method shall do nothing. If it does exist, then the stored PDI question shall be updated to the one provided. Only the answer element QxA.A of the PDI Question can be updated. The value of PDITable@pdiTableVersion of the PDI Table is not changed. If the updated PDI Question is shared by different PDI Tables, those related tables shall be changed without any version update. The method shall throw a QUOTA_EXCEEDED_ERR exception if the storage capacity has been exceeded, or a WRONG_DOCUMENT_ERR exception if an invalid document is specified. The method shall be atomic with respect to failure. In the case of failure, the method does nothing. That is, changes to the data storage area must either be successful, or the data storage area must not be changed at all. |
| arguments | id             Object representing the PDI Question object for which the answer is to be stored. |

Figure 57:
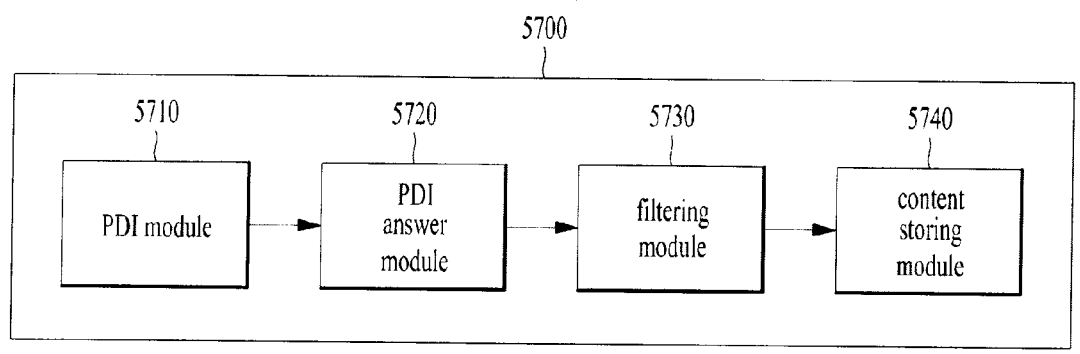
FIG. 57 is a diagram illustrating a digital service signal processing apparatus according to an embodiment of the present invention.

FIG. 57 is a diagram illustrating a digital service signal processing apparatus according to an embodiment of the present invention.

In detail, FIG. 57 is a diagram of a receiving apparatus 5700 for processing a digital service signal according to an embodiment of the present invention. The receiving apparatus 5700 illustrated in FIG. 57 may realize a personalization broadcast service and may provide an ATSC 2.0 service.

As illustrated in FIG. 57, the receiving apparatus 5700 according to the present embodiment may include a PDI module 5710, a PDI answer module 5720, a filtering module 5730, and/or a content storing module 5740. The structure of the receiving apparatus 5700 may be changed according to a designer's intention. Hereinafter, each module will be described.

The PDI module 5710 shown in FIG. 57 may receive a PDI table, wherein the PDI table includes at least one question element having attributes of a PDI question. A The PDI module 5710 shown in FIG. 5 also may extract the PDI question from the at least one question element, wherein each of the at least one question element has a different type. An operation of the PDI module 5710 according to the present embodiment is the same as the operation described with reference to FIGS. 7 and 8, and 54 through 56.

The type of the at least one question element according to the embodiment of the present invention indicates a type for the PDI question with one of an integer answer, a Boolean answer, a selection answer, a text answer and an answer with no PDI question.

The PDI table according to the embodiment of the present invention may further include a table Id field, a table version field, a time field, a protocol version field, an expire field and/or a xactionSetId field.

A table Id field according to the embodiment of the present invention can identify the PDI table. A table version field according to the embodiment of the present invention can indicate a version of the PDI table. A time field according to the embodiment of the present invention can indicate a date and a time of the most recent change to the PDI question. A protocol version field according to the embodiment of the present invention can indicate a protocol version of the PDI table. An expire field according to the embodiment of the present invention can indicate an expiration date and time of each of the PDI question. A xactionSetId field according to the embodiment of the present invention can indicate whether each of the PDI question belongs to a set of the PDI questions.

At least one question element according to the embodiment of the present invention may further include a situation field indicating information of location and time, wherein the situation field includes a location field including information of a latitude and a longitude.

The aforementioned PDI table and question element have been described with reference to FIGS. 11 through 18.

The PDI answer module 5720 shown in FIG. 57 may receive a PDI answer according to the extracted PDI question. An operation of the PDI answer module 5720 according to the present embodiment is the same as the operation described with reference to FIGS. 7 and 8 and 54 through 56.

The filtering module 5730 shown in FIG. 57 may receive filtering criteria information. The filtering module 5730 may also filter contents of the digital service signal by comparing the filtering criteria information against the received the PDI answer. An operation of the filtering module 5730 according to the present embodiment is the same as the operation described with reference to FIGS. 7 through 10 and 54 through 56.

A type of the filtering criteria information according to the embodiment of the present invention indicates a type for the PDI question with one of an integer answer, a Boolean answer, a selection answer, a text answer and an answer with no PDI question, the filtering further includes determining whether the filtering criteria information matches the PDI answer. The filtering criteria information according to the present embodiment has been described with reference to FIGS. 19 through 22.

The content storing module 5740 shown in FIG. 57 may download the filtered contents. An operation of the content storing module 5740 according to the present embodiment is the same as the operation described with reference to FIGS. 7 and 8 and 54 through 56.

When the PDI table is carried via an IP subnet, a The PDI module 5710 shown in FIG. 57 may further sends requests including signatures of the contents periodically to a ACR (Automatic Content Recognition) server and receives responses including triggers for receiving the URLList information and a TPT including the filtering criteria information from the ACR server. An operation of the PDI module 5710 according to the present embodiment is the same as the operation described with reference to FIGS. 36 through 39. In addition, the aforementioned IP subnet has been described with reference to FIG. 24.

When the PDI table is delivered via the broadcast stream, a The PDI module 5710 shown in FIG. 57 may further receives a table section including sequence number information to distinguish the PDI table and receives the PDI table using the sequence number information of the table section. An operation of the PDI module 5710 according to the present embodiment is the same as the operation described with reference to FIGS. 23 through 35.

Although not illustrated in FIG. 57, the receiving apparatus 5700 according to the present embodiment may further include usage log, usage monitoring engine and/or usage monitoring engine. A usage log according the embodiment of the present invention may store a history of service usage. A usage monitoring engine according the embodiment of the present invention may monitor the service usage periodically or by receiving a request signal. A usage monitoring engine according the embodiment of the present invention may apply the monitoring result to update the contents. A detailed description thereof has been given with reference to FIG. 8.

Figure 58:
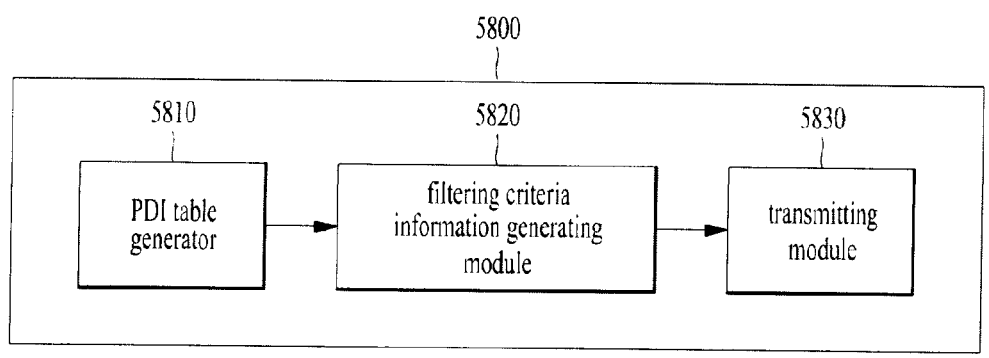
FIG. 58 is a diagram illustrating a digital service signal processing apparatus according to another embodiment of the present invention.

FIG. 58 is a diagram illustrating a digital service signal processing apparatus according to another embodiment of the present invention.

In detail, FIG. 58 is a diagram of a transmitting apparatus 5800 for processing a digital service signal according to an embodiment of the present invention. The transmitting apparatus 5800 illustrated in FIG. 58 may provide a personalization broadcast service and may provide an ATSC 2.0 service.

As illustrated in FIG. 58, the transmitting apparatus 5800 according to the present embodiment may include a PDI table generator 5810, a filtering criteria information generating module 5820, and a transmitting module 5830. The structure of the transmitting apparatus 5800 may be changed according to a designer's intention. Hereinafter, each module will be described.

The PDI table generator 5810 shown in FIG. 58 may generate a PDI table, wherein the PDI table includes at least one question element having attributes of a PDI question, wherein the PDI table further includes a table Id field identifying the PDI table, a table version field indicating a version of the PDI table and a time field indicating a date and a time of the most recent change to the PDI question.

The type of the at least one question element according the embodiment of the present invention indicates a type for the PDI question with one of an integer answer, a Boolean answer, a selection answer, a text answer and an answer with no PDI question.

The PDI table and the question element have been described with reference to FIGS. 11 through 18.

The filtering criteria information generating module 5820 shown in FIG. 58 may generate filtering criteria information. Content of the filtering criteria information according to the present embodiment is the same as the content described with reference to FIGS. 19 through 22.

The transmitting module 5830 shown in FIG. 58 may transmit the PDI table, the filtering criteria information and contents of the digital service signal. An operation of the transmitting module 5830 according to the present embodiment is the same as the operation described with reference to FIGS. 7 and 8, and 54 through 56.

When the PDI table is transmitted via the broadcast stream, the transmitting module 5830 may further compresses the generated PDI table, divides the compressed PDI table into blocks and inserts the blocks into sections carried in the Service Signaling Channel (SSC), wherein the sections includes sequence number information to distinguish the PDI table. A detailed operation of the transmitting module 5830 is the same as the operation described with reference to FIG. 24.

Figure 59:
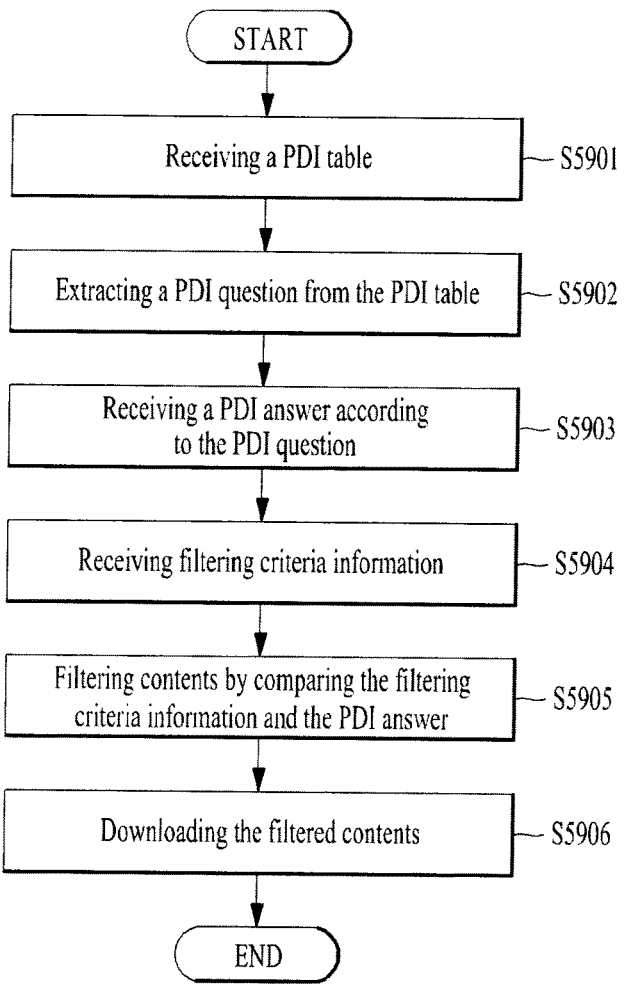
FIG. 59 is a diagram of a digital service signal processing method according to an embodiment of the present invention.

FIG. 59 is a diagram of a digital service signal processing method according to an embodiment of the present invention.

In detail, FIG. 59 illustrates a method of receiving and processing a digital service signal by a personalization broadcast system according to an embodiment of the present invention. The aforementioned personalization broadcast system may process a personalization broadcast service illustrated in FIGS. 17 through 56 according to an embodiment of the present invention.

A receiver according to the embodiment of the present invention may receive a PDI table (S5901).

In detail, a receiver according to the embodiment of the present invention may receive a PDI table including PDI questionnaire from a content provider or a broadcaster. A more detailed description thereof has been described with reference to FIGS. 7 and 8 and 54 through 56.

In addition, a receiver according to the embodiment of the present invention may receive a PDI table via an ip subnet. A receiver according to the embodiment of the present invention may further sends requests including signatures of the contents periodically to a ACR (Automatic Content Recognition) server and receives responses including triggers for receiving the URLList information and a TPT including the filtering criteria information from the ACR server. A detailed description thereof has been described with reference to FIGS. 24 and 36 through 39.

A receiver according to the embodiment of the present invention may receive a PDI table through a broadcast stream. A receiver according to the embodiment of the present invention may further receive a table section including sequence number information to distinguish the PDI table and receives the PDI table using the sequence number information of the table section. A detailed description thereof has been described with reference to FIGS. 23 through 35.

The type of the at least one question element according to the embodiment of the present invention indicates a type for the PDI question with one of an integer answer, a Boolean answer, a selection answer, a text answer and an answer with no PDI question.

The PDI table according to the embodiment of the present invention may further include a table Id field, a table version field, a time field, a protocol version field, an expire field and/or a xactionSetId field.

A table Id field according to the embodiment of the present invention can identify the PDI table. A table version field according to the embodiment of the present invention can indicate a version of the PDI table. A time field according to the embodiment of the present invention can indicate a date and a time of the most recent change to the PDI question. A protocol version field according to the embodiment of the present invention can indicate a protocol version of the PDI table. An expire field according to the embodiment of the present invention can indicate an expiration date and time of each of the PDI question. A xactionSetId field according to the embodiment of the present invention can indicate whether each of the PDI question belongs to a set of the PDI questions.

At least one question element according to the embodiment of the present invention may further include a situation field indicating information of location and time, wherein the situation field includes a location field including information of a latitude and a longitude.

A detailed description of the aforementioned PDI table and question element has been given with reference to FIGS. 11 through 18.

A receiver according to the embodiment of the present invention may extract a PDI question from a PDI table (S5902).

In detail, a receiver according to the embodiment of the present invention may extract a QxA.Q element of a string type from the PDI table illustrated in FIG. 17. A detailed description thereof has been given with reference to FIGS. 11 and 18.

A receiver according to the embodiment of the present invention may receive a PDI answer to a PDI question (S5903).

In detail, a receiver according to the embodiment of the present invention may display the aforementioned PDI question through a UI and receive a PDI answer to a corresponding PDI question from a user. A receiver according to the embodiment of the present invention may update a PDI table including the corresponding PDI question using the received DI answer. A detailed description thereof has been given with reference to FIGS. 7, 8, and 23.

A receiver according to the present embodiment may receive filtering criteria information (S5904).

In detail, a receiver according to the embodiment of the present invention may receive filtering criteria information of the format described with reference to FIGS. 19 through 22.

In addition, a receiver according to the embodiment of the present invention may receive filtering criteria information through a broadcast network. In this case, a receiver according to the present embodiment may receive filtering criteria information of the format described with reference to FIGS. 32 and 33.

A receiver according to the embodiment of the present invention may compare filtering criteria information and PDI answer to filter content (S5905).

In detail, a receiver according to the embodiment of the present invention may match and compare the filtering criteria information and the PDI answer using a PDI data identifier for identifying PDI data. A detailed description thereof has been given with reference to FIGS. 7 through 10.

A receiver according to the embodiment of the present invention may download the filtered content (S5906).

In detail, the receiver according to the embodiment of the present invention may determine whether corresponding content needs to be provided to a user using the aforementioned filtering result and download the corresponding content as necessary. A more detailed description has been given with reference to FIGS. 7 through 10.

Figure 60:
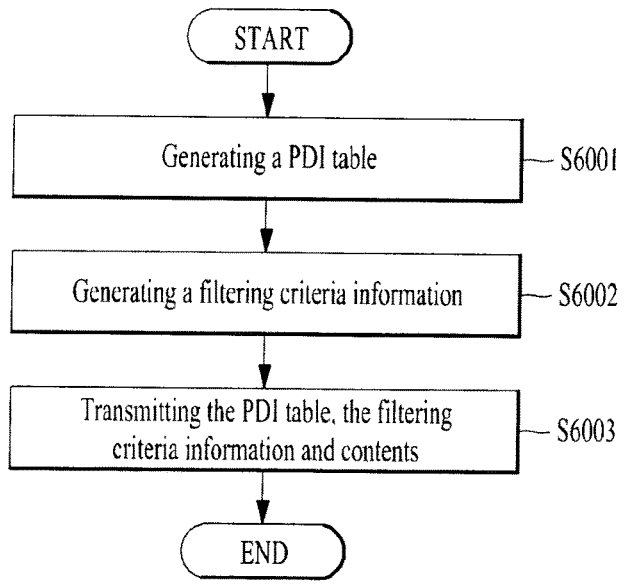
FIG. 60 is a diagram illustrating a digital service signal processing method according to another embodiment of the present invention.

FIG. 60 is a diagram illustrating a digital service signal processing method according to another embodiment of the present invention.

In detail, FIG. 60 is a flowchart of a method of transmitting and receiving a digital service signal by a personalization broadcast system according to an embodiment of the present invention. The aforementioned personalization broadcast system may process the personalization broadcast service illustrated in FIGS. 17 through 56 according to an embodiment of the present invention.

The personalization broadcast system according to the present embodiment may generate a PDI table (S6001).

In detail, the aforementioned PDI table includes at least one question element having attributes of a PDI question, wherein the PDI table further includes a table Id field identifying the PDI table, a table version field indicating a version of the PDI table and a time field indicating a date and a time of the most recent change to the PDI question.

The type of the at least one question element according the embodiment of the present invention indicates a type for the PDI question with one of an integer answer, a Boolean answer, a selection answer, a text answer and an answer with no PDI question.

The aforementioned PDI table and question element will be described in detail with reference to FIGS. 11 through 18.

The personalization broadcast system according to the present embodiment may generate filtering criteria information (S6002).

In detail, as illustrated in FIGS. 7 and 8, the content provider and/or the broadcaster may generate filtering criteria information for acquisition of PDI information of a user. The filtering criteria information according to the present embodiment has been described with reference to FIGS. 19 through 22.

The personalization broadcast system according to the present embodiment may transmit a PDI table, filtering criteria information, and/or contents (S6003).

In detail, the content provider and/or the broadcaster may transmit a PDI table, filtering criteria information, and/or contents through a broadcast network or the Internet. A more detailed description has been given with reference to FIGS. 7 and 8 and 23 through 39.

According to the present invention, a personalization broadcast system may effectively collect user information and process the user information that is collected for providing a personalization service.

According to the present invention, the personalization broadcast system may select and provide content optimized for a user using user information.

In addition, according to the present invention, the user may actively select and user content via the personalization broadcast system.

Various embodiments have been described in the best mode for carrying out the invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of receiving a digital service signal, the method comprising:
receiving, by a receiving processor, contents, at least one application related to the contents, an NRT (Non-Real Time) service map table for signaling the contents and an application parameter table including metadata about the at least one application;
receiving, by a PDI processor, a PDI (Profiles, Demographics, Interests) table,
wherein the PDI table includes at least one question element having attributes of a PDI question, and each of the at least one question element includes a question identification element identifying a PDI question and an answer element including an answer for the identified PDI question;
extracting, by an extracting processor, the PDI question from the PDI table;

receiving, by a PDI answering processor, a PDI answer according to the extracted PDI question and storing the received PDI answer into the PDI table;

parsing, by the receiving processor, a first filtering criteria information from the received NRT service map table, the first filtering criteria information including a first criterion on the basis of which to filter the contents, wherein the parsed first filtering criteria information comprises a criterion id of the first criterion and a criterion value of the first criterion;

querying, by a filtering processor, whether the criterion id of the first criterion from the parsed first filtering criteria information matches the question identification element of the PDI question from the stored PDI table;

comparing, by the filtering processor, the criterion value of the first criterion from the parsed first filtering criteria information against the PDI answer corresponding to the PDI question identified by the question identification element from the stored PDI table, in the event the querying indicates that the criterion id of the first criterion matches the question identification element of the PDI question from the stored PDI table;

filtering, by the filtering processor, the contents when the comparing indicates that the criterion value of the first criterion matches the PDI answer corresponding to the question identification element from the stored PDI table;

parsing, by the receiving processor, a second filtering criteria information from the received application parameter table, the second filtering criteria information including a second criterion on the basis of which to filter a content item used by a first application of the at least one application, wherein the second filtering criteria information comprises a criterion id of a second criterion and a criterion value of the second criterion, wherein the received application parameter table includes therein a first application element, representing a child element of the application parameter table comprising information about the first application, wherein the first application element is indicated in the received application parameter table as a first hierarchical sublevel sub element of the application parameter table, wherein the first application element comprises an identifier identifying the first application uniquely within a scope of the application parameter table, wherein the received application parameter table includes therein a first content item element, representing a child element of the first application element including information about the content item that are needed by the first application, wherein the first content item element is indicated in the received application parameter table as a first hierarchical sublevel sub element of the first application element at a second hierarchical sublevel of the application parameter table, wherein the received application parameter table includes therein the second filtering criteria information, represented as a child element of the first content item element, wherein the second filtering criteria information is indicated in the received application parameter table as a first hierarchical sublevel sub element of the first content item element at a third hierarchical sublevel of the application parameter table;

querying, by the filtering processor, whether the criterion id of the second criterion from the parsed second filtering criteria information matches the question identification element of the PDI question form the stored PDI table;

comparing, by the filtering processor, the criterion value of the second criterion from the parsed second filtering criteria information against the PDI answer corresponding to the PDI question identified by the question identification element from the stored PDI table, in the event the querying indicates that the criterion id of the second criterion matches the question identification element of the PDI question from the stored PDI table;

filtering, by the filtering processor, the content item when the comparing indicates that the criterion value of the second criterion matches the PDI answer corresponding to the question identification element from the stored PDI table; and downloading, by a content storing processor, the filtered contents and the filtered content item.

2. The method of claim 1, wherein the PDI table includes at least one of a table Id field identifying the PDI table, a table version field indicating a version of the PDI table and a time field indicating a date and a time of the most recent change to the at least one PDI question.

3. The method of claim 1, wherein each of the at least one question element has a different type, and the type of the at least one question element indicates a type for the PDI question with one of an integer answer, a Boolean answer, a selection answer, a text answer and an answer with no PDI question.

4. The method of claim 1, wherein the PDI table further includes at least one of a protocol version field indicating a protocol version of the PDI table and an expire field indicating an expiration date and time of each of the PDI question.

5. The method of claim 1, wherein the at least one question element further includes a situation field indicating information of location and time, wherein the situation field includes a location field including information of a latitude and a longitude.

6. The method of claim 1, the method further includes:
storing a history of service usage;
monitoring the service usage periodically or by receiving a request signal; and
applying the monitoring result to update the contents.

7. A method of processing a digital service signal, the method comprising:
generating, by a generator, contents, at least one application related to the contents, an NRT (Non-Real Time) service map table for signaling the contents and an application parameter table including metadata about the at least one application;
generating, by a PDI table generator, a PDI table,
wherein the PDI table includes at least one question element having attributes a PDI question, and each of the at least one question element includes a question identification element identifying a PDI question and an answer element including an answer for the identified PDI question;
generating, by a filtering criteria information generator, a first filtering criteria information including a first criterion on the basis of which to filter the contents, wherein the first filtering criteria information comprises a criterion id of the first criterion and a criterion value of the first criterion,
wherein the criterion id of the first criterion is used for querying whether the criterion id of the first criterion from the first filtering criteria information matches the question identification element of the PDI question from the PDI table, wherein the criterion value of the first criterion is used for comparing the criterion value of the first criterion from the first filtering criteria information against the PDI answer corresponding to the PDI question identified by the question identification element from the PDI table, in the event the querying indicates that the criterion id of the first criterion matches the question identification element of the PDI question from the PDI table, wherein the contents is filtered when the comparing indicates that the criterion value of the first criterion matches the PDI answer corresponding to the question identification element from the PDI table;

generating, by the filtering criteria information generator, a second filtering criteria information including a second criterion on the basis of which to filter a content item used by a first application of the at least one application, wherein the second filtering criteria information comprises a criterion id of a second criterion and a criterion value of the second criterion, wherein the application parameter table includes therein a first application element, representing a child element of the application parameter table comprising information about the first application, wherein the first application element is indicated in the application parameter table as a first hierarchical sublevel sub element of the application parameter table, wherein the first application element comprises an identifier identifying the first application uniquely within a scope of the application parameter table, wherein the application parameter table includes therein a first content item element, representing a child element of the first application element including information about the content item that are needed by the first application, wherein the first content item element is indicated in the application parameter table as a first hierarchical sublevel sub element of the first application element at a second hierarchical sublevel of the application parameter table, wherein the application parameter table includes therein the second filtering criteria information, represented as a child element of the first content item element, wherein the second filtering criteria information is indicated in the application parameter table as a first hierarchical sublevel sub element of the first content item element at a third hierarchical sublevel of the application parameter table, wherein the criterion id of the second criterion is used for querying whether the criterion id of the second criterion from the second filtering criteria information matches the question identification element of the PDI question form the PDI table, wherein the criterion value of the second criterion is used for comparing the criterion value of the second criterion from the second filtering criteria information against the PDI answer corresponding to the PDI question identified by the question identification element from the PDI table, in the event the querying indicates that the criterion id of the second criterion matches the question identification element of the PDI question from the PDI table, wherein the content item is filtered when the comparing indicates that the criterion value of the second criterion matches the PDI answer corresponding to the question identification element from the PDI table, wherein the NRT service map table includes the first filtering criteria, wherein the application parameter table includes the second filtering criteria; and transmitting, by a transmitting processor, the PDI table, the first filtering criteria information, the second filtering criteria information, the at least one application and the contents.

8. The method of claim 7, wherein when the PDI table is transmitted via the broadcast stream, the method further includes:
compressing the generated PDI table;
dividing the compressed PDI table into blocks;
inserting the blocks into sections carried in the Service Signaling Channel (SSC),
wherein the sections includes sequence number information to distinguish the PDI table.

9. An apparatus for receiving a digital service signal, comprising;
a receiving processor that receives contents, at least one application related to contents of the digital service signal, an NRT (Non-Real Time) service map table for signaling the contents and an application parameter table including metadata about the at least one application,
wherein the receiving processor parses first filtering criteria information for filtering the contents from the NRT service map table and parsing second filtering criteria information for filtering content items used by the at least one application from the application parameter table;
a PDI processor that receives a PDI table,
wherein the PDI table includes at least one question element having attributes of a PDI question, and each of the at least one question element includes a question identification element identifying a PDI question and an answer element including an answer for the identified PDI question,
wherein each of the first filtering criteria information and the second filtering criteria information includes at least one criterion element including a criterion identification element identifying a criterion and at least one criterion value element representing an answer for a PDI question corresponding to the identified criterion;
an extracting processor that extracts the PDI question from the PDI table;
a PDI answering processor that receives a PDI answer according to the extracted PDI question and storing the received PDI answer into the PDI table,
wherein the receiving processor further parses a first filtering criteria information from the received NRT service map table, the first filtering criteria information including a first criterion on the basis of which to filter the contents, wherein the parsed first filtering criteria information comprises a criterion id of the first criterion and a criterion value of the first criterion;
a filtering processor that queries whether the criterion id of the first criterion from the parsed first filtering criteria information matches the question identification element of the PDI question from the stored PDI table,
wherein the filtering processor compares the criterion value of the first criterion from the parsed first filtering criteria information against the PDI answer corresponding to the PDI question identified by the question identification element from the stored PDI table, in the event the querying indicates that the criterion id of the first criterion matches the question identification element of the PDI question from the stored PDI table,
wherein the filtering processor filters the contents when the comparing indicates that the criterion value of the first criterion matches the PDI answer corresponding to the question identification element from the stored PDI table, wherein the receiving processor parses a second filtering criteria information from the received application parameter table, the second filtering criteria information including a second criterion on the basis of which to filter a content item used by a first application of the at least one application, wherein the second filtering criteria information comprises a criterion id of a second criterion and a criterion value of the second criterion, wherein the received application parameter table includes therein a first application element, representing a child element of the application parameter table comprising information about the first application, wherein the first application element is indicated in the received application parameter table as a first hierarchical sublevel sub element of the application parameter table, wherein the first application element comprises an identifier identifying the first application uniquely within a scope of the application parameter table, wherein the received application parameter table includes therein a first content item element, representing a child element of the first application element including information about the content item that are needed by the first application, wherein the first content item element is indicated in the received application parameter table as a first hierarchical sublevel sub element of the first application element at a second hierarchical sublevel of the application parameter table, wherein the received application parameter table includes therein the second filtering criteria information, represented as a child element of the first content item element, wherein the second filtering criteria information is indicated in the received application parameter table as a first hierarchical sublevel sub element of the first content item element at a third hierarchical sublevel of the application parameter table, wherein the filtering processor further queries whether the criterion id of the second criterion from the parsed second filtering criteria information matches the question identification element of the PDI question form the stored PDI table, wherein the filtering processor further compares the criterion value of the second criterion from the parsed second filtering criteria information against the PDI answer corresponding to the PDI question identified by the question identification element from the stored PDI table, in the event the querying indicates that the criterion id of the second criterion matches the question identification element of the PDI question from the stored PDI table, wherein the filtering processor further filters the content item when the comparing indicates that the criterion value of the second criterion matches the PDI answer corresponding to the question identification element from the stored PDI table; and a content storing processor that downloads the filtered contents and the filtered content item.

10. The apparatus of claim 9, wherein the PDI table includes at least one of a table Id field identifying the PDI table, a table version field indicating a version of the PDI table and a time field indicating a date and a time of the most recent change to the at least one PDI question.

11. The apparatus of claim 9, wherein each of the at least one question element has a different type, and the type of the at least one question element indicates a type for the PDI question with one of an integer answer, a Boolean answer, a selection answer, a text answer and an answer with no PDI question.

12. The apparatus of claim 9, wherein the PDI table further includes at least one of a protocol version field indicating a protocol version of the PDI table and an expire field indicating an expiration date and time of each of the PDI question.

13. The apparatus of claim 9, wherein the at least one question element further includes a situation field indicating information of location and time, wherein the situation field includes a location field including information of a latitude and a longitude.

14. The apparatus of claim 9, the apparatus further includes:
an usage log that stores a history of service usage;
an usage monitoring engine that monitors the service usage periodically or by receiving a request signal; and
an usage monitoring engine that applies the monitoring result to update the contents.

15. An Apparatus for processing a digital service signal, comprising:
a generator that generates contents, at least one application related to the contents, an NRT (Non-Real Time) service map table for signaling the contents and an application parameter table including metadata about the at least one application;
a PDI table generator that generates a PDI table,
wherein the PDI table includes at least one question element having attributes of a PDI question, and each of the at least one question element includes a question identification element identifying a PDI question and an answer element including an answer for the identified PDI question;
a filtering criteria information generator that generates a first filtering criteria information including a first criterion on the basis of which to filter the contents, wherein the first filtering criteria information comprises a criterion id of the first criterion and a criterion value of the first criterion,
wherein the criterion id of the first criterion is used for querying whether the criterion id of the first criterion from the first filtering criteria information matches the question identification element of the PDI question from the PDI table,
wherein the criterion value of the first criterion is used for comparing the criterion value of the first criterion from the first filtering criteria information against the PDI answer corresponding to the PDI question identified by the question identification element from the PDI table, in the event the querying indicates that the criterion id of the first criterion matches the question identification element of the PDI question from the PDI table,
wherein the contents is filtered when the comparing indicates that the criterion value of the first criterion matches the PDI answer corresponding to the question identification element from the PDI table,
wherein the filtering criteria information generator further generates a second filtering criteria information including a second criterion on the basis of which to filter a content item used by a first application of the at least one application, wherein the second filtering criteria information comprises a criterion id of a second criterion and a criterion value of the second criterion,
wherein the application parameter table includes therein a first application element, representing a child element of the application parameter table comprising information about the first application, wherein the first application element is indicated in the application parameter table as a first hierarchical sublevel sub element of the application parameter table, wherein the first application element comprises an identifier identifying the first application uniquely within a scope of the application parameter table, wherein the application parameter table includes therein a first content item element, representing a child element of the first application element including information about the content item that are needed by the application, wherein the first content item element is indicated in the application parameter table as a first hierarchical sublevel sub element of the first application element at a second hierarchical sublevel of the application parameter table, wherein the application parameter table includes therein the second filtering criteria information, represented as a child element of the first content item element, wherein the second filtering criteria information is indicated in the application parameter table as a first hierarchical sublevel sub element of the first content item element at a third hierarchical sublevel of the application parameter table, wherein the criterion id of the second criterion is used for querying whether the criterion id of the second criterion from the second filtering criteria information matches the question identification element of the PDI question form the PDI table, wherein the criterion value of the second criterion is used for comparing the criterion value of the second criterion from the second filtering criteria information against the PDI answer corresponding to the PDI question identified by the question identification element from the PDI table, in the event the querying indicates that the criterion id of the second criterion matches the question identification element of the PDI question from the PDI table, wherein the content item is filtered when the comparing indicates that the criterion value of the second criterion matches the PDI answer corresponding to the question identification element from the PDI table, wherein the NRT service map table includes the first filtering criteria, wherein the application parameter table includes the second filtering criteria; and a transmitting processor that transmits the PDI table, the first filtering criteria information, the second filtering criteria, the at least one application and the contents.

16. The apparatus of claim 15, wherein when the PDI table is transmitted via the broadcast stream, the transmitting processor further:

compresses the generated PDI table;

divides the compressed PDI table into blocks;

inserts the blocks into sections carried in the Service Signaling Channel (SSC), wherein the sections includes sequence number information to distinguish the PDI table.

* * * * *